(12) United States Patent
Fukuoka et al.

(10) Patent No.: US 9,777,091 B2
(45) Date of Patent: Oct. 3, 2017

(54) COPOLYMER, INK, AND INK CONTAINER

(71) Applicants: Masayuki Fukuoka, Shizuoka (JP);
Shigeyuki Harada, Shizuoka (JP);
Yoshiki Yanagawa, Shizuoka (JP);
Keita Katoh, Kanagawa (JP);
Kazukiyo Nagai, Shizuoka (JP);
Yuusuke Koizuka, Shizuoka (JP);
Tomoyuki Shimada, Shizuoka (JP);
Akiyoshi Sabu, Shizuoka (JP); Takuya Yamazaki, Shizuoka (JP); Akihiko Matsuyama, Shizuoka (JP)

(72) Inventors: Masayuki Fukuoka, Shizuoka (JP);
Shigeyuki Harada, Shizuoka (JP);
Yoshiki Yanagawa, Shizuoka (JP);
Keita Katoh, Kanagawa (JP);
Kazukiyo Nagai, Shizuoka (JP);
Yuusuke Koizuka, Shizuoka (JP);
Tomoyuki Shimada, Shizuoka (JP);
Akiyoshi Sabu, Shizuoka (JP); Takuya Yamazaki, Shizuoka (JP); Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 14/950,175

(22) Filed: Nov. 24, 2015

(65) Prior Publication Data

US 2016/0168292 A1    Jun. 16, 2016

(30) Foreign Application Priority Data

Dec. 12, 2014  (JP) .................................. 2014-251472
Feb. 10, 2015  (JP) .................................. 2015-024383
(Continued)

(51) Int. Cl.
*C09D 11/107* (2014.01)
*C08F 220/30* (2006.01)
(Continued)

(52) U.S. Cl.
CPC .......... *C08F 220/10* (2013.01); *C08F 220/28* (2013.01); *C08F 220/36* (2013.01);
(Continued)

(58) Field of Classification Search
CPC ............ C08F 2220/286; C08F 2220/30; C08F 220/36; C09D 11/107
(Continued)

(56) References Cited

U.S. PATENT DOCUMENTS

2004/0066440 A1  4/2004  Ungefug et al.
2009/0192261 A1  7/2009  Anton
(Continued)

FOREIGN PATENT DOCUMENTS

EP    1 408 094 A1    4/2004
EP    2 295 511 A1    3/2011
(Continued)

OTHER PUBLICATIONS

Extended European Search Report issued on Apr. 19, 2016 in European Patent Application No. 15198078.6.

*Primary Examiner* — Vu A Nguyen
(74) *Attorney, Agent, or Firm* — Oblon, McClelland, Maier & Neustadt, L.L.P.

(57) ABSTRACT

A copolymer includes the structure unit represented by the following Chemical formula 1 and the structure unit represented by the following Chemical formula 2,
(Continued)

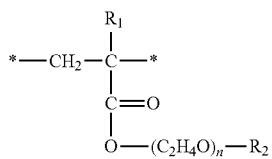

Chemical formula 1 where $R_1$ and $R_2$ each, independently represent hydrogen atoms or methyl groups, and n represents a value in the range of from 1 to 90,

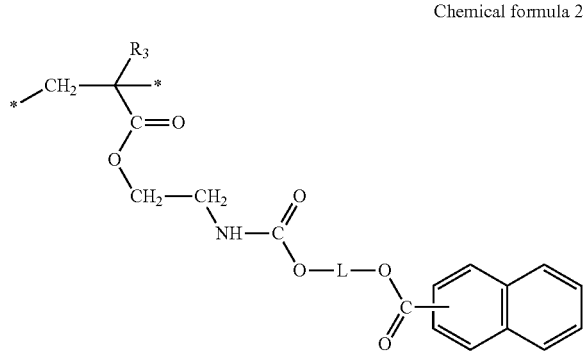

Chemical formula 2 where $R_3$ represents a hydrogen atom or a methyl group and L represents an alkylene group having 2 to 18 carbon atoms.

18 Claims, 4 Drawing Sheets

(30) Foreign Application Priority Data

| Mar. 9, 2015 | (JP) | 2015-045987 |
| Jun. 23, 2015 | (JP) | 2015-125378 |
| Aug. 21, 2015 | (JP) | 2015-163750 |
| Oct. 7, 2015 | (JP) | 2015-199309 |

(51) Int. Cl.

| C08F 220/10 | (2006.01) |
| C09D 11/322 | (2014.01) |
| C08F 220/28 | (2006.01) |
| C08F 220/36 | (2006.01) |
| C08K 5/20 | (2006.01) |

(52) U.S. Cl.
CPC .......... C09D 11/107 (2013.01); C09D 11/322 (2013.01); C08K 5/20 (2013.01)

(58) Field of Classification Search
USPC .................................................. 526/320, 326
See application file for complete search history.

(56) References Cited

U.S. PATENT DOCUMENTS

| 2011/0065826 A1 | 3/2011 | Shimohara |
| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0247049 A1 | 9/2015 | Matsuyama et al. |
| 2015/0252203 A1 | 9/2015 | Matsuyama et al. |
| 2015/0259555 A1 | 9/2015 | Katoh et al. |
| 2015/0291817 A1 | 10/2015 | Katoh et al. |
| 2015/0307734 A1 | 10/2015 | Nonogaki et al. |

FOREIGN PATENT DOCUMENTS

| JP | 2003-147243 | 5/2003 |
| JP | 2005-133089 | 5/2005 |
| JP | 2008-019431 | 1/2008 |
| JP | 2008-143987 | 6/2008 |
| JP | 2011-042771 | 3/2011 |
| JP | 2011-105866 | 6/2011 |
| JP | 2012-051357 | 3/2012 |
| WO | WO 2007/053563 A2 | 5/2007 |

COPOLYMER, INK, AND INK CONTAINER

CROSS-REFERENCE TO RELATED APPLICATIONS

This patent application is based on and claims priority pursuant to 35 U.S.C. §119(a) to Japanese Patent Application Nos. 2014-251472, 2015-024383, 2015-045987, 2015-125378, 2015-163750, and 2015-199309, filed on Dec. 12, 2014, Feb. 10, 2015, Mar. 9, 2015, Jun. 23, 2015, Aug. 21, 2015, and Oct. 7, 2015, respectively, in the Japan Patent Office, the entire disclosures of which are hereby incorporated by reference herein.

BACKGROUND

Technical Field

The present invention relates to a copolymer, ink and an ink container.

Background Art

Inkjet recording methods have advantages such that the process is simple and full colorization is easy in comparison with other recording methods. Therefore, high resolution images can be obtained by a device having a simple configuration. For this reason, the inkjet recording is widely diffusing from home use to office use, commercial printing, and industrial printing. In such an inkjet recording method, aqueous ink compositions using a water soluble dye as colorant are commonly used. However, its water resistance and light resistance are inferior so that pigment ink using a water insoluble pigment is under development to substitute the water soluble dye.

For inkjet ink printing for office use, recording media, typically plain paper, are used and high image density is demanded. In general, when images are printed on plain paper using pigment ink, the pigment ink does not stay on the surface of the paper but permeates into the paper, so that the pigment density on the surface decreases and consequently the image density lowers. The image density increases if the pigment concentration in the ink is increased. However, the ink becomes viscous, thereby degrading the discharging stability of the ink.

In addition, technologies to stably form clear and vivid images with higher resolutions in higher performance are demanded in the fields of commercial printing and industrial printing. As the recording medium, in addition to plain paper, coated paper, art paper, non-permeating film such as polyethylene terephthalate (PET) film, etc. are used and high responsiveness of ink to such recording media is also demanded. In the inkjet recording method, a hydrophilic organic solvent is added to an aqueous ink to prevent curling of plain paper or to increase drying speed and prevent beading by improving the permeability of ink in the case of coated paper or art paper.

In addition, unlike an aqueous dye ink adjusted by dissolving a dye in water, the aqueous pigment ink for use in the inkjet recording method described above or pens and pencils requires stable dispersion of an water-insoluble pigment in water for a long period of time. Therefore, various pigment dispersants have been developed.

SUMMARY

According to the present disclosure, provided is a copolymer which includes the structure unit represented by the following Chemical formula 1 and the structure unit represented by the following Chemical formula 2,

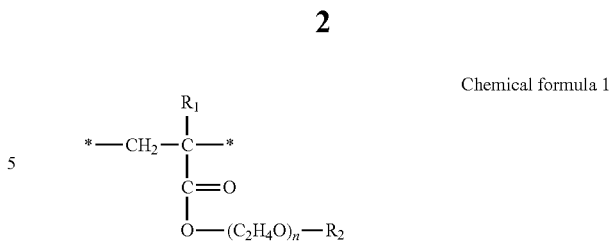

Chemical formula 1 where $R_1$ and $R_2$ each, independently represent hydrogen atoms or methyl groups, and n represents a value in the range of from 1 to 90,

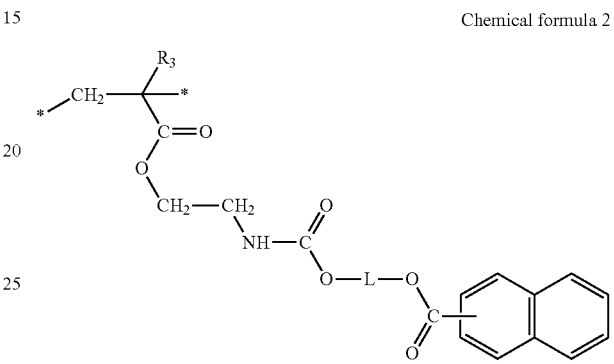

Chemical formula 2 where $R_3$ represents a hydrogen atom or a methyl group and L represents an alkylene group having 2 to 18 carbon atoms.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
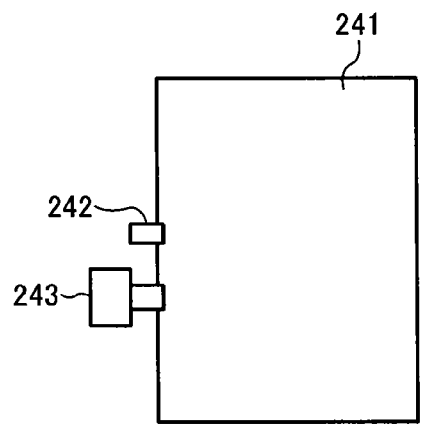
FIG. 1 is a diagram illustrating an example of the ink container according to an embodiment of the present invention.

According to the present disclosure, a copolymer serving as a pigment dispersion resin of an aqueous ink is provided. If the copolymer of the present disclosure is used as a dispersion resin of a pigment, the obtained pigment dispersion has a high level of dispersibility and storage stability for a long time. In addition, when the copolymer of the present disclosure is used for an aqueous ink, the aqueous ink has high image density even when recording an image on plain paper and also has excellent storage stability.

The copolymer of the present disclosure includes the structure unit represented by the following Chemical formula 1 and the structure unit represented by the following Chemical formula 2.

In the Chemical formula 1, $R_1$ and $R_2$ each, independently represent hydrogen atoms or methyl groups. n represents an integer of from 1 to 90. Cellulose, which is the main component of plain paper, and the structure represented by Chemical formula 1 of the copolymer of the present disclosure are hydrophilic. Therefore, the structure represented by the Chemical formula 1 is deduced to have more affinity with cellulose than a hydrophobic solvent. When the copolymer of the present disclosure is used for ink, the copolymer of the present disclosure adsorbed to a pigment during printing is adsorbed to cellulose so that the pigment tends to stay on the surface of a recording medium. Since the Chemical formula 1 has a polyethylene glycol chain having an n of from 1 to 90, the copolymer easily contacts cellulose, which makes it easier for the copolymer to be adsorbed to cellulose. As a consequence, a printed image on plain paper has a high image density. In the Chemical formula 1, n represents the average adduct mol number of ethyleneoxide ($C_2H_4O$).

$R_2$ is preferably a hydrogen atom in terms of water solubility.

In the Chemical formula 2, $R_3$ represents a hydrogen atom or a methyl group, L represents an alkylene group having 2 to 18 carbon atoms, preferably an alkylene group having 2 to 16 carbon atoms, and more preferably an alkylene group having 2 to 12 carbon atoms. The naphtyl group existing at the end via L having an open end (open end, in other words, pendant structure portion) has an excellent pigment adsorption power due to π-π stacking with pigments serving as colorant in an aqueous ink (hereinafter referred to as ink).

As understood from the description "naphtyl group existing via L in the pendant", the structure unit represented by the Chemical formula 1 and the structure unit represented by the Chemical formula 2 may be typically the main chain of the copolymer having a pendant group such as a naphthyl group at the end pendulating via L or a carboxylic group in a side chain. However, this does not exclude a case in which a part is contained in a side chain.

For example, it is well known that it is difficult to completely exclude additional radical polymerization reaction that produces fork structures.

In addition, when a pigment dispersion in which a pigment is dispersed in water is prepared with the copolymer of the present disclosure, the copolymer tends to be adsorbed on the surface of the pigment due to the naphtyl group present at the end of the side chain of the copolymer and the adsorption power with the pigment is so strong that the obtained dispersion is stabilized with a good dispersibility for an extended period of time.

The molar ratio of the structure unit represented by the Chemical formula 1 and the structure unit represented by the Chemical formula 2 forming the copolymer of the present disclosure is from 0.5:1.0 to 10.0:1.0, preferably from 0.5:1.0 to 7.0:1.0, and more preferably from 0.5:1.0 to 5.0:1.0 in terms of the power to adsorb a pigment. If the ratio of the structure units represented by the Chemical formula 1 and Chemical formula 2 is shown in mass, it is preferably from 25:75 to 87:13, more preferably from 40:60 to 82:18, and furthermore preferably from 57:43 to 77:23.

The structure of the copolymer can be analyzed by using a known analyzing method such as nuclear magnetic resonance (NMR) and infrared radiation (IR).

In addition, the molar ratio of the structure unit represented by the Chemical formula 1 to the structure unit represented by Chemical formula 2 can be obtained by the molar ratio of the monomers used when synthesizing the copolymer. In addition, it can be also obtained from the copolymer using NMR.

The copolymer of the present disclosure may optionally include the structure unit represented by the following Chemical formula 3 in addition to the structure unit represented by the Chemical formula 1 and the structure unit represented by the Chemical formula 2.

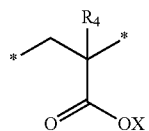

Chemical formula 3

In the Chemical formula 3, $R_4$ represents a hydrogen atom or a methyl group and X represents a hydrogen atom or a cation. In the Chemical formula 3, when X is a cation, the oxygen adjacent to the cation is present as $O^-$. Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

Due to the structure unit represented by the Chemical formula 3, storage stability is further improved and images can be formed with higher resolution and density.

Unlike the structure unit represented by the Chemical formula 1, in the structure unit represented by Chemical formula 3, the alkali ion is replaced with X in terms of strength of pKa so that X becomes cationized and an anion in a solvent. Accordingly, if used as dispersant, dispersion occurs due to electric repulsion. Due to dispersion caused by the steric barrier of the structure unit represented by the structure unit represented by the Chemical formula 1 and dispersion due to the electric repulsion of the structure unit represented by the Chemical formula 3, storage property is enhanced depending on solvents in comparison with the case in which only the structure unit represented by Chemical formula 1 is used.

In addition, the carboxyl group contained in the structure unit represented by the Chemical formula 3 loses electric repulsion force by neutralization by calcium ion eluted from paper after ink droplets land on the paper. As a consequence, pigment particles quickly agglomerate after ink droplets land on paper and stay thereon, which results in high image density for paper containing a large amount of calcium.

The molar ratio of the structure unit represented by the Chemical formula 1 to the structure unit represented by the Chemical formula 2 to the structure unit represented by the Chemical formula 3 forming the copolymer of the present disclosure is preferably from 0.3:1.0:0.6 to 2.0:1.0:3.0, more preferably from 0.6:1.0:1.2 to 1.8:1.0:2.6, and furthermore preferably from 0.8:1.0:1.5 to 1.5:1.0:2.4 in terms of the power to adsorb a pigment. If the molar ratio of the structure unit represented by the Chemical formula 1 to the structure unit represented by the Chemical formula 2 to the structure unit represented by the Chemical formula 3 is shown in mass, it is preferably from 15:77:8 to 47:35:18, more preferably from 25:62:13 to 45:38:17, and furthermore preferably from 30:56:14 to 42:41:17.

The copolymer of the present disclosure may optionally include the structure unit represented by the following Chemical formula 7 in addition to the structure unit represented by the Chemical formula 1 and the structure unit represented by the Chemical formula 2.

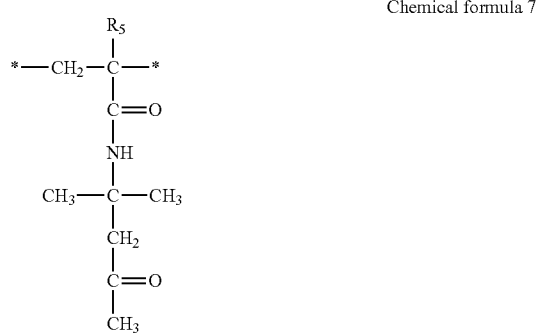

Chemical formula 7

In the Chemical formula 7, $R_5$ represents a hydrogen atom or a methyl group.

The structure unit of the Chemical formula 7 has good affinity with a water soluble organic solvent for use in ink. The structure of the Chemical formula 1 loses extensity since hydrophilic groups gather under the presence of a hydrophobic ink solvent, so that the steric barrier lowers. Therefore, storage property in ink may be slightly inferior to in water. In this regard, by introducing the structure of the Chemical formula 7 into the copolymer, which has a more hydrophobic hydrophilic group, it can maintain extensity of the polymer chains in an ink solvent, thereby improving storage property. By the introduction of this structure, dispersion of the pigment is maintained stable even when water in ink evaporates and the ratio of the water soluble organic solvent increases in the ink. This leads to boost discharging reliability.

The molar ratio of the structure unit represented by the Chemical formula 1 to the structure unit represented by the Chemical formula 2 to the structure unit represented by the Chemical formula 7 forming the copolymer of the present disclosure is preferably from 0.3:1.0:0.1 to 4.0:1.0:1.5, more preferably from 0.5:1.0:0.2 to 3.5:1.0:1.0, and furthermore preferably from 1.0:1.0:0.3 to 3.0:1.0:0.8 in terms of the power to adsorb a pigment. If the molar ratio of the structure unit represented by the Chemical formula 1 to the structure unit represented by the Chemical formula 2 to the structure unit represented by the Chemical formula 7 is shown in mass, it is preferably from 16:81:3 to 63:24:13, more preferably from 24:70:6 to 62:27:11, and furthermore preferably from 37:56:7 to 60:30:10.

The structure of the copolymer can be analyzed by using a known analyzing method such as nuclear magnetic resonance (NMR) and infrared radiation (IR). In addition, the molar ratio of the structure unit represented by the Chemical formula 1 to the structure unit represented by the Chemical formula 2 to the structure unit represented by the Chemical formula 3 or the structure unit represented by the Chemical formula 7 can be obtained by the molar ratio of the monomers used when synthesizing the copolymer. In addition, it can be also obtained from the copolymer using NMR.

The copolymer having the structure unit represented by the Chemical formula 1 and the structure unit represented by the Chemical formula 2 and the copolymer having the structure unit represented by the Chemical formula 1, the structure unit represented by the Chemical formula 2, and the structure unit represented by the Chemical formula 3 or the structure unit represented by the Chemical formula 7 have number average molecular weights and weight average molecular weights of from 500 to 10,000 and 1,500 to 30,000, respectively, in polystyrene conversion.

The copolymer of the present disclosure may optionally include the structure unit represented by the following Chemical formula 9 in addition to the structure unit represented by the Chemical formula 1 and the structure unit represented by the Chemical formula 2.

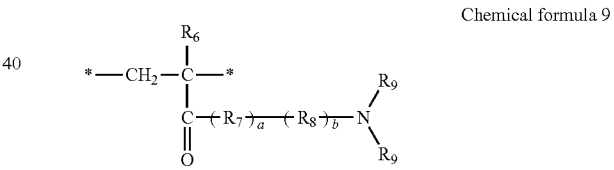

Chemical formula 9

In the Chemical formula 9, $R_6$ represents a hydrogen atom or a methyl group, $R_7$ represents —O— or —NH—, $R_8$ represents a substituted or non-substituted alkylene group having 1 to 5 carbon atoms, $R_9$ represents a hydrogen atom or an alkyl group having 1 to 5 carbon atoms, and a and b each, independently represent 0 or 1. $R_8$ is preferably an ethylene group or a propylene group and $R_9$ is preferably a hydrogen atom, a methyl group, or an ethyl group. The structure unit represented by the Chemical formula 9 is basic. The acidic surface modifier on the surface of a pigment and the base of the copolymer of the present disclosure are bonded by acid base mutual interaction. The copolymer has excellent pigment adsorption property due to the adsorption mechanism by the acid base mutual interaction in addition to π-π stacking.

The structure of the copolymer can be analyzed by using a known analyzing method such as nuclear magnetic resonance (NMR) and infrared radiation (IR). In addition, the molar ratio of the structure unit represented by the Chemical formula 1 to the structure unit represented by Chemical formula 2 to the structure unit represented by Chemical formula 9 can be obtained by the molar ratio of the monomers used when synthesizing the copolymer. In addition, it can be also obtained from the copolymer using NMR.

The molar ratio of the structure unit represented by the Chemical formula 1 to the structure unit represented by the Chemical formula 2 to the structure unit represented by the Chemical formula 9 forming the copolymer of the present disclosure is preferably from 0.3:1.0:0.05 to 6.0:1.0:1.0, more preferably from 0.5:1.0:0.1 to 6.0:1.0:0.8, and furthermore preferably from 1.0:1.0:0.2 to 6.0:1.0:0.5 in terms of the power to adsorb a pigment.

The viscosity of an aqueous solution of the copolymer having the structure unit represented by the Chemical formula 1, the structure unit represented by the Chemical formula 2, and the structure unit represented by the Chemical formula 9 having a solid portion of 6.5 percent by mass is preferably from 1.0 mPa·S to 30.0 mPa·s. When the viscosity is 1.0 mPa·s or more, the reactivity of a pigment dispersant to cellulose in paper is improved, which enhances improvement of the image density. When the viscosity is 30.0 mPa·s or less, the dispersion stability of a pigment is further improved, thereby ameliorating the storage stability of the pigment dispersion. The viscosity is measured at 25 degrees C. as described later.

The structure unit represented by the Chemical formula 9 in the copolymer includes, for example, the structure unit represented by the following Chemical formula 9-1.

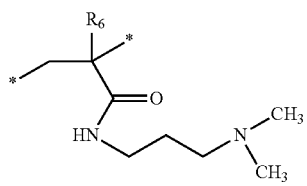

Chemical formula 9-1

In the Chemical formula 9-1, $R_6$ represents a hydrogen atom or a methyl group.

The copolymer of the present disclosure may optionally include the structure unit represented by the following Chemical formula 11 in addition to the structure unit represented by the Chemical formula 1 and the structure unit represented by the Chemical formula 2.

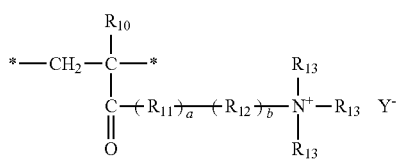

Chemical formula 11

In the Chemical formula 11, $R_{10}$ represents a hydrogen atom or a methyl group, $R_{11}$ represents —O— or —NH—, $R_{12}$ represents a substituted or non-substituted alkylene group having 1 to 5 carbon atoms, $R_{13}$ represents an alkyl group having 1 to 5 carbon atoms, $Y^-$ represents an anionic species, and a and b each, independently represent 0 or 1.

$Y^-$ is the counter ion of a quaternary ammonium salt and various anionic species can be used. Specific examples thereof include, but are not limited to, halogenated ions such as chloride ions, bromide ions, iodide ions, and fluoride ions, hydroxide ions, carboxylic acids ions, nitric acids ions, phosphoric acids ions, and sulfuric acids ions. $R_{12}$ is preferably an ethylene group or a propylene group and $R_{13}$ is preferably a methyl group or an ethyl group.

The structure unit represented by the Chemical formula 11 is basic. The acidic surface modifier on the surface of a pigment and the base of the copolymer of the present disclosure are bonded by acid base mutual interaction. The copolymer of the present disclosure has excellent pigment adsorption property due to the adsorption mechanism by the acid base mutual interaction in addition to π-π stacking.

Furthermore, since basic property of the quaternary ammonium salt represented by the Chemical formula 11 is little affected by pH or ions, the acid base mutual interaction with the surface of a pigment is stabilized. Therefore, excellent pigment adsorption property is demonstrated by having this structure unit represented by the Chemical formula 11. In addition, water solubility is improved by using the quaternary ammonium salt, which makes it possible to improve applicability to aqueous ink.

The structure of the copolymer can be analyzed by using a known analyzing method such as nuclear magnetic resonance (NMR) and infrared radiation (IR).

In addition, the molar ratio of the structure unit represented by the Chemical formula 1 to the structure unit represented by the Chemical formula 2 to the structure unit represented by the Chemical formula 11 can be obtained by the molar ratio of the monomers used when synthesizing the copolymer. In addition, it can be also obtained from the copolymer using NMR.

The molar ratio of the structure unit represented by the Chemical formula 1 to the structure unit represented by the Chemical formula 2 to the structure unit represented by the Chemical formula 11 forming the copolymer of the present disclosure is preferably from 0.3:1.0:0.05 to 6.0:1.0:1.0, more preferably from 0.5:1.0:0.05 to 6.0:1.0:0.8, and furthermore preferably from 1.0:1.0:0.05 to 6.0:1.0:0.5 in terms of the power to adsorb a pigment.

The viscosity of an aqueous solution having a solid portion of 6.5 percent by mass of the copolymer having the structure unit represented by the Chemical formula 1, the structure unit represented by the Chemical formula 2, and the structure unit represented by the Chemical formula 11 is preferably from 1.0 mPa·S to 30.0 mPa·s. When the viscosity is 1.0 mPa·s or more, the reactivity of a pigment dispersant to cellulose in paper is improved, which enhances improvement of the image density. When the viscosity is 30.0 mPa·s or less, the dispersion stability of a pigment is further improved, thereby ameliorating the storage stability of the pigment dispersion. The viscosity is measured at 25 degrees C. as described later.

The copolymer of the present disclosure may optionally include the structure unit represented by the following Chemical formula 13 in addition to the structure unit represented by the Chemical formula 1 and the structure unit represented by the Chemical formula 2.

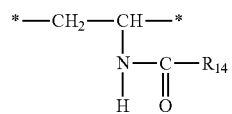

Chemical formula 13

In the Chemical formula 13, $R_{14}$ represents a hydrogen atom or a methyl group.

The structure of the Chemical formula 13 is highly hydrophilic. The structure of the Chemical formula 2 is adsorbed well to a pigment and improves storage property. However, water solubility deteriorates if it is added to a copolymer in a large amount. Therefore, by adding the Chemical structure 13 having a high hydrophilicity, water solubility is maintained if a large amount of the Chemical formula 2 is added. As a consequence, the copolymer of the present disclosure is strongly adsorbed to a pigment, thereby ameliorating storage stability.

The structure of the copolymer can be analyzed by using a known analyzing method such as nuclear magnetic resonance (NMR) and infrared radiation (IR). In addition, the molar ratio of the structure unit represented by the Chemical formula 1 to the structure unit represented by the Chemical formula 2 to the structure unit represented by the Chemical formula 13 can be obtained by the molar ratio of the monomers used when synthesizing the copolymer. In addition, it can be also obtained from the copolymer using NMR.

The molar ratio of the structure unit represented by Chemical formula 1 to the structure unit represented by the Chemical formula 2 to the structure unit represented by the Chemical formula 13 forming the copolymer of the present disclosure is preferably from 1.0:1.0:0.05 to 5.0:1.0:1.0, more preferably from 1.0:1.0:0.05 to 4.0:1.0:0.7, and furthermore preferably from 1.0:1.0:0.05 to 3.0:1.0:0.5 in terms of the power to adsorb a pigment.

The viscosity of an aqueous solution having a solid portion of 6.5 percent by mass of the copolymer having the structure unit represented by the Chemical formula 1, the structure unit represented by the Chemical formula 2, and the structure unit represented by the Chemical formula 13 is preferably from 1.0 mPa·S to 30.0 mPa·s. When the viscosity is 1.0 mPa·s or more, the reactivity of a pigment dispersant to cellulose in paper is improved, which enhances improvement of the image density. When the viscosity is 30.0 mPa·s or less, the dispersion stability of a pigment is further improved, thereby ameliorating the storage stability of the pigment dispersion. The viscosity is measured at 25 degrees C. as described later.

The copolymer of the present disclosure may optionally include repeating units constituted of other polymerizable monomers other than the structure unit represented by Chemical formula 1, the structure unit represented by Chemical formula 2, the structure unit represented by Chemical formula 7, the structure unit represented by Chemical formula 9, the structure unit represented by Chemical formula 11, and the structure unit represented by Chemical formula 13.

Such other polymerizable monomers are not particularly limited. These can be selected to a particular application. Examples thereof are polymerizable hydrophobic monomers, polymerizable hydrophilic monomers, and polymerizable surfactants.

Specific examples of the hydrophobic monomers include, but are not limited to, unsaturated ethylene monomers having aromatic ring such as styrene, α-methyl styrene, 4-t-butyl styrene, and 4-chloromethyl styrene; (meth)acrylic acid alkyl such as methyl (meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), nonadecyl (meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination of two or more thereof.

Specific examples of the polymerizable hydrophilic monomers include, but are not limited to, anionic unsaturated ethylene monomers such as maleic acid or salts thereof, monomethyl maleate, itaconic acid, monomethyl itaconate, fumaric acid, 4-styrene sulfonic acid, 2-acrylic amide-2-methyl propane sulfonic acid, or anionic unsaturated ethylene monomers such as unsaturated ethylene monomers having phosphoric acid, phosphonic acid, alendronic acid, or etidronic acid; and nonionic unsaturated ethylene monomers such as 2-hydroxyethyl (meth)acrylic acid, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

One or more kinds of the polymerizable hydrophilic monomers and polymerizable hydrophobic monomers are mixed and the mixture may account for 5 percent by mass to 100 percent by mass to the total of the monomers forming the structure unit represented by the Chemical formula 1, the structure unit represented by the Chemical formula 2, the structure unit represented by the Chemical formula 3, the structure unit represented by the Chemical formula 7, the structure unit represented by the Chemical formula 9, the structure unit represented by the Chemical formula 11, and the structure unit represented by the Chemical formula 13.

The polymerizable surfactant is an anionic or nonionic surfactant having at least one radically-polymerizable unsaturated double bond group in its molecule.

Specific examples of the anionic surfactant include, but are not limited to, a hydrocarbon compound having a sulfate salt group such as ammonium sulfate group ($—SO_3—NH_4^+$) and an allyl group ($—CH_2—CH=CH_2$), a hydrocarbon compound having a sulfate group such as ammonium sulfate group ($—SO_3^-NH_4^1$) and a methacylic group [($—CO—C(CH_3)=CH_2$], and an aromatic hydrocarbon compound having a sulfate group such as ammonium sulfate group ($—SO_3^-NH_4^+$) and a 1-propenyl group ($—CH=CH_2CH_3$). Specific examples thereof include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($—CH=CH_2CH_3$) and a polyoxyethylene group $[—(C_2H_4O)_n—H]$. Specific examples thereof include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

One or more kinds of the polymerizable surfactants are mixed and the mixture may account for 0.1 percent by mass to 10 percent by mass to the total of the monomers forming the structure unit represented by the Chemical formula 1, the structure unit represented by the Chemical formula 2, the structure unit represented by the Chemical formula 3, the structure unit represented by the Chemical formula 7, the structure unit represented by the Chemical formula 9, the structure unit represented by the Chemical formula 11, and the structure unit represented by the Chemical formula 13.

The copolymer having the structure unit represented by the Chemical formula 1 and the structure unit represented by the Chemical formula 2 is preferably synthesized from at least the compound represented by the following Chemical formula 4 and the compound represented by the Chemical formula 5 as the starting materials.

Chemical formula 4

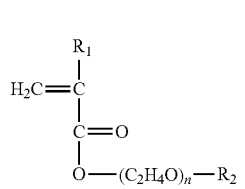

In the Chemical formula 4, $R_1$ and $R_2$ each, independently represent hydrogen atoms or methyl groups, and n represents a value in the range of from 1 to 90.

Chemical formula 5

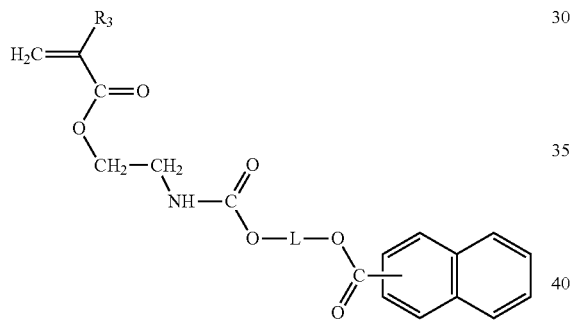

In the Chemical formula 5, $R_3$ represents a hydrogen atom or a methyl group and L represents an alkylene group having 2 to 18 carbon atoms.

The copolymer of the present disclosure can be obtained by the following Chemical reaction formulae 1, 2, and 3-1. First, as in the following Chemical reaction 1, naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, as illustrated in the following Chemical reaction 2, a monomer (A-4) as a compound represented by the Chemical formula 5 is obtained by reacting 2-methacryloyloxyethyl isocyanate (A-3) and the naphthalene carboxylic acid hydroxy alkyl ester (A-2). Thereafter, as illustrated in the reaction formula 3-1, the copolymer (A-7) of the present disclosure is obtained by copolymerizing the monomer (A-4) and the compound represented by the Chemical formula 4, i.e., (methoxy)polyethylene glycol(mono)(meth) acrylate (A-5) under the presence of a radical polymerization initiator. The weight average molecular weight of the monomer (A-4) is from 357 to 596 because L in the Chemical formula 2 is an alkylene group having 2 to 18 carbon atoms and $R_3$ is a hydrogen atom or a methyl group.

Chemical reaction 1

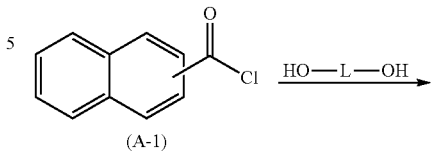

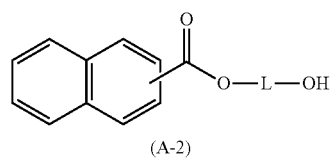

Chemical reaction 2

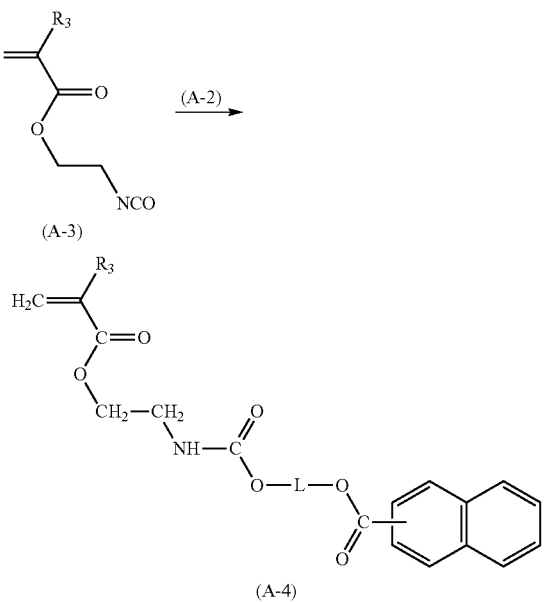

Chemical reaction 3-1

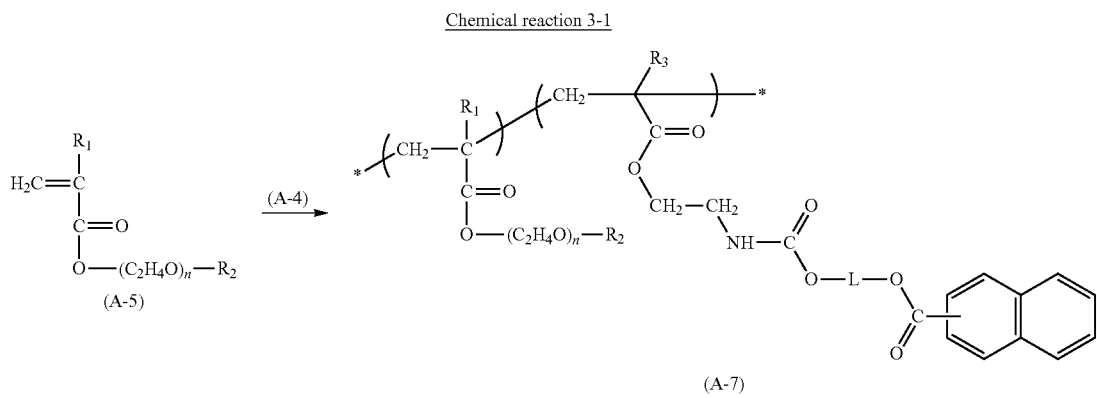

The copolymer having the structure unit represented by the Chemical formula 1, the structure unit represented by the Chemical formula and the structure unit represented by the Chemical formula 3 is preferably synthesized from at least the compound represented by the following chemical formula 4, the compound. represented by the Chemical formula 5, and the compound represented by the Chemical formula 6 as the starting materials.

Chemical formula 4

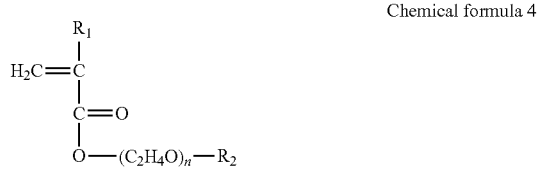

In the Chemical formula 4, $R_1$ and $R_2$ each, independently represent hydrogen at or methyl groups, and n represents a value in the range of from 1 to 90.

Chemical formula 5

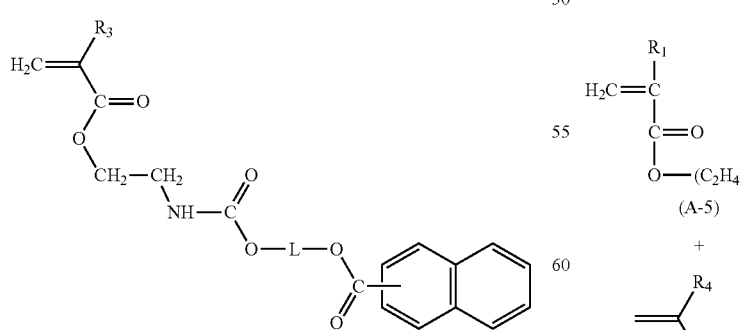

In the Chemical formula 5, $R_3$ represents a hydrogen atom or a methyl group and L represents an alkylene group having 2 to 18 carbon atoms.

Chemical formula 6

In the Chemical formula 6, $R_4$ represents a hydrogen atom or a methyl group and X represents a hydrogen atom or a cation.

For example, like the synthesis of the copolymer having the structure unit represented by the Chemical formula 1 and the structure unit represented by the Chemical formula 2, the copolymer (A-8) of the present disclosure having the structure unit represented by the Chemical formula 1, the structure unit represented by the Chemical formula 2, and the structure unit represented by the Chemical formula 3 is obtained by reacting 2-methacryloyloxyethyl isocyanate (A-3) and the naphthalene carboxylic acid hydroxy alkyl ester (A-2) to obtain the monomer (A-4) as the compound represented by the Chemical formula 5 and thereafter, as illustrated in the following Chemical reaction 3-2, copolymerizing the monomer (A-4), the compound represented by the Chemical formula 4, i.e., (methoxy)polyethylene glycol (mono)(meth)acrylate (A-5), and the compound represented by the Chemical formula 6, i.e., (meth)acrylic acid or a salt thereof (A-6) under the presence of a radical polymerization initiator.

Chemical reaction 3-2

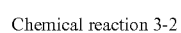
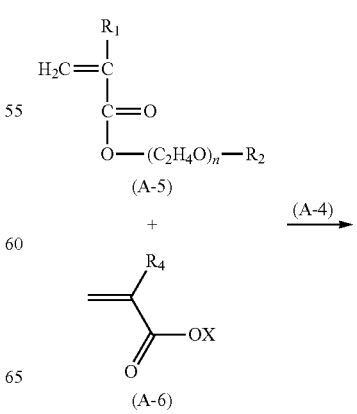

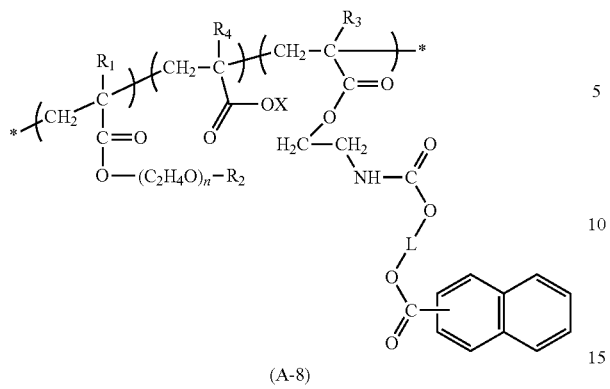

(A-8)

The copolymer having the structure unit represented by the Chemical formula 1, the structure unit represented by the Chemical formula 2, and the structure unit represented by the Chemical formula 7 is preferably synthesized from at least the compound represented by the following Chemical formula 4, the compound represented by the Chemical formula 5, and the compound represented by the Chemical formula 8 as the starting materials.

Chemical formula 4

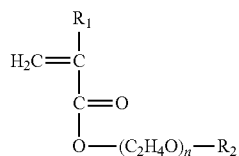

In the Chemical formula 4, $R_1$ and $R_2$ each, independently represent hydrogen atoms or methyl groups, and n represents a value in the range of from 1 to 90.

Chemical formula 5

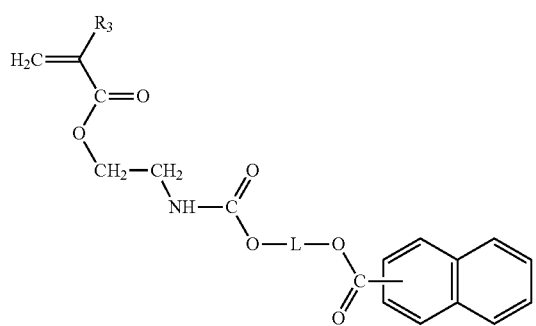

In the Chemical formula 5, $R_3$ represents a hydrogen atom or a methyl group and L represents an alkylene group having 2 to 18 carbon atoms.

Chemical formula 8

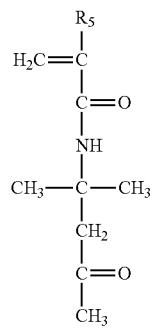

In the Chemical formula 8, $R_5$ represents a hydrogen atom or a methyl group.

For example, like the synthesis of the copolymer having the structure unit represented by the Chemical formula 1 and the structure unit represented by the Chemical formula 2, the copolymer (A-10) of the present disclosure having the structure unit represented by the Chemical formula 1, the structure unit represented by the Chemical formula 2, and the structure unit represented by the Chemical formula 7 is obtained by reacting 2-methacryloyloxyethyl isocyanate (A-3) and naphthalene carboxylic acid hydroxy alkyl ester (A-2) to obtain the monomer (A-4) as a compound represented by the Chemical formula 5 and thereafter, as illustrated in the following Chemical reaction 3-3, copolymerizing the monomer (A-4), the compound represented by the Chemical formula 4, i.e., (methoxy)polyethylene glycol (mono)(meth)acrylate (A-5), and the compound represented by the Chemical formula 8, i.e., diacetone(meth)acryliamide (A-9) under the presence of a radical polymerization initiator.

Chemical formula 19

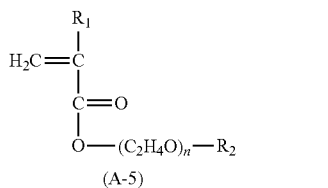

(A-5)

+ (A-4) →

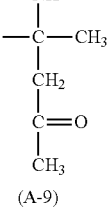

(A-9)

-continued

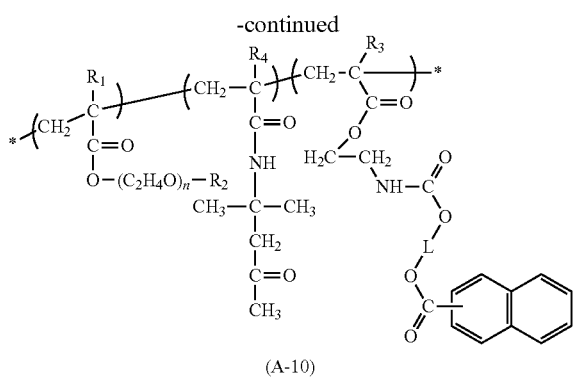

(A-10)

The copolymer having the structure unit represented by the Chemical formula 1, the structure unit represented by the Chemical formula 2, and the structure unit represented by the Chemical formula 9 is preferably synthesized from at least the compound represented by the following Chemical formula 4, the compound represented by the following Chemical formula 5, and the compound represented by the following Chemical formula 10 as the starting materials.

Chemical formula 4

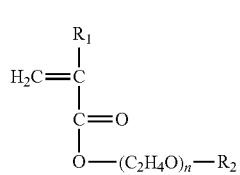

In the chemical formula 4, R and R each, independently represent hydrogen atoms or methyl groups, and n represents a value in the range of from 1 to 90.

Chemical formula 5

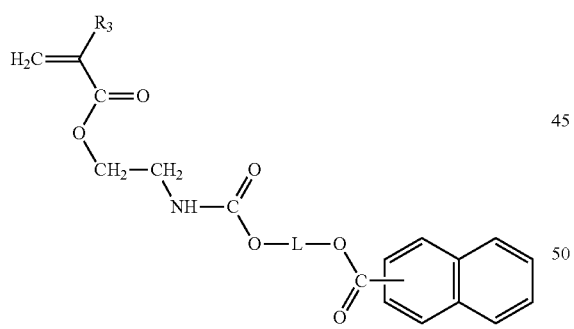

In the Chemical formula 5, $R_3$ represents a hydrogen atom or a methyl group and L represents an alkylene group having 2 to 18 carbon atoms, Chemical formula 10

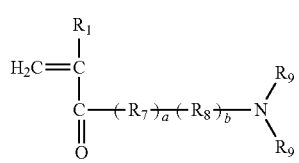

In the Chemical formula 10, $R_6$ represents a hydrogen atom or a methyl group, $R_7$ represents —O— or —NH—, $R_8$ represents a substituted or non-substituted alkylene group having 1 to 5 carbon atoms, $R_9$ represents a hydrogen atom or an alkyl group having 1 to 5 carbon atoms, and a and b each, independently represent 0 or 1.

For example, like the synthesis of the copolymer having the structure unit represented by the Chemical formula 1 and the structure unit represented by the Chemical formula 2, the copolymer (A-12) of the present disclosure having the structure unit represented by the Chemical formula 1, the structure unit represented by the Chemical formula 2, and the structure unit represented by the Chemical formula 9 is obtained by reacting 2-methacryloyloxyethyl isocyanate (A-3) and the naphthalene carboxylic acid hydroxy alkyl ester (A-2) to obtain the monomer (A-4) as the compound represented by the Chemical formula 5 and thereafter, as illustrated in the following Chemical reaction 3-4, copolymerizing the monomer (A-4), the compound represented by the Chemical formula 4, i.e., (methoxy)polyethylene glycol (mono)(meth)acrylate (A-5), and the compound (A-11) represented by the Chemical formula 10 under the presence of a radical polymerization initiator.

Chemical reaction 3-4

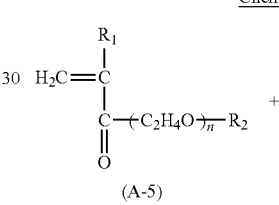

(A-5)

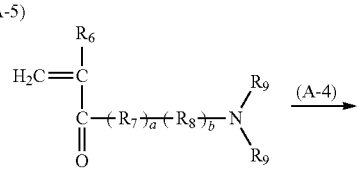

(A-11)

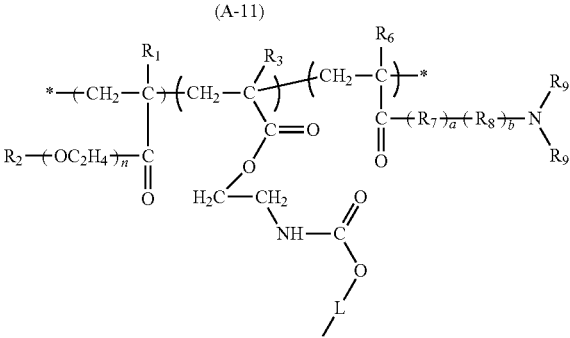

(A-12)

When the structure unit represented by the Chemical formula 9 is the structure unit represented by the Chemical formula 9-1, the copolymer having the structure unit represented by the Chemical formula 1, the structure unit represented by the Chemical formula 2, and the structure unit represented by the Chemical formula 9-1 is preferably synthesized from at least the compound represented by the following Chemical formula 4, the compound represented by the Chemical formula 5, and the compound represented by the Chemical formula 10-1 as the starting materials.

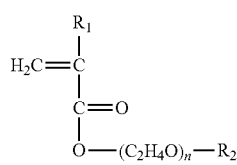

Chemical formula 4

In the Chemical formula 4, $R_1$ and $R_2$ each, independently represent hydrogen atoms or methyl groups, and n represents a value in the range of from 1 to 90.

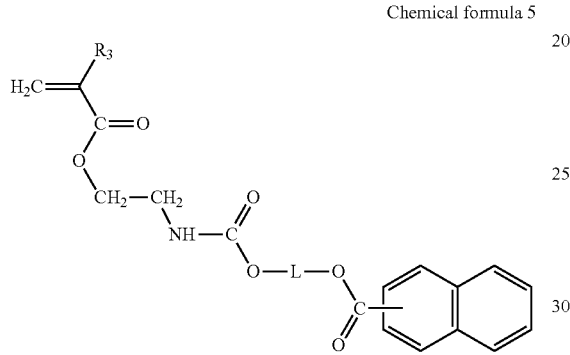

Chemical formula 5

In the Chemical formula 5, $R_3$ represents a hydrogen atom or a methyl group and L represents an alkylene group having 2 to 18 carbon atoms.

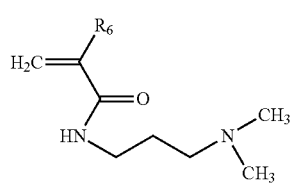

Chemical formula 10-1

In the Chemical formula 10-1, $R_6$ represents a hydrogen atom or a methyl group.

For example, like the synthesis of the copolymer having the structure unit represented by the Chemical formula 1 and the structure unit represented by the Chemical formula 2, the copolymer (A-14) of the present disclosure having the structure unit represented by the Chemical formula 1, the structure unit represented by the Chemical formula 2, and the structure unit represented by the Chemical formula 9-1 is obtained by reacting 2-methacryloyloxyethyl isocyanate (A-3) and the naphthalene carboxylic acid hydroxy alkyl ester (A-2) to obtain the monomer (A-4) as the compound represented by the Chemical formula 5 and thereafter, as illustrated in the following Chemical reaction 3-5, copolymerizing the monomer (A-4), the compound represented by the Chemical formula 4, i.e., (methoxy)polyethylene glycol (mono)(meth)acrylate (A-5), and the compound represented by the Chemical formula 10-1, i.e., dimethylamidepropyl (meth)acryliamide (A-13) under the presence of a radical polymerization initiator.

Chemical reaction 3-5

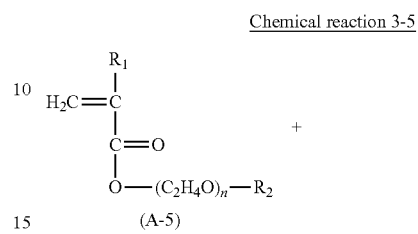

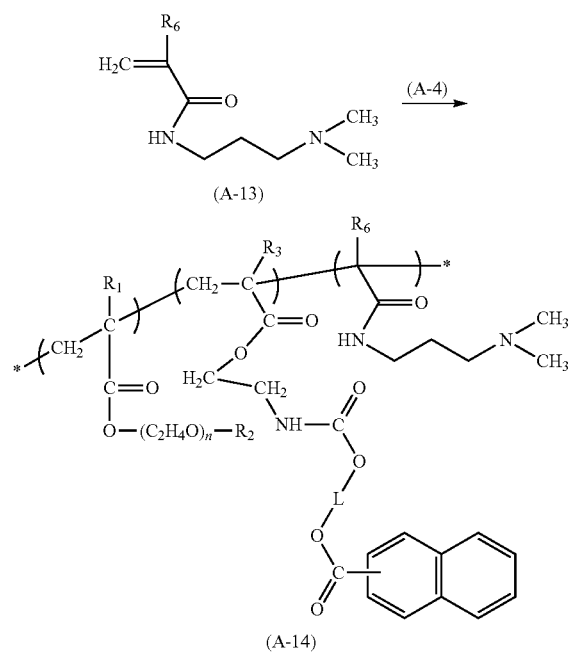

The copolymer having the structure unit represented by the Chemical formula 1, the structure unit represented by the Chemical formula 2, and the structure unit represented by the Chemical formula 11 is preferably synthesized from at least the compound represented by the following Chemical formula 4, the compound represented by the following Chemical formula 5, and the compound represented by the following Chemical formula 12 as the starting materials.

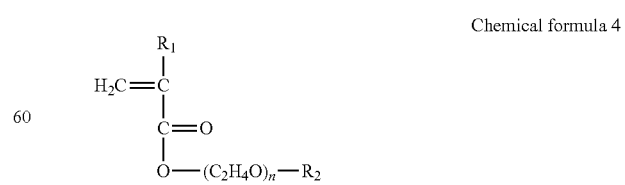

Chemical formula 4

In the Chemical formula 4, $R_1$ and $R_2$ each, independently represent hydrogen atoms or methyl groups, and n represents a value in the range of from 1 to 90.

Chemical formula 5

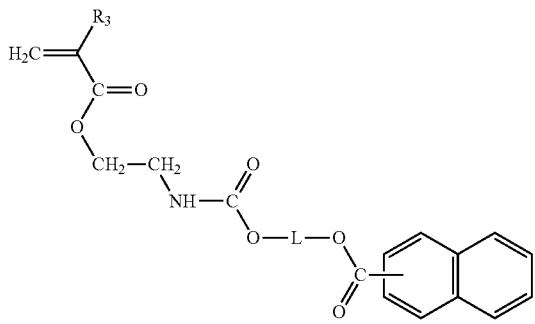

In the Chemical formula 5, $R_3$ represents a hydrogen atom or a methyl group and L represents an alkylene group having 2 to 18 carbon atoms.

Chemical formula 12

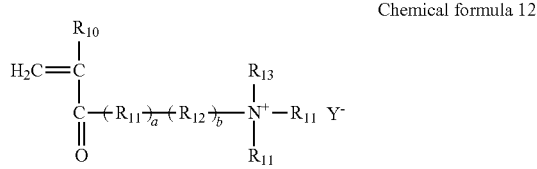

In the Chemical formula 12, $R_{10}$ represents a hydrogen atom or a methyl group, $R_{11}$ represents —O— or —NH—, $R_{12}$ represents a substituted or non-substituted alkylene group having 1 to 5 carbon atoms, $R_{13}$ represents an alkyl group having 1 to 5 carbon atoms, $Y^-$ represents an anionic species, and a and b each, independently represent 0 or 1.

For example, like the synthesis of the copolymer having the structure unit represented by the Chemical formula 1 and the structure unit represented by the Chemical formula 2, the copolymer (A-16) of the present disclosure having the structure unit represented by the Chemical formula 1, the structure unit represented by the Chemical formula 2, and the structure unit represented by the Chemical formula 11 is obtained by reacting 2-methacryloyloxyethyl isocyanate (A-3) and the naphthalene carboxylic acid hydroxy alkyl ester (A-2) to obtain the monomer (A-4) as a compound represented by the Chemical formula 5 and thereafter, as illustrated in the following Chemical reaction 3-6, copolymerizing the monomer (A-4), the compound represented by the Chemical formula 4, i.e., (methoxy)polyethylene glycol (mono)(meth)acrylate (A-5), and the compound (A-15) represented by the Chemical formula 12 under the presence of a radical polymerization initiator.

Chemical reaction 3-6

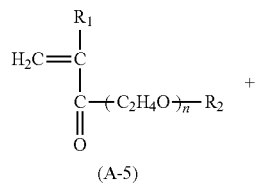

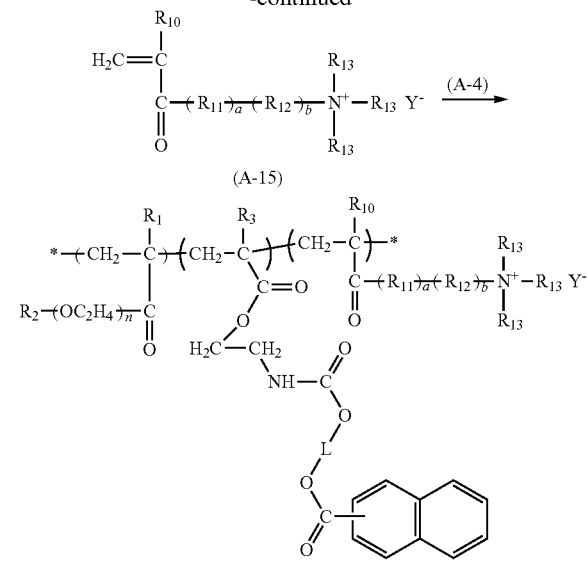

The copolymer having the structure unit represented by the Chemical formula 1, the structure unit represented by the Chemical formula 2, and the structure unit represented by the Chemical formula 13 is preferably synthesized from at least the compound represented by the following Chemical formula 4, the compound represented by the following Chemical formula 5, and the compound represented by the following Chemical formula 14 as the starting materials.

Chemical formula 4

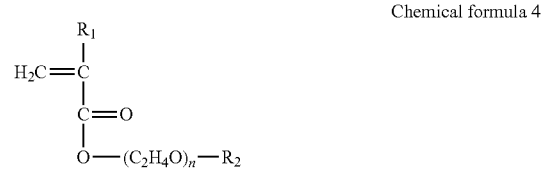

In the Chemical formula 4, $R_1$ and $R_2$ each, independently represent hydrogen atoms or methyl groups, and n represents a value in the range of from 1 to 90.

Chemical formula 5

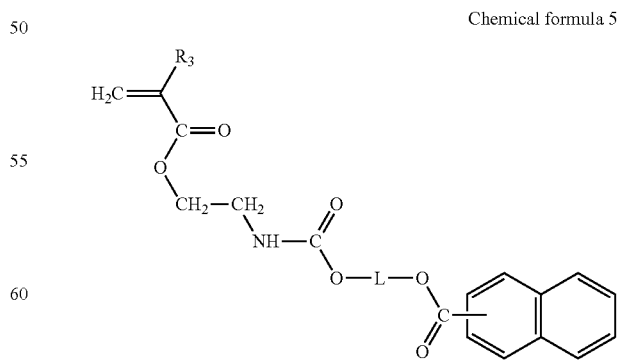

In the Chemical formula 5, $R_3$ represents a hydrogen atom or a methyl group and L represents an alkylene group having 2 to 18 carbon atoms.

Chemical formula 14

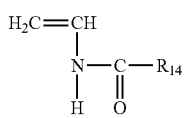

In the Chemical formula 14, $R_{14}$ represents a hydrogen atom or a methyl group.

For example, like the synthesis of the copolymer having the structure unit represented by the Chemical formula 1 and the structure unit represented by the Chemical formula 2, the copolymer (A-18) of the present disclosure having the structure unit represented by the Chemical formula 1, the structure unit represented by the Chemical formula 2, and the structure unit represented by the Chemical formula 13 is obtained by reacting 2-methacryloyloxyethyl isocyanate (A-3) and the naphthalene carboxylic acid hydroxy alkyl ester (A-2) to obtain the monomer (A-4) as a compound represented by the Chemical formula 5 and thereafter, as illustrated in the following Chemical reaction 3-7, copolymerizing the monomer (A-4), the compound represented by the Chemical formula 4, i.e., (methoxy)polyethylene glycol (mono)(meth)acrylate (A-5), and the compound (A-17) represented by the Chemical formula 14 under the presence of a radical polymerization initiator.

Chemical reaction 3-7

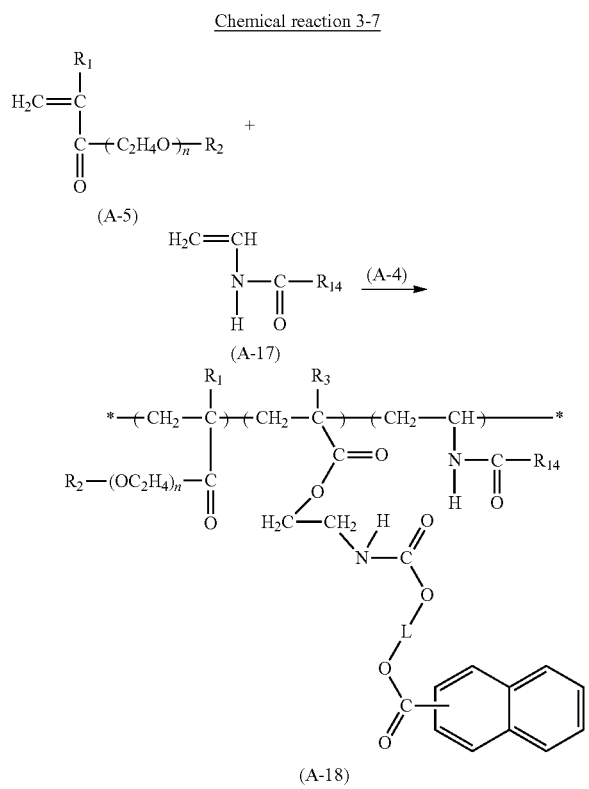

The radical polymerization initiator is not particularly limited and can be selected to a particular application. Specific examples thereof include, but are not limited to, peroxy ketal, hydroperoxide, dialkylperoxide, diacylperoxide, peroxydicarbonate, peroxyester, cyano-based azobisisobutylonitrile, azobis(2-methylbutylonitrike), azobis(2,2'-isovaleronitrile), and non-cyano-based dimethyl-2,2'-azobis isobutylate. Of these, organic peroxides and azo-based compounds are preferable and azo compounds are particularly preferable in terms of easiness of molecular weight control and low dissolution temperature.

In addition, the content of the radical polymerization initiator is not particularly limited and can be determined to a particular application. The content thereof is preferably from 1 percent by mass to 10 percent by mass based on the total amount of the polymerizable monomer.

To control the molecular weight of the polymer, a chain transfer agent is optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

The polymerization temperature is not particularly limited and can be selected to a particular application. It is preferably from 50 degrees C. to 150 degrees C. and more preferably from 60 degrees C. to 100 degrees C. The polymerization time is not particularly limited and can be suitably selected to a particular application. It is preferably from 3 hours to 48 hours.

The ink of the present disclosure includes water, a colorant, and a copolymer. The copolymer is the copolymer of the present disclosure.

The content of the copolymer in the ink is not particularly limited when used as a pigment dispersant. It is preferably from 10 parts by mass to 100 part by mass to 100 parts by mass of the pigment. When the content is within the range, a high image density is achieved. In addition, it is possible to use another dispersant in combination, preferably in the range not to have an adverse impact on the effect achieved by the dispersant of the copolymer.

The water includes deionized water, etc. and the content of the water in ink is preferably from 20 percent by mass to 60 percent by mass in the total content of the ink. Pigment and dyes can be used as the colorant for the ink of the present disclosure. With regard to the adsorption power of the copolymer to the colorant, pigments are superior to dyes. Moreover, pigments are preferable in terms of water resistance and light resistance.

In addition, the ink of the present disclosure preferably contains at least one kind of water soluble organic solvents and/or surfactants.

The pigments are not particularly limited. These can be selected to a particular application. For example, inorganic pigments or organic pigments for black or color are suitable. These can be used alone or in combination.

As the inorganic pigments, for example, it is possible to use carbon black manufactured by known methods such as contact methods, furnace methods, and thermal methods in addition to titanium oxide, iron oxide, calcium oxide, barium sulfate, aluminum hydroxide, barium yellow, cadmium red, and chrome yellow.

Specific examples of the pigments for black color include, but are not limited to, carbon black (C.I. Pigment Black 7) such as furnace black, lamp black, acetylene black, and channel black, metals such as copper and iron (C.I. Pigment Black 11), and metal oxides such as titanium oxides, and organic pigments such as aniline black (C.I. Pigment Black 1).

It is suitable to use carbon black which is manufactured by a furnace method or channel method and has a primary particle diameter of from 15 nm to 40 nm, a specific surface area of from 50 m$^2$/g to 300 m$^2$/g according to Brun-auer-Emmett-Teller (BET) method, a dibutylphthalate (DPB)

absorption oil amount of from 40 ml/100 g to 150 ml/100 g, a volatile content of from 0.5 percent to 10 percent, and pH of from 2 to 9.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

Of these pigments, in particular pigments having good affinity with water are preferably used.

Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

The dye chleates include, but are not limited to, bass dye type chleates, and acid dye type chleates.

The pigment for yellow is not particularly limited and can be selected to a particular application.

Specific examples thereof include, but are not limited to, C.I.Pigment Yellow 1, C.I.Pigment Yellow 2, C.I.Pigment Yellow 3, C.I.Pigment Yellow 12, C.I.Pigment Yellow 13, C.I.Pigment Yellow 14, C.I.Pigment Yellow 16, C.I.Pigment Yellow 17, C.I.Pigment Yellow 73, C.I.Pigment Yellow 74, C.I.Pigment Yellow 75, C.I.Pigment Yellow 83, C.I.Pigment Yellow 93, C.I.Pigment Yellow 95, C.I.Pigment Yellow 97, C.I.Pigment Yellow 98, C.I.Pigment Yellow 114, C.I.Pigment Yellow 120, C.I.Pigment Yellow 128, C.I.Pigment Yellow 129, C.I.Pigment Yellow 138, C.I.Pigment Yellow 150, C.I.Pigment Yellow 151, C.I.Pigment Yellow 154, C.I.Pigment Yellow 155, C.I.Pigment Yellow 174, and C.I.Pigment Yellow 180.

The pigment for magenta is not particularly limited and can be selected to a particular application.

Specific examples thereof include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

The pigment for cyan is not particularly limited and can be selected to a particular application.

Specific examples thereof include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pigment Pat Blue 4, and C.I.Pigment Pat Blue 60.

By using C.I.Pigment Yellow 74 as yellow pigment, C.I.Pigment Red 122 and C.I.Pigment Violet 19 as magenta pigment, and C.I.Pigment Blue 15:3 as cyan pigment, a well-balanced ink having excellent color tone and light resistance is obtained.

Colorants newly manufactured for the present disclosure can be used for the ink of the present disclosure.

In addition, in terms of coloring of obtained images, it is suitable to use a self-dispersion pigment and preferable to use anionic self-dispersion pigment. The anionic self-dispersion pigment is formed by introducing an anionic functional group to the surface of a pigment directly or via another atomic group to stabilize dispersion.

Conventional pigments can be used as the pigment before introducing an anionic functional group for stabilization of dispersion.

In the anionic functional group, more than a half of hydrogen ions are dissociated at pH 7.0. Specific examples of the anionic functional groups include, but are not limited to, a carboxyl group, a sulfo group, and a phosphonic acid group. Of these, to improve the optical density of obtained images, a carboxyl group or a phosphonic acid group is preferable.

An anionic functional group is introduced into the surface of a pigment by, for example, oxidation treatment of carbon black.

Specific methods of the oxidation treatment includes, but are not limited to, a method using hypochlorite, ozone water, hydrogen peroxide, chlorite, or nitric acid or a surface treatment method using a diazonium salt.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

The amount of the pigment in ink is not particularly limited. The amount can be suitably selected to a particular application. The amount preferably is from 0.5 percent by weight to 20 percent by mass and more preferably from 1 percent by mass to 10 percent by mass.

As the dye, dyes classified into acidic dyes, direct dyes, basic dyes, reactive dyes, and food dyes in the color index can be used.

Specific examples of the acid dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C.I. Food Black 1 and 2, C.I. Food Yellow 3 and 4, and C.I. Food Red 7, 9, and 14.

Specific examples of the direct dyes include, but are not limited to, C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102. Specific examples of the basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112. Specific examples of the reactive dyes include, but are not limited to, C.I. Reactive Black 3, 4, 7, 11, 12, and 17, C.I. Reactive Yellow 1, 5, 11, 13, 14, 20, 21, 22, 25, 40, 47, 51, 55, 65, and 67, C.I. Reactive Blue 1, 2, 7, 14, 15, 23, 32, 35, 38, 41, 63, 80, and 95, and C.I. Reactive Red 1, 14, 17, 25, 26, 32, 37, 44, 46, 55, 60, 66, 74, 79, 96, and 97.

The ink of the present disclosure preferably includes a water soluble organic solvent in order to enhance the permeation of the ink into plain paper, coated paper, etc., thereby further suppressing the occurrence of beading and preventing the ink from drying due to moisturizing effect.

The water soluble organic solvent is not particularly limited.

Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These can be used alone or in combination.

Of these, in terms of prevention of curling of plain paper, preferred are 3-ethyl-3-hydroxymethyloxetane, isopropylidene glycerol, N,N-dimethyl-β-methoxy propionamide, and N,N-dimethyl-β-buthoxy propionamide.

Of these, diethylene glycol, triethylene glycol, 1,3-butanediol, 2,2,4-trimethyl-1,3-pentanediol, and glycerin are excellent to prevent discharge failure ascribable to evaporation of water.

Specific examples of the water soluble organic solvents having permeation property and relatively low level of wettability include, but are not limited to, 2-ethyl-1,3-hexanediol (solubility: 4.2 percent at 25 degrees C.) and 2,2,4-trimethyl-1,3-pentanediol (solubility: 2.0 percent at 25 degrees C.).

Specific examples of the other water soluble organic solvents include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butane diol, 2,4-dimethyl-2,4-pentane diol, 2,5-dimethyl-2,5-hexane diol, and 5-hexene-1,2-diol.

Another water-soluble organic solvent that can be used in combination with the above-mentioned water soluble organic solvent can be appropriately selected to a particular application from alkyl or aryl ethers of polyhydric alcohols such as di ethylene glycol monobutyl ether, propyleneglycol monobutyl ether, ethylene glycol monophenyl ether, diethylene glycol monophenyl ether, ethylene glycol monoallyl ether, and tetraethylene glycol chlorphenyl ether; and lower alcohols such as ethanol.

Water soluble solvents are used to improve discharging stability of ink by imparting moisturizing effect. The content thereof is preferably from 10 percent by mass to 60 percent by mass to the total amount of ink. When the content is 10% by weight or more, the ink does not easily evaporate so that evaporation of the moisture of ink in the ink supplying system in an inkjet recording device is reduced, thereby preventing the ink from clogging. In addition, when the content is 60 percent by mass or less, the ink viscosity is suppressed to remain low even if a large amount of solid contents such as pigments, resins, etc. are contained, thereby producing images having high image density.

The ink of the present disclosure preferably includes a surfactant in order to enhance the permeation of the ink into plain paper, coated paper, etc., thereby further suppressing the occurrence of beading.

As the surfactants, for example, fluorine-containing surfactants, silicone-based surfactants, anionic surfactants, nonionic surfactants, and betaine-based surfactants can be suitably used. These surfactants can be used alone or in combination.

The surface tension of the ink is preferably 40 mN/m or less and more preferably 30 mN/m or less at 25 degrees C.

Of these, fluorine-containing surfactants and silicone-based surfactants are preferable because it can lower the surface tension of the ink to 30 mN/m or less.

The fluorine-containing surfactant include anionic fluorine-containing surfactants, nonionic fluorine-containing surfactants, amphoteric fluorine-containing surfactants, and oligomer type fluorine-containing surfactants. Of these, the fluorine-containing surfactant having 2 to 16 fluorine-substituted carbon atoms is preferable and the one having 4 to 16 fluorine-substituted carbon atoms is more preferable. When the number of the carbon atoms is not below 2, the specific effect of the fluorine-containing surfactant is demonstrated. When the number of the carbon atom is 16 or less, storage problem does not arise.

Specific examples of the nonionic fluorine-containing surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because of its low foaming property and the fluorine containing surfactant represented by the following Chemical formula I, the following Chemical formula II, or the following Chemical formula III is more preferable.

$CF_3CF_2(CF_2CF_2)_m\text{—}CF_2CF_2(CF_2CF_2)_nH$     Chemical formula I

In Chemical formula I, m represents 0 to 10 and n represents 0 to 40.

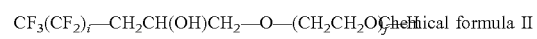

$CF_3(CF_2)_i\text{—}CH_2CH(OH)CH_2\text{—}O\text{—}(CH_2CH_2O)_j\text{—}$     Chemical formula II In the Chemical formula II, i and j each, independently represent values from 5 to 10.

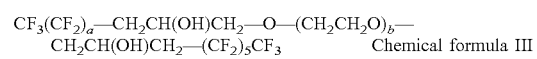

$CF_3(CF_2)_a\text{—}CH_2CH(OH)CH_2\text{—}O\text{—}(CH_2CH_2O)_b\text{—}$
$CH_2CH(OH)CH_2\text{—}(CF_2)_5CF_3$     Chemical formula III In the Chemical formula III, a and b each, independently represent values from 5 to 10.

Specific examples of the anionic fluorine-based surfactants include, but are not limited to, perfluoroalkyl sulfonic acid compounds, perfluoroalkyl carboxylic acid compounds, perfluoroalkyl phosphoric acid ester compounds, and polyoxyalkylene ether polymer compounds having a perfluoroalkyl ether group in its side chain.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorine-containing surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, and FS-300 UR (all manufactured by E. I. du Pont de Nemours and Company); FTERGENT FT-110, FT-250, FT-251, FT-400S, FT-150, and FT-400SW (all manufactured by NEOS COMPANY LIMITED); and POLYFOX PF-136A, PF-156A, PF-151N, PF-154, PF-159 (manufactured by OMNOVA SOLUTIONS INC.).

Of these, in terms of print quality, coloring and uniform dying for paper in particular, FS-300 (manufactured by E. I. du Pont de Nemours and Company), FTERGENT FT-110, FT-250, FT-251, FT-400S, FT-150 and FT-400SW (all manufactured by NEOS COMPANY LIMITED), and POLYFOX PF-151N (manufactured by OMNOVA SOLUTIONS INC.).

The silicone-based surfactant is not particularly limited and can be suitably selected to a particular application. Specific examples thereof include, but are not limited to, side-chain-modified polydimethyl siloxane, both end-modified polydimethylsiloxane, one end modified polydimethylsiloxane, and side-chain both end modified polydimethylsiloxane. In particular, a polyether-modified silicone-containing surfactant that has a polyoxyethylene group or a polyoxyethylene polyoxypropylene group is preferable because of its good characteristics as an aqueous surfactant.

Commercial silicone-based surfactants are easily available from, for example, BYK Japan KK, Shin-Etsu Chemical Co., Ltd., Dow Corning Toray Silicone Co., Ltd., NIHON EMULSION Co., Ltd., or Kyoeisha Chemical Co., Ltd.

Specific examples of the anionic surfactants include, but are not limited to, polyoxyethylene alkyl ether acetates, dodecyl benzene sulfonates, laurates, and salts of polyoxyethylene alkyl ether sulfates.

Specific examples of the nonionic surface active agents include, but are not limited to, polyoxyethylene alkyl ether, polyoxypropylene alkyl ether, polyoxyethylene alkyl esters, polyoxy ethylene sorbitan aliphatic esters, polyoxyethylene alkylphenyl ethers, polyoxyethylene alkyl amines, and polyoxyethylenealky amides.

Known additives such as pH regulators, preservatives and fungicides, corrosion inhibitors, anti-oxidants, ultraviolet absorbers, oxygen absorbers, and light stabilizers can be optionally selected and added to the ink of the present disclosure.

The pH regulator can be any agent capable of adjusting the pH in the range of from 8.5 to 11 without having an adverse impact on formulated ink and suitably selected to a particular application. Specific examples thereof include, but are not limited to, alcohol amines, hydroxides of alkali metal elements, hydroxides of ammonium, phosphonium hydroxides, and alkali metal carbonates. Specific examples of the alcohol amines include, but are not limited to, diethanol amine, triethanol amine, and 2-amino-2-ethyl-1, 3-propane diol. Specific examples of the alkali metal hydroxides include, but are not limited to, lithium hydroxide, sodium hydroxide, and potassium hydroxide. Specific examples of the hydroxides of ammonium include, but are not limited to, ammonium hydroxide and quaternary ammonium hydroxide. A specific example of the phosphonium hydroxides is quaternary phosphonium hydroxide. Specific examples of the alkali metal carbonates include, but are not limited to, lithium carbonate, sodium carbonate, and potassium carbonate.

Specific examples of the preservatives and fungicides include, but are not limited, dehydrosodium acetate, sodium sorbinate, 2-pyridine thiol-1-oxide sodium, sodium benzoate, and pentachlorophenol sodium.

Specific examples of the corrosion inhibitors include, but are not limited to, acid sulfite, thiosodium sulfate, thiodiglycolate ammon, diisopropyl ammonium nitrite, pentaerythritol tetranitrate, and dicyclohexyl ammonium nitrite.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

The ink of the present disclosure can be produced by, for example, dispersing or dissolving, in an aqueous medium, water, a water soluble organic solvent, a pigment, the above-described copolymer, and optional other components followed by stirring and mixing. The copolymer may be used as a pigment dispersion resin when preparing a pigment dispersion.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc.

During the production, coarse particles are optionally filtered off with a filter, a centrifuge, etc. optionally followed by degassing.

The properties of the ink of the present disclosure is not particularly limited and can be suitably selected to a particular application. For example, the viscosity, the surface tension, etc, are preferable in the following ranges.

The viscosity of the ink is from 3 mPa·S to 20 mPa·S at 25 degrees C. When the ink viscosity is 3 mPa·s or greater, the printing density and the printing quality of the ink are improved. When the ink viscosity is 20 mPa·s or less, a suitable ink discharging property is secured.

The viscosity can be measured by, for example, a viscometer (RE-80L, manufactured by TOKI SANGYO CO., LTD.) at 25 degree C.

The ink container of the present disclosure includes an ink containing unit to contain the ink of the present disclosure. Furthermore, the ink container may optionally include other members.

The container is not particularly limited. The form, the structure, the size, and the material thereof can be suitably determined to a particular application. For example, a container having at least an ink containing unit made of aluminum laminate film, a resin film, etc. is suitable.

Next, the ink container is described in detail with reference to FIGS. 1 and 2.

Figure 2:
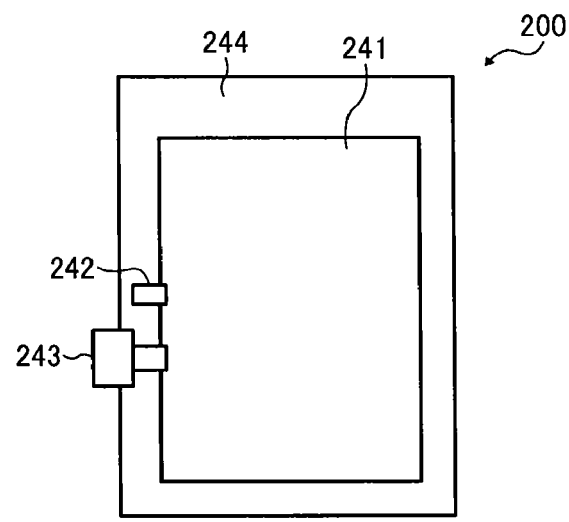
FIG. 2 is a diagram illustrating the ink container illustrated in FIG. 1 including its housing.

FIG. 1 is a diagram illustrating an example of the ink container. FIG. 2 is a diagram illustrating the ink container illustrated in FIG. 1 including the housing thereof. In an ink container 200, the ink is supplied to an ink containing unit 241 through an ink inlet 242, the air remaining in the ink containing unit 241 is discharged, and thereafter the ink inlet 242 is closed by fusion.

When in use, an ink outlet 243 made of rubber is pierced by the needle installed onto an inkjet recording device to supply the ink into the device. The ink accommodating unit 241 is made of a packaging material such as aluminum laminate film having no air permeability. As illustrated in FIG. 2, the ink containing unit 241 is typically housed in a containing unit housing 244 made of plastic and detachably attachable to a various inkjet recording devices.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples but not limited thereto.

The molecular weight and the viscosity of the copolymers obtained in Examples and Comparative Examples were obtained as follows.

Measuring of Molecular Weight of Copolymer

The molecular weight was measure by Gel Permeation Chromatography (GPC) under the following conditions:
  Device: GPC-8020 (manufactured by TOSOH CORPORATION)
  Column: TSK G2000 HXL and G4000 HXL (manufactured by TOSOH CORPORATION)
  Temperature: 40 degrees C.
  Solvent: tetrahydrofuran (THF)
  Flow speed: 1.0 mL/minute 1 mL of the copolymer having a concentration of 0.5 percent by mass was infused into the column and the number average molecular weight Mn and the weight average molecular weight Mw were calculated by using the molecular weight calibration curve obtained based on a simple dispersion polystyrene standard sample from the molecular weight distribution of the copolymer measured under the conditions specified above.

Measuring of Viscosity of Copolymer

The viscosity of 6.5% by weight aqueous solution of the synthesized copolymer was measured at 25 degrees C. by using a rotation viscometer (Viscometer RE80L, Cone plate type, manufactured by TOKI SANGYO CO., LTD.). Specific operations are as follows. 1.1 mL of 6.5 percent by mass aqueous solution of the copolymer was taken and charged into a sample cup of the viscometer. The cup was mounted onto the viscometer and left still for one minute. Thereafter, the rotor of the viscometer was rotated to read the value one minute later. The number of rotation at the time of viscosity measuring was controlled to be constant in the torque range of from 40 percent to 80 percent.

Example I-1

Synthesis of Copolymer CP 1-1

62.0 g (525 mmol) of 1,6-hexanediol (manufactured by Tokyo Chemical Industry Co., Ltd.) was dissolved in 700 mL of dichloromethane (manufactured by Tokyo Chemical Industry Co., Ltd.) and 20.7 g (262 mmol) of pyridine was further added.

To this solution, a solution in which 50.0 g (262 mmol) of 2-naphthalene carbonyl chloride (manufacture by Tokyo Chemical Industry Co., Ltd.) was dissolved in 100 ml of dichloromethane (manufactured by Tokyo Chemical Industry Co., Ltd.) was dripped in two hours followed by stirring at room temperature for six hours. The thus-obtained reaction solution was rinsed with water and thereafter the organic phase was isolated followed by drying with magnesium sulfate and the solvent was distilled away. The remainder was refined by silica gel column chromatography with a solvent mixture of a dichloromethane and methanol with a volume ratio of 98:2 serving as an eluent to obtain 52.5 g of 2-naphthoic acid-2-hydroxyethyl ester.

Next, 42.1 g (155 mmol) of 2-naphthoic acid-2-hydroxyethyl ester was dissolved in 80 mL of dried methylethylketone followed by heating to 60 degrees C. To this solution, a solution in which 24.0 g (155 mmol) of 2-methacryloyloxy ethylisocyanate (Karenz MOI, manufactured by SHOWA DENKO K.K.) was dissolved in 20 mL of dried methylketone was dripped in one hour while being stirred followed by stirring at 70 degrees C. for 12 hours. After being cooled down to room temperature, the solvent was distilled away. The remainder was refined by silica gel column chromatography with a solvent mixture of a dichloromethane and methanol with a volume ratio of 99:1 serving as an eluent to obtain 57.0 g of a monomer M-1 represented by the following Chemical structure 5-1.

Chemical structure 5-1

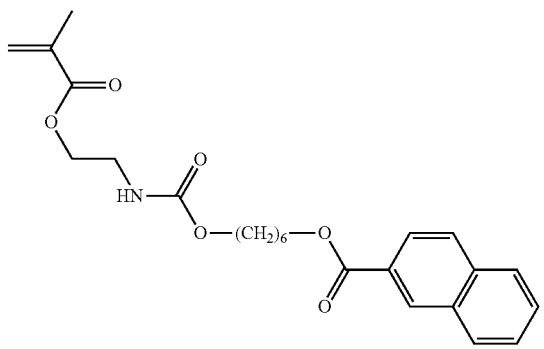

Figure 3:
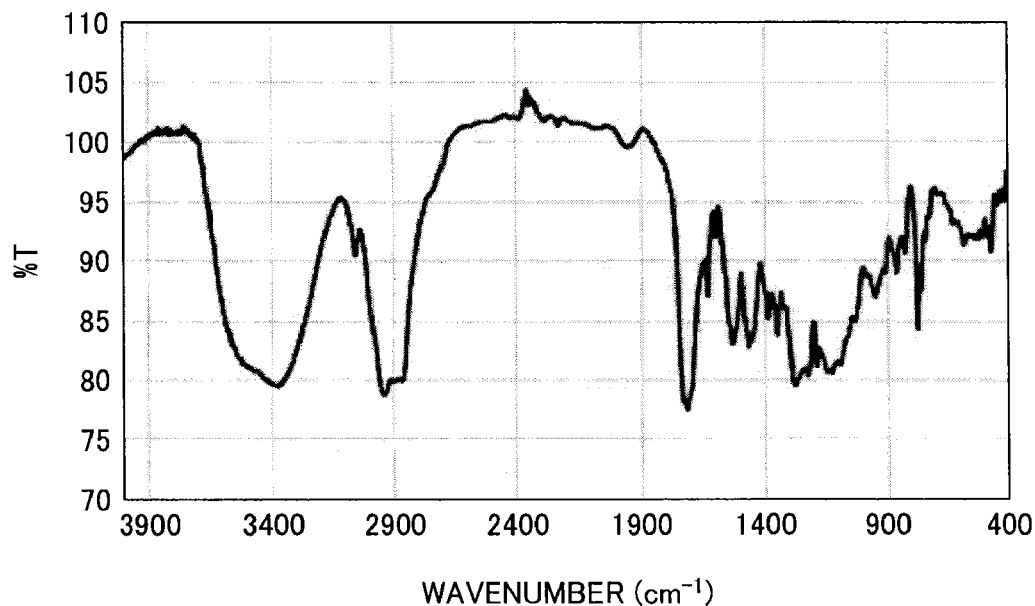
FIG. 3 is a graph illustrating IR spectrum of the copolymer CP 1-1 obtained in Example I-1 described later.

Thereafter, 5.35 g (18.83 mmol) of polyethylene gylcol monomethacrylate (n: nearly equal to 4.5, manufactured by NOF CORPORATION) and 2.68 g (6.3 mmol) of the monomer M-1 were dissolved in 40 mL of dried methylethyl ketone to prepare a monomer solution. The monomer solution was divided into two with a mass ratio of 1 to 9. Thereafter, the 10 percent of the monomer solution was heated to 75 degrees C. in an argon atmosphere. 0.206 g (1.26 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. The precipitated copolymer was collected and dissolved in THF. The solvent of the solution was removed by a rotary evaporator followed by drying with a reduced pressure to obtain 8.00 g of a copolymer CP 1-1 (weight average molecular weight (Mw): 12,500, number average molecular weight (Mn): 7,100). FIG. 3 is a graph illustrating IR spectrum of the obtained Copolymer CP 1-1.

Thereafter, an aqueous solution of the thus-obtained copolymer CP 1-1 was prepared in such a manner that the concentration of the copolymer was 10 percent.

Example I-2

Synthesis of Copolymer CP 1-2

A monomer M-2 represented by the following Chemical structure 5-2 was obtained in the same manner as in Example I-1 except that 1,6-hexanediol was replaced with ethylene glycol (manufactured by TOKYO CHEMICAL INDUSTRY CO., LTD.).

Chemical structure 5-2

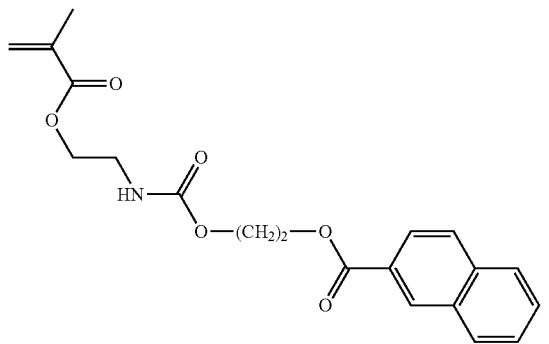

Thereafter, using polyethyleneglycol monomethacrylate (n: nearly equal to 4.5) and the obtained monomer M-2, a copolymer CP 1-2 (weight average molecular weight (Mw): 12,000, number average molecular weight (Mn): 7,000) was obtained in the same manner as in Example I-1 and an aqueous solution of the copolymer CP 1-2 was prepared in the same manner as in Example I-1. The IR spectrum of the thus-obtained copolymer CP 1-2 was similar to that of the copolymer CP 1-1.

Example I-3

Synthesis of Copolymer CP 1-3

A monomer M-3 represented by the following Chemical structure 5-3 was obtained in the same manner as in Example I-1 except that 1,6-hexanediol was replaced with 1,12-dodecane diol (manufactured by TOKYO CHEMICAL INDUSTRY CO., LTD.).

Chemical structure 5-3

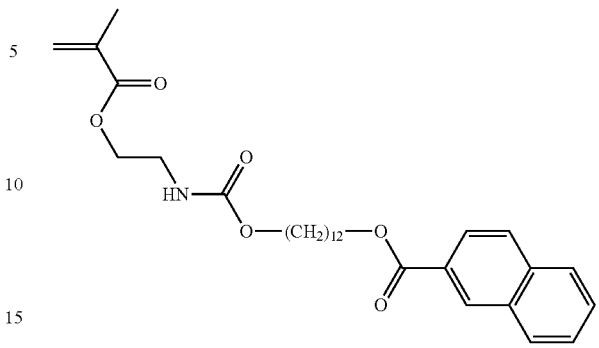

Thereafter, using polyethyleneglycol monomethacrylate (n: nearly equal to 4.5) and the obtained monomer M-3, a copolymer CP 1-3 (weight average molecular weight (Mw): 12,800, number average molecular weight (Mn): 7,200) was obtained in the same manner as in Example I-1 and an aqueous solution of the copolymer CP 1-3 was prepared in the same manner as in Example I-1. The IR spectrum of the thus-obtained copolymer CP 1-3 was similar to that of the copolymer CP 1-1.

Example I-4

Synthesis of Copolymer CP 1-4

A monomer M-4 represented by the following Chemical structure 5-4 was obtained in the same manner as in Example I-1 except that 1,6-hexanediol was replaced with 1,16-hexadecane diol (manufactured by TOKYO CHEMICAL INDUSTRY CO., LTD.).

Chemical structure 5-4

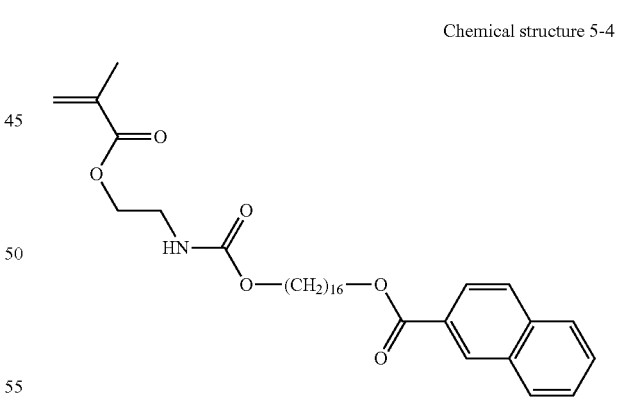

Thereafter, using polyethyleneglycol monomethacrylate (n: nearly equal to 4.5) and the obtained monomer M-4, a copolymer CP 1-4 (weight average molecular weight (Mw): 13,500, number average molecular weight (Mn): 7,500) was obtained in the same manner as in Example I-1 and an aqueous solution of the copolymer CP 1-4 was prepared in the same manner as in Example I-1. The IR spectrum of the thus-obtained copolymer CP 1-4 was similar to that of the copolymer CP 1-1.

Examples I-5 to I-11: Synthesis of Copolymers CP 1-5A to CP 1-8 Copolymers CP 1-5A to CP 1-8 were obtained in the same manner as in Example I-1 except that polyethylene glycol monoacrylate (n: nearly equal to 4.5) (manufactured by NOF CORPORATION) and the monomer M-1 were changed to the combinations and ratios shown in Table 1-1 of polyethylene glycol (n: nearly equal to 4.5) (manufactured by NOF CORPORATION), methoxypolyethyleneglycol methacrylate (n: nearly equal to 4) (manufactured by NOF CORPORATION), polyethyleneglycol monomethacrylate (n: nearly equal to 2) (manufactured by NOF CORPORATION), polyethyleneglycol monomethacrylate (n: nearly equal to 8) (manufactured by NOF CORPORATION), or polyethyleneglycol monomethacrylate (n: nearly equal to 4.5) and the monomer M-1. Thereafter, aqueous solutions of the copolymers CP 1-5A to CP 1-8 were prepared in the same manner as in Example I-1.

The weight average molecular weight (Mw) and the number average molecular weight (Mn) of thus-obtained copolymers are shown in Table 1-1.

The IR spectra of the thus-obtained copolymers CP 1-5C, CP 1-5D, and CP 1-6 were similar to that of the copolymer CP 1-1.

Example I-12

Synthesis of Copolymer CP 1-9

A monomer M-5 represented by the following Chemical structure 5-5 was obtained in the same manner as in Example I-1 except that 2-methacryloyloxy ethylosocyanate was replaced with 2-acryloyloxyethylisocyanate.

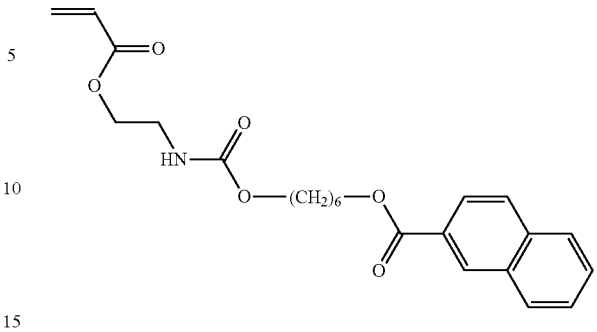

Chemical structure 5-5

Thereafter, using polyethyleneglycol monomethacrylate (n: nearly equal to 4.5) and the obtained monomer M-5, a copolymer CP 1-9 (weight average molecular weight (Mw): 12,600, number average molecular weight (Mn): 7,200) was obtained in the same manner as in Example I-1 and an aqueous solution of the copolymer CP 1-9 was prepared in the same manner as in Example I-1. The IR spectrum of the thus-obtained copolymer CP 1-9 was similar to that of the copolymer CP 1-1.

Example I-13

Synthesis of Copolymer CP 1-10

Thereafter, using 2-hydroxyethyl methacrylate (n=1) and the monomer M-1 synthesized in Example I-1, a copolymer CP 1-10 (weight average molecular weight (Mw): 11,900, number average molecular weight (Mn): 6,700) was obtained in the same manner as in Example I-1 to prepare an aqueous solution of the copolymer CP 1-10 in the same manner as in Example I-1.

The IR spectrum of the thus-obtained copolymer CP 1-10 was similar to that of the copolymer CP 1-1.

TABLE 1-1

|  | Copolymer | Structure unit 1 | Structure unit 2 | Molar ratio Structure unit 1 | Structure unit 2 |
|---|---|---|---|---|---|
| Example I-1 | CP 1-1 | Polyethyleneglycol monomethacrylate | M-1 | 3.0 | 1.0 |
| Example I-2 | CP 1-2 | Polyethyleneglycol monomethacrylate | M-2 | 3.0 | 1.0 |
| Example I-3 | CP 1-3 | Polyethyleneglycol monomethacrylate | M-3 | 3.0 | 1.0 |
| Example I-4 | CP 1-4 | Polyethyleneglycol monomethacrylate | M-4 | 3.0 | 1.0 |
| Example I-5 | CP 1-5A | Polyethyleneglycol monoacrylate | M-1 | 3.0 | 1.0 |
| Example I-6 | CP 1-5B | Methoxypolyethylene glycol methacrylate | M-1 | 3.0 | 1.0 |
| Example I-7 | CP 1-5C | Polyethyleneglycol monomethacrylate | M-1 | 3.0 | 1.0 |
| Example I-8 | CP 1-5D | Polyethyleneglycol monomethacrylate | M-1 | 3.0 | 1.0 |
| Example I-9 | CP 1-6 | Polyethyleneglycol monomethacrylate | M-1 | 1.0 | 1.0 |
| Example I-10 | CP 1-7 | Polyethyleneglycol monomethacrylate | M-1 | 5.0 | 1.0 |
| Example I-11 | CP 1-8 | Polyethyleneglycol monomethacrylate | M-1 | 7.0 | 1.0 |

TABLE 1-1-continued

| | | | | | |
|---|---|---|---|---|---|
| Example I-12 | CP 1-9 | Polyethyleneglycol monomethacrylate | M-5 | 3.0 | 1.0 |
| Example I-13 | CP 1-10 | 2-hydroxyethyl methacrylate | M-1 | 3.0 | 1.0 |

| | Structure unit 1 | | | Structure unit 2 | | | |
|---|---|---|---|---|---|---|---|
| | $R_1$ | $R_2$ | n | $R_3$ | L | Mw | Mn |
| Example I-1 | $CH_3$ | H | 4.5 | $CH_3$ | —$(CH_2)_6$— | 12,500 | 7,100 |
| Example I-2 | $CH_3$ | H | 4.5 | $CH_3$ | —$(CH_2)_2$— | 12,000 | 7,000 |
| Example I-3 | $CH_3$ | H | 4.5 | $CH_3$ | —$(CH_2)_{12}$— | 12,800 | 7,200 |
| Example I-4 | $CH_3$ | H | 4.5 | $CH_3$ | —$(CH_2)_{16}$— | 13,500 | 7,500 |
| Example I-5 | H | H | 4.5 | $CH_3$ | —$(CH_2)_6$— | 12,400 | 7,000 |
| Example I-6 | $CH_3$ | $CH_3$ | 4 | $CH_3$ | —$(CH_2)_6$— | 12,700 | 7,200 |
| Example I-7 | $CH_3$ | H | 2 | $CH_3$ | —$(CH_2)_6$— | 12,100 | 6,900 |
| Example I-8 | $CH_3$ | H | 8 | $CH_3$ | —$(CH_2)_6$— | 13,000 | 7,500 |
| Example I-9 | $CH_3$ | H | 4.5 | $CH_3$ | —$(CH_2)_6$— | 13,500 | 7,700 |
| Example I-10 | $CH_3$ | H | 4.5 | $CH_3$ | —$(CH_2)_6$— | 12,100 | 6,900 |
| Example I-11 | $CH_3$ | H | 4.5 | $CH_3$ | —$(CH_2)_6$— | 11,900 | 6,800 |
| Example I-12 | $CH_3$ | H | 4.5 | H | —$(CH_2)_6$— | 12,600 | 7,200 |
| Example I-13 | $CH_3$ | H | 1 | $CH_3$ | —$(CH_2)_6$— | 11,900 | 6,700 |

Examples I'-1 to I'-9

Synthesis of Copolymers CP 1'-1 to CP 1'-9

Copolymers CP 1'-1 to CP 1'-9 were obtained in the same manner as in Example I-1 except that polyethylene glycol monomethacrylate (n: nearly equal to 4.5) (manufactured by NOF CORPORATION) and the monomer M-1 were changed to the combinations and ratios shown in Table 1-2 of methoxypolyethyleneglycol methacrylate (n: nearly equal to 2, 4.5, 9, 23, or 90) (manufactured by NOF CORPORATION) and the monomer M-1. Thereafter, aqueous solutions of the copolymers CP 1'-1 to CP 1'-9 were prepared in the same manner as in Example I-1.

The weight average molecular weight (Mw) and the number average molecular weight (Mn) of the thus-obtained copolymers are shown in Table 1-2.

The IR spectra of the thus-obtained copolymers CP 1'-1 to CP 1'-9 were similar to that of the copolymer CP 1-1.

TABLE 1-2

| | | | | Molar ratio | |
|---|---|---|---|---|---|
| | Copolymer | Structure unit 1 | Structure unit 2 | Structure unit 1 | Structure unit 2 |
| Example I'-1 | CP 1'-1 | Methoxypolyethyleneglycol methacrylate | M-1 | 3.0 | 1.0 |
| Example I'-2 | CP 1'-2 | Methoxypolyethyleneglycol methacrylate | M-1 | 3.0 | 1.0 |
| Example I'-3 | CP 1'-3 | Methoxypolyethyleneglycol methacrylate | M-1 | 3.0 | 1.0 |
| Example I'-4 | CP 1'-4 | Methoxypolyethyleneglycol methacrylate | M-1 | 3.0 | 1.0 |
| Example I'-5 | CP 1'-5 | Methoxypolyethyleneglycol methacrylate | M-1 | 1.0 | 1.0 |
| Example I'-6 | CP 1'-6 | Methoxypolyethyleneglycol methacrylate | M-1 | 0.50 | 1.0 |
| Example I'-7 | CP 1'-7 | Methoxypolyethyleneglycol methacrylate | M-1 | 3.0 | 1.0 |
| Example I'-8 | CP 1'-8 | Methoxypolyethyleneglycol methacrylate | M-1 | 1.0 | 1.0 |

TABLE 1-2-continued

| Example I'-9 | CP 1'-9 | Methoxypolyethyleneglycol methacrylate | M-1 | 0.50 | 1.0 |
|---|---|---|---|---|---|

| | Structure unit 1 | | | Structure unit 2 | | | |
|---|---|---|---|---|---|---|---|
| | $R_1$ | $R_2$ | n | $R_3$ | L | Mw | Mn |
| Example I'-1 | $CH_3$ | $CH_3$ | 2 | $CH_3$ | —$(CH_2)_6$— | 13,200 | 5,800 |
| Example I'-2 | $CH_3$ | $CH_3$ | 4.5 | $CH_3$ | —$(CH_2)_6$— | 12,600 | 4,800 |
| Example I'-3 | $CH_3$ | $CH_3$ | 9 | $CH_3$ | —$(CH_2)_6$— | 13,000 | 5,000 |
| Example I'-4 | $CH_3$ | $CH_3$ | 23 | $CH_3$ | —$(CH_2)_6$— | 12,400 | 4,900 |
| Example I'-5 | $CH_3$ | $CH_3$ | 23 | $CH_3$ | —$(CH_2)_6$— | 14,000 | 5,300 |
| Example I'-6 | $CH_3$ | $CH_3$ | 23 | $CH_3$ | —$(CH_2)_6$— | 12,200 | 4,400 |
| Example I'-7 | $CH_3$ | $CH_3$ | 90 | $CH_3$ | —$(CH_2)_6$— | 12,900 | 5,100 |
| Example I'-8 | $CH_3$ | $CH_3$ | 90 | $CH_3$ | —$(CH_2)_6$— | 13,600 | 5,600 |
| Example I'-9 | $CH_3$ | $CH_3$ | 90 | $CH_3$ | —$(CH_2)_6$— | 14,300 | 5,600 |

Example I-14

Synthesis of Copolymer CP 2-1

Figure 4:
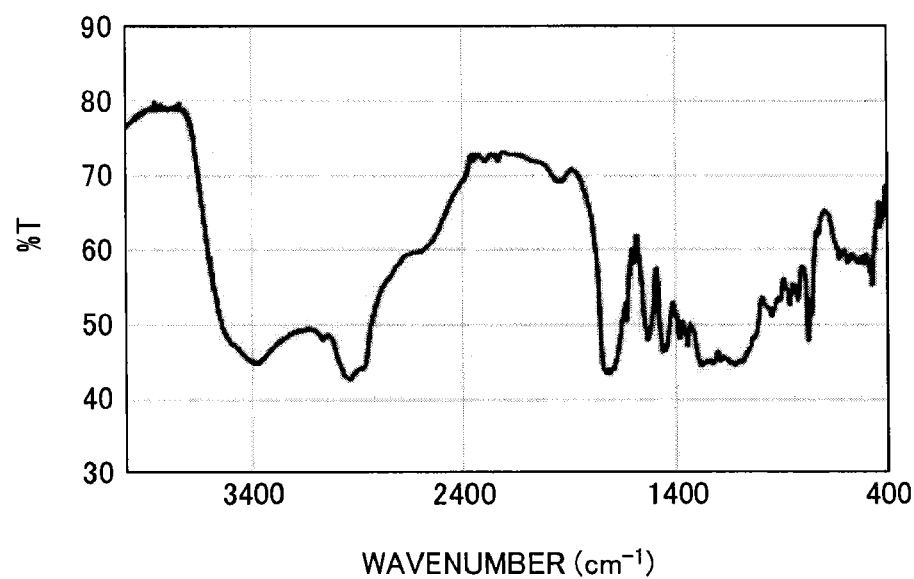
FIG. 4 is a graph illustrating IR spectrum of the copolymer CP 2-1 obtained in Example I-14 described later.

2.67 g (9.4 mmol) of polyethylenegylcol monomethacrylate (n: nearly equal to 4.5, manufactured by NOF CORPORATION) and 1.36 g (18.8 mmol) of acrylic acid, and 4.02 g (9.4 mmol) of the monomer M-1 synthesized in Example I-1 were dissolved in 40 mL of dried methylethyl ketone to prepare a monomer solution. The monomer solution was divided into two with a mass ratio of 1 to 9. Thereafter, the 10 percent of the monomer solution was heated to 75 degrees C. in an argon atmosphere. 0.309 g (1.88 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The precipitated copolymer was dissolved in THF followed by evaporation and drying with a reduced pressure to obtain 8.00 g of a copolymer (weight average molecular weight (Mw): 15,200, number average molecular weight (Mn): 8,700). FIG. 4 is a graph illustrating IR spectrum of the obtained copolymer.

Thereafter, the obtained copolymer was dissolved in tetraethyl ammonium hydroxide aqueous solution in such a manner that the concentration of the copolymer was 10 percent and the pH thereof was 8.0 to prepare an aqueous solution of the copolymer CP 2-1.

Example I-15

Synthesis of Copolymer CP 2-1'

Using polyethyleneglycol monomethacrylate (n: nearly equal to 4.5) (manufactured by NOF CORPORATION), methacrylic acid, and the monomer M-1 synthesized in Example 1-1, a copolymer 2-1' having a weight average molecular weight (Mw) of 15,000 and a number average molecular weight (Mn) of 8,600 was obtained in the same manner as in Example I-14. An aqueous solution of the copolymer CP 2-1' was prepared in the same manner as in Example I-14.

Example I-16

Synthesis of Copolymer CP 2-1"

Using polyethyleneglycol monomethacrylate (n: nearly equal to 4.5), acrylic acid, and the monomer M-1 synthesized in Example I-1, a copolymer CP 2-1" having a weight average molecular weight (Mw) of 15,200 and a number average molecular weight (Mn) of 8,700 was obtained in the same manner as in Example I-14. An aqueous solution of the copolymer CP 2-1" was prepared in the same manner as in Example I-14 except that sodium hydroxide aqueous solution was used instead of tetraethyl ammonium hydroxide aqueous solution.

Examples I-17 to I-28

Synthesis of Copolymers CP 2-2 to CP 2-10

Copolymers CP 2-2 to CP 2-10 were obtained in the same manner as in Example I-14 except that polyethylene glycol monomethacrylate (n: nearly equal to 4.5) (manufactured by NOF CORPORATION), acrylic acid, and the monomer M-1 were changed to the combinations and ratios shown in Table 2 of polyethylene glycol monomethacrylate (n: nearly equal to 4.5) (manufactured by NOF CORPORATION), polyethylene glycol monoacrylate (n: nearly equal to 4.5) (manufactured by NOF CORPORATION), methoxypolyethyleneglycol methacrylate (n: nearly equal to 4) (manufactured by NOF CORPORATION), polyethyleneglycol monomethacrylate (n: nearly equal to 2) (manufactured by NOF CORPORATION), polyethyleneglycol monomethacrylate (n: nearly equal to 8) (manufactured by NOF CORPORATION), or 2-hydroxydiethyl methacrylate (n=1), acrylic acid, and one of the monomers M-1 to M-5 synthesized in Examples I-1 to I-4 and I-12. Thereafter, aqueous solutions of the copolymers CP 2-2 to CP 2-10 were prepared in the same manner as in Example I-14.

The weight average molecular weight (Mw) and the number average molecular weight (Mn) of thus-obtained copolymers are shown in Table 2.

The IR spectra of the thus-obtained copolymers CP 2-2, CP 2-3, CP 2-4, CP 2-5C, CP 2-5D, CP 2-6, CP 2-7, CP 2-9, and CP 2-10 were similar to that of the copolymer CP 2-1.

TABLE 2

| | Copolymer | Structure unit 1 | Structure unit 2 | Structure unit 3 |
|---|---|---|---|---|
| Example I-14 | CP 2-1 | Polyethyleneglycol monomethacrylate | M-1 | Acrylic acid |
| Example I-15 | CP 2-1' | Polyethyleneglycol monomethacrylate | M-1 | Methacrylic acid |
| Example I-16 | CP 2-1' | Polyethyleneglycol monomethacrylate | M-1 | Acrylic acid |
| Example I-17 | CP 2-2 | Polyethyleneglycol monomethacrylate | M-2 | Acrylic acid |
| Example I-18 | CP 2-3 | Polyethyleneglycol monomethacrylate | M-3 | Acrylic acid |
| Example I-19 | CP 2-4 | Polyethyleneglycol monomethacrylate | M-4 | Acrylic acid |
| Example I-20 | CP 2-5A | Polyethyleneglycol monoacrylate | M-1 | Acrylic acid |
| Example I-21 | CP 2-5B | Methoxypolyethylene glycol methacrylate | M-1 | Acrylic acid |
| Example I-22 | CP 2-5C | Polyethyleneglycol monomethacrylate | M-1 | Acrylic acid |
| Example I-23 | CP 2-5D | Polyethyleneglycol monomethacrylate | M-1 | Acrylic acid |
| Example I-24 | CP 2-6 | Polyethyleneglycol monomethacrylate | M-1 | Acrylic acid |
| Example I-25 | CP 2-7 | Polyethyleneglycol monomethacrylate | M-1 | Acrylic acid |
| Example I-26 | CP 2-8 | Polyethyleneglycol monomethacrylate | M-1 | Acrylic acid |
| Example I-27 | CP 2-9 | Polyethyleneglycol monomethacrylate | M-5 | Acrylic acid |
| Example I-28 | CP 2-10 | 2-hydroxyethyl methacrylate | M-1 | Acrylic acid |

| | Molar ratio | | |
|---|---|---|---|
| | Structure unit 1 | Structure unit 2 | Structure unit 3 |
| Example I-14 | 1.0 | 1.0 | 2.0 |
| Example I-15 | 1.0 | 1.0 | 2.0 |
| Example I-16 | 1.0 | 1.0 | 2.0 |
| Example I-17 | 1.0 | 1.0 | 2.0 |
| Example I-18 | 1.0 | 1.0 | 2.0 |
| Example I-19 | 1.0 | 1.0 | 2.0 |
| Example I-20 | 1.0 | 1.0 | 2.0 |
| Example I-21 | 1.0 | 1.0 | 2.0 |
| Example I-22 | 1.0 | 1.0 | 2.0 |
| Example I-23 | 1.0 | 1.0 | 2.0 |
| Example I-24 | 0.8 | 1.0 | 1.5 |
| Example I-25 | 1.5 | 1.0 | 2.4 |
| Example I-26 | 1.8 | 1.0 | 2.6 |

TABLE 2-continued

| | | | | | | |
|---|---|---|---|---|---|---|
| Example I-27 | 1.0 | | 1.0 | | 2.0 | |
| Example I-28 | 1.0 | | 1.0 | | 2.0 | |

| | Structure unit 1 | | | Structure unit 2 | | Structure unit 3 | | | |
|---|---|---|---|---|---|---|---|---|---|
| | $R_1$ | $R_2$ | n | $R_3$ | L | $R_4$ | X | Mw | Mn |
| Example I-14 | $CH_3$ | H | 4.5 | $CH_3$ | $-(CH_2)_6-$ | H | TEA | 15,200 | 8,700 |
| Example I-15 | $CH_3$ | H | 4.5 | $CH_3$ | $-(CH_2)_6-$ | $CH_3$ | TEA | 15,000 | 8,600 |
| Example I-16 | $CH_3$ | H | 4.5 | $CH_3$ | $-(CH_2)_6-$ | H | $Na^+$ | 15,200 | 8,700 |
| Example I-17 | $CH_3$ | H | 4.5 | $CH_3$ | $-(CH_2)_2-$ | H | TEA | 14,700 | 8,600 |
| Example I-18 | $CH_3$ | H | 4.5 | $CH_3$ | $-(CH_2)_{12}-$ | H | TEA | 15,500 | 8,800 |
| Example I-19 | $CH_3$ | H | 4.5 | $CH_3$ | $-(CH_2)_{16}-$ | H | TEA | 16,100 | 8,900 |
| Example I-20 | H | H | 4.5 | $CH_3$ | $-(CH_2)_6-$ | H | TEA | 15,100 | 8,600 |
| Example I-21 | $CH_3$ | $CH_3$ | 4 | $CH_3$ | $-(CH_2)_6-$ | H | TEA | 15,400 | 8,800 |
| Example I-22 | $CH_3$ | H | 2 | $CH_3$ | $-(CH_2)_6-$ | H | TEA | 14,800 | 8,500 |
| Example I-23 | $CH_3$ | H | 8 | $CH_3$ | $-(CH_2)_6-$ | H | TEA | 15,700 | 9,000 |
| Example I-24 | $CH_3$ | H | 4.5 | $CH_3$ | $-(CH_2)_6-$ | H | TEA | 16,200 | 9,300 |
| Example I-25 | $CH_3$ | H | 4.5 | $CH_3$ | $-(CH_2)_6-$ | H | TEA | 14,800 | 8,500 |
| Example I-26 | $CH_3$ | H | 4.5 | $CH_3$ | $-(CH_2)_6-$ | H | TEA | 14,600 | 8,400 |
| Example I-27 | $CH_3$ | H | 4.5 | H | $-(CH_2)_6-$ | H | TEA | 15,200 | 8,700 |
| Example I-28 | $CH_3$ | H | 1 | $CH_3$ | $-(CH_2)_6-$ | H | TEA | 14,700 | 8,300 |

Example I-29

Synthesis of Copolymer CP 3-1

Figure 5:
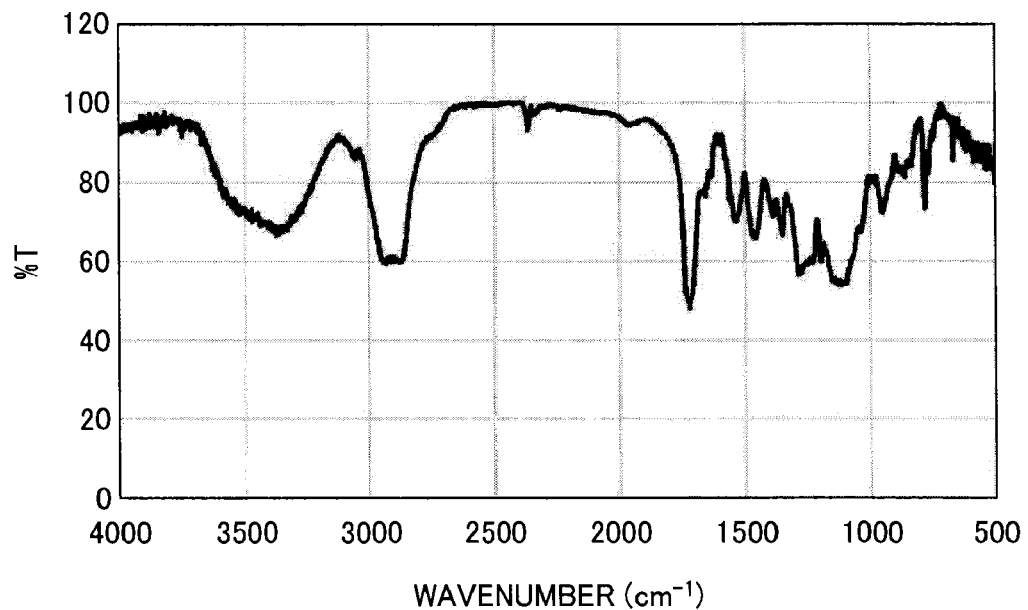
FIG. 5 is a graph illustrating IR spectrum of the copolymer CP 3-1 obtained in Example I-29 described later.

4.70 g (16.55 mmol) of polyethylenegylcol monomethacrylate (n: nearly equal to 4.5, manufactured by NOF CORPORATION), 0.56 g (3.31 mmol) of diacetone acrylamide (DAAM, manufactured by TOKYO CHEMICAL INDUSTRY CO., LTD.), and 2.83 g (6.62 mmol) of the monomer M-1 synthesized in Example I-1 were dissolved in 40 mL of dried methylethyl ketone to prepare a monomer solution. The monomer solution was divided into two with a mass ratio of 1 to 9. Thereafter, the 10 percent of the monomer solution was heated to 75 degrees C. in an argon atmosphere. 0.22 g (1.32 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to n-hexane to precipitate a copolymer. Supernatant solution was discarded and the precipitated copolymer was obtained. The precipitated copolymer was dissolved in THF followed by evaporation and drying with a reduced pressure to obtain 8.00 g of a copolymer (weight average molecular weight (Mw): 6,800, number average molecular weight (Mn): 1,900). FIG. 5 is a graph illustrating IR spectrum of the obtained Copolymer.

Thereafter, an aqueous solution of the thus-obtained copolymer CP 3-1 was prepared in such a manner that the concentration of the copolymer was 10 percent.

Examples I-30 to I-42

Synthesis of Copolymers CP 3-1' to CP 3-10

Copolymers CP 3-1' to CP 3-10 were obtained in the same manner as in Example I-29 except that polyethylene glycol monomethacrylate (n: nearly equal to 4.5) (manufactured by NOF CORPORATION), diacetoneacrylamide (DAAM, manufactured by TOKYO CHEMICAL INDUSTRY CO., LTD.), and the monomer M-1 synthesized in Example I-1 were changed to the combinations and ratios shown in Table 3 of polyethylene glycol monomethacrylate (n: nearly equal to 4.5) (manufactured by NOF CORPORATION), polyethylene glycol monoacrylate (n: nearly equal to 4.5) (manufactured by NOF CORPORATION), methoxypolyethyleneglycol methacrylate (n: nearly equal to 4) (manufactured by NOF CORPORATION), polyethyleneglycol monomethacrylate (n: nearly equal to 2) (manufactured by NOF CORPORATION), polyethyleneglycol monomethacrylate (n: nearly equal to 8) (manufactured by NOF CORPORATION), or 2-hydroxyethyl methacrylate (n=1), one of the monomers M-1 to M-5 synthesized in Examples I-1 to I-4 and 1-12, and diacetoneacrylamide (DAAM) or diacetonemethacrylamide (DMAAM). Thereafter, aqueous solutions of the copolymers CP 3-1' to CP 3-10 were prepared in the same manner as in Example I-29.

The weight average molecular weight (Mw) and the number average molecular weight (Mn) of thus-obtained copolymers are shown in Table 3.

The IR spectra of the thus-obtained copolymers CP 3-2, CP 3-3, CP 3-4, CP 3-5C, CP 3-5D, CP 3-6, CP 3-7, and CP 3-10 were similar to that of the copolymer CP 3-1.

TABLE 3

| | Copolymer | Structure unit 1 | Structure unit 2 | Structure unit 7 |
|---|---|---|---|---|
| Example I-29 | CP 3-1 | Polyethyleneglycol monomethacrylate | M-1 | DAAM |
| Example I-30 | CP 3-1' | Polyethyleneglycol monomethacrylate | M-1 | DMAAM |
| Example I-31 | CP 3-2 | Polyethyleneglycol monomethacrylate | M-2 | DAAM |
| Example I-32 | CP 3-3 | Polyethyleneglycol monomethacrylate | M-3 | DAAM |
| Example I-33 | CP 3-4 | Polyethyleneglycol monomethacrylate | M-4 | DAAM |
| Example I-34 | CP 3-5A | Polyethyleneglycol monoacrylate | M-1 | DAAM |
| Example I-35 | CP 3-5B | Methoxypoly-ethyleneglycol methacrylate | M-1 | DAAM |
| Example I-36 | CP 3-5C | Polyethyleneglycol monomethacrylate | M-1 | DAAM |
| Example I-37 | CP 3-5D | Polyethyleneglycol monomethacrylate | M-1 | DAAM |
| Example I-38 | CP 3-6 | Polyethyleneglycol monomethacrylate | M-1 | DAAM |
| Example I-39 | CP 3-7 | Polyethyleneglycol monomethacrylate | M-1 | DAAM |
| Example I-40 | CP 3-8 | Polyethyleneglycol monomethacrylate | M-1 | DAAM |
| Example I-41 | CP 3-9 | Polyethyleneglycol monomethacrylate | M-5 | DAAM |
| Example I-42 | CP 3-10 | 2-hydroxyethyl methacrylate | M-1 | DAAM |

| | Molar ratio | | |
|---|---|---|---|
| | Structure unit 1 | Structure unit 2 | Structure unit 7 |
| Example I-29 | 2.5 | 1.0 | 0.5 |
| Example I-30 | 2.5 | 1.0 | 0.5 |
| Example I-31 | 2.5 | 1.0 | 0.5 |
| Example I-32 | 2.5 | 1.0 | 0.5 |
| Example I-33 | 2.5 | 1.0 | 0.5 |
| Example I-34 | 2.5 | 1.0 | 0.5 |
| Example I-35 | 2.5 | 1.0 | 0.5 |
| Example I-36 | 2.5 | 1.0 | 0.5 |
| Example I-37 | 2.5 | 1.0 | 0.5 |
| Example I-38 | 1.0 | 1.0 | 0.3 |
| Example I-39 | 3.0 | 1.0 | 0.8 |
| Example I-40 | 3.5 | 1.0 | 1.0 |
| Example I-41 | 2.5 | 1.0 | 0.5 |

TABLE 3-continued

| | | | | | | | |
|---|---|---|---|---|---|---|---|
| Example I-42 | 2.5 | 1.0 | | | | 0.5 | |

| | Structure unit 1 | | | Structure unit 2 | | Structure unit 7 | | |
|---|---|---|---|---|---|---|---|---|
| | $R_1$ | $R_2$ | n | $R_3$ | L | $R_5$ | Mw | Mn |
| Example I-29 | $CH_3$ | H | 4.5 | $CH_3$ | —$(CH_2)_6$— | H | 6,800 | 1,900 |
| Example I-30 | $CH_3$ | H | 4.5 | $CH_3$ | —$(CH_2)_6$— | $CH_3$ | 6,700 | 1,900 |
| Example I-31 | $CH_3$ | H | 4.5 | $CH_3$ | —$(CH_2)_2$— | H | 6,500 | 1,700 |
| Example I-32 | $CH_3$ | H | 4.5 | $CH_3$ | —$(CH_2)_{12}$— | H | 7,200 | 2,100 |
| Example I-33 | $CH_3$ | H | 4.5 | $CH_3$ | —$(CH_2)_{16}$— | H | 7,800 | 2,600 |
| Example I-34 | H | H | 4.5 | $CH_3$ | —$(CH_2)_6$— | H | 7,200 | 2,100 |
| Example I-35 | $CH_3$ | $CH_3$ | 4 | $CH_3$ | —$(CH_2)_6$— | H | 7,400 | 2,200 |
| Example I-36 | $CH_3$ | H | 2 | $CH_3$ | —$(CH_2)_6$— | H | 6,500 | 1,700 |
| Example I-37 | $CH_3$ | H | 8 | $CH_3$ | —$(CH_2)_6$— | H | 7,700 | 2,500 |
| Example I-38 | $CH_3$ | H | 4.5 | $CH_3$ | —$(CH_2)_6$— | H | 8,500 | 3,200 |
| Example I-39 | $CH_3$ | H | 4.5 | $CH_3$ | —$(CH_2)_6$— | H | 6,200 | 1,500 |
| Example I-40 | $CH_3$ | H | 4.5 | $CH_3$ | —$(CH_2)_6$— | H | 5,100 | 1,300 |
| Example I-41 | $CH_3$ | H | 4.5 | H | —$(CH_2)_6$— | H | 7,400 | 2,400 |
| Example I-42 | $CH_3$ | H | 1 | $CH_3$ | —$(CH_2)_6$— | H | 6,500 | 1,600 |

Example I-43

Synthesis of Copolymer CP 4-1

Figure 6:
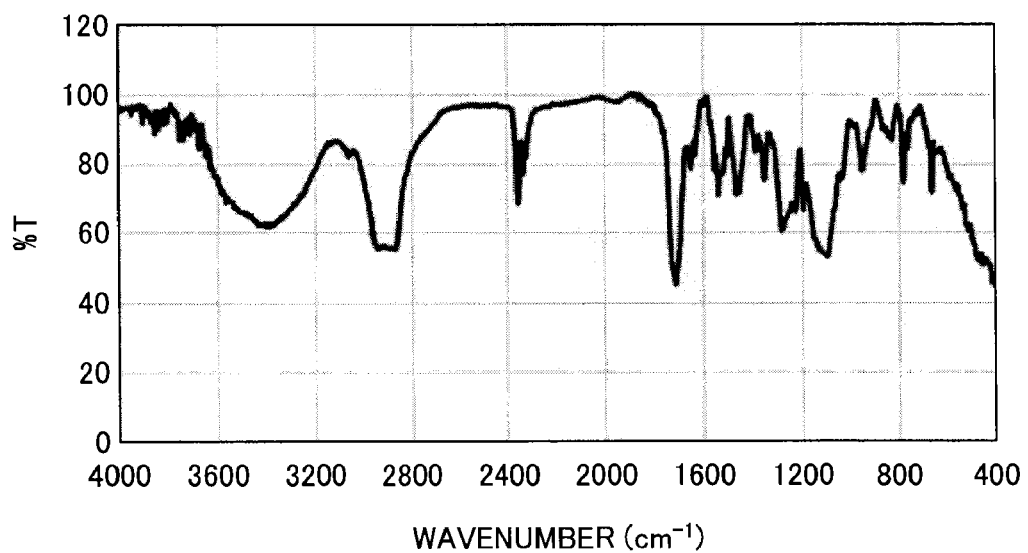
FIG. 6 is a graph illustrating IR spectrum of the copolymer CP 4-1 obtained in Example I-43 described later.

4.40 g (15.49 mmol) of polyethylenegylcol monomethacrylate (n: nearly equal to 4.5, manufactured by NOF CORPORATION), 0.30 g (1.94 mmol) of dimethylaminopropyl acrylamide (DMAPAA, manufactured by TOKYO CHEMICAL INDUSTRY CO., LTD.), and 3.31 g (7.75 mmol) of the monomer M-1 synthesized in Example I-1 were dissolved in 40 mL of dried methylethyl ketone to prepare a monomer solution. The monomer solution was divided into two with a mass ratio of 1 to 9. Thereafter, the 10 percent of the monomer solution was heated to 75 degrees C. in an argon atmosphere. 0.207 g (1.26 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The precipitated copolymer was dissolved in THF followed by evaporation and drying with a reduced pressure to obtain 8.00 g of a copolymer (viscosity of 6.5 percent by mass aqueous solution: 2.3 mPa·s). FIG. 6 is a graph illustrating IR spectrum of the obtained copolymer.

Thereafter, the thus-obtained copolymer was dissolved in deionized water in such a manner that the concentration of the copolymer was 6.5 percent to obtain an aqueous solution of the copolymer CP 4-1.

Examples I-44 to I-55

Synthesis of Copolymers CP 4-1' to CP 4-9

Copolymers CP 4-1' to CP 4-9 were obtained in the same manner as in Example I-43 except that polyethylene glycol monomethacrylate (n: nearly equal to 4.5) (manufactured by NOF CORPORATION), dimethylaminopropyl acrylamide (DMAPAA, manufactured by TOKYO CHEMICAL INDUSTRY CO., LTD.), and the monomer M-1 synthesized in Example I-1 were changed to the combinations and ratios shown in Table 4 of polyethylene glycol monomethacrylate (n: nearly equal to 4.5) (manufactured by NOF CORPORATION), polyethylene glycol monoacrylate (n: nearly equal to 4.5) (manufactured by NOF CORPORATION), methoxypolyethyleneglycol methacrylate (n: nearly equal to 4) (manufactured by NOF CORPORATION), polyethyleneglycol monomethacrylate (n: nearly equal to 2) (manufactured by NOF CORPORATION), or polyethyleneglycol monomethacrylate (n: nearly equal to 8) (manufactured by NOF CORPORATION), one of the monomers M-1 to M-5 synthesized in Examples I-1 to I-4 and 1-12, and dimethylaminopropyl acrylamide (DMAPAA, manufactured by TOKYO CHEMICAL INDUSTRY CO., LTD.) or dimethylaminopropyl methacrylamide (DMAPMAA, manufactured by TOKYO CHEMICAL INDUSTRY CO., LTD.). Thereafter, aqueous solutions of the copolymers CP 4-1' to CP 4-9 were prepared in the same manner as in Example I-43.

The viscosity of 6.5 percent by mass aqueous solution of the thus-obtained copolymers is shown in Table 4.

The IR spectra of the thus-obtained copolymers CP 4-2, CP 4-3, CP 4-4, CP 4-5C, CP 4-5D, CP 4-6, CP 4-7, and CP 4-9 were similar to that of the copolymer CP 4-1.

Example I-56

Synthesis of Copolymer CP 4-10

2.27 g (8.0 mmol) of polyethylenegylcol monomethacrylate (n: nearly equal to 4.5, manufactured by NOF CORPORATION), 0.06 g (0.50 mmol) of N,N-diethylacrylamide (DEA, manufactured by TOKYO CHEMICAL INDUSTRY CO., LTD.), and 0.64 g (1.50 mmol) of the monomer M-1 were dissolved in 17 mL of dried methyl ethyl ketone to prepare a monomer solution. The monomer solution was divided into two with a mass ratio of 1 to 9. Thereafter, the 10 percent of the monomer solution was heated to 75 degrees C. in an argon atmosphere. 0.08 g (0.50 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in one hour followed by stirring at 75 degrees C. for six hours. Thereafter, the reaction solution cooled down to room temperature was precipitated five times using hexane to refine a copolymer. Thereafter, the refined copolymer was filtered followed by drying with a reduced pressure to obtain 2.74 g of a copolymer CP 4-10 (viscosity of 6.5 percent by mass aqueous solution: 2.7 mPa·s). The IR spectrum of the thus-obtained copolymer CP 4-10 was similar to that of the copolymer CP 4-1. Thereafter, the thus-obtained copolymer was dissolved in deionized water in such a manner that the concentration of the copolymer was 6.5 percent to obtain an aqueous solution of the copolymer CP 4-10.

Examples I-57 to I-61: Synthesis of Copolymers CP 4-11 to CP 4-15

In Example I-56, the copolymers CP 4-11 to 4-15 were obtained in the same manner as in Example I-56 except that N,N-diethylacrylamide (manufactured by Tokyo Chemical Industry Co. Ltd.) was replaced with acrylamide monomer (AM), N,N-dimethylacrylamide (DMA) (manufactured by Tokyo Chemical Industry Co. Ltd.), N,N-diethylaminoethylmethacrylate (DEAEM, manufactured by Tokyo Chemical Industry Co. Ltd.), N,N-dimethylaminoethyl methacrylate (DMAEM, manufactured by Tokyo Chemical Industry Co. Ltd.), or N,N-dimethylaminopropylacrylate (DMAPA, manufactured by Sigma-Aldrich Japan K.K.) as shown in Table 4. Aqueous solutions of the copolymer CP 4-11 to CP 4-15 were prepared in the same manner as in Example I-56.

The viscosity of 6.5 percent by mass aqueous solution of the thus-obtained copolymers is shown in Table 4.

The IR spectra of the thus-obtained copolymers CP 4-11, CP 4-12, CP 4-13, CP 4-14, and CP 4-15 were similar to that of the copolymer CP 4-1.

TABLE 4

| | Copolymer 1 | Structure unit 1 | Structure unit 2 | Structure unit 9 | Molar ratio Structure unit 1 | Structure unit 2 | Structure unit 9 |
|---|---|---|---|---|---|---|---|
| Example I-43 | CP 4-1 | Polyethyleneglycol monomethacrylate | M-1 | DMAPAA | 2.0 | 1.0 | 0.25 |
| Example I-44 | CP 4-1' | Polyethyleneglycol monomethacrylate | M-1 | DMAPMAA | 2.0 | 1.0 | 0.25 |
| Example I-45 | CP 4-2 | Polyethyleneglycol monomethacrylate | M-2 | DMAPAA | 2.0 | 1.0 | 0.25 |
| Example I-46 | CP 4-3 | Polyethyleneglycol monomethacrylate | M-3 | DMAPAA | 2.0 | 1.0 | 0.25 |
| Example I-47 | CP 4-4 | Polyethyleneglycol monomethacrylate | M-4 | DMAPAA | 2.0 | 1.0 | 0.25 |
| Example I-48 | CP 4-5A | Polyethyleneglycol monoacrylate | M-1 | DMAPAA | 2.0 | 1.0 | 0.25 |
| Example I-49 | CP 4-5B | Methoxypolyethyleneglycol methacrylate | M-1 | DMAPAA | 2.0 | 1.0 | 0.25 |
| Example I-50 | CP 4-5C | Polyethyleneglycol monomethacrylate | M-1 | DMAPAA | 2.0 | 1.0 | 0.25 |
| Example I-51 | CP 4-5D | Polyethyleneglycol monomethacrylate | M-1 | DMAPAA | 2.0 | 1.0 | 0.25 |
| Example I-52 | CP 4-6 | Polyethyleneglycol monomethacrylate | M-1 | DMAPAA | 1.0 | 1.0 | 0.20 |
| Example I-53 | CP 4-7 | Polyethyleneglycol monomethacrylate | M-1 | DMAPAA | 3.0 | 1.0 | 0.50 |
| Example I-54 | CP 4-8 | Polyethyleneglycol monomethacrylate | M-1 | DMAPAA | 3.5 | 1.0 | 0.80 |
| Example I-55 | CP 4-9 | Polyethyleneglycol monomethacrylate | M-5 | DMAPAA | 2.0 | 1.0 | 0.25 |
| Example I-56 | CP 4-10 | Polyethyleneglycol monomethacrylate | M-1 | DEA | 8.0 | 1.5 | 0.5 |
| Example I-57 | CP 4-11 | Polyethyleneglycol monomethacrylate | M-1 | AM | 8.0 | 1.5 | 0.5 |
| Example I-58 | CP 4-12 | Polyethyleneglycol monomethacrylate | M-1 | DMA | 8.0 | 1.5 | 0.5 |
| Example I-59 | CP 4-13 | Polyethyleneglycol monomethacrylate | M-1 | DEAEM | 8.0 | 1.5 | 0.5 |
| Example I-60 | CP 4-14 | Polyethyleneglycol monomethacrylate | M-1 | DMAEM | 8.0 | 1.5 | 0.5 |

TABLE 4-continued

| | | | | | | | |
|---|---|---|---|---|---|---|---|
| Example I-61 | CP 4-15 | Polyethyleneglycol monomethacrylate | M-1 | DMAPA | 8.0 | 1.5 | 0.5 |

| | Structure unit 1 | | | Structure unit 2 | |
|---|---|---|---|---|---|
| | $R_1$ | $R_2$ | n | $R_3$ | L |
| Example I-43 | $CH_3$ | H | 4.5 | $CH_3$ | —$(CH_2)_6$— |
| Example I-44 | $CH_3$ | H | 4.5 | $CH_3$ | —$(CH_2)_6$— |
| Example I-45 | $CH_3$ | H | 4.5 | $CH_3$ | —$(CH_2)_2$— |
| Example I-46 | $CH_3$ | H | 4.5 | $CH_3$ | —$(CH_2)_{12}$— |
| Example I-47 | $CH_3$ | H | 4.5 | $CH_3$ | —$(CH_2)_{16}$— |
| Example I-48 | H | H | 4.5 | $CH_3$ | —$(CH_2)_6$— |
| Example I-49 | $CH_3$ | $CH_3$ | 4 | $CH_3$ | —$(CH_2)_6$— |
| Example I-50 | $CH_3$ | H | 2 | $CH_3$ | —$(CH_2)_6$— |
| Example I-51 | $CH_3$ | H | 8 | $CH_3$ | —$(CH_2)_6$— |
| Example I-52 | $CH_3$ | H | 4.5 | $CH_3$ | —$(CH_2)_6$— |
| Example I-53 | $CH_3$ | H | 4.5 | $CH_3$ | —$(CH_2)_6$— |
| Example I-54 | $CH_3$ | H | 4.5 | $CH_3$ | —$(CH_2)_6$— |
| Example I-55 | $CH_3$ | H | 4.5 | H | —$(CH_2)_6$— |
| Example I-56 | $CH_3$ | H | 4.5 | $CH_3$ | —$(CH_2)_6$— |
| Example I-57 | $CH_3$ | H | 4.5 | $CH_3$ | —$(CH_2)_6$— |
| Example I-58 | $CH_3$ | H | 4.5 | $CH_3$ | —$(CH_2)_6$— |
| Example I-59 | $CH_3$ | H | 4.5 | $CH_3$ | —$(CH_2)_6$— |
| Example I-60 | $CH_3$ | H | 4.5 | $CH_3$ | —$(CH_2)_6$— |
| Example I-61 | $CH_3$ | H | 4.5 | $CH_3$ | —$(CH_2)_6$— |

| | Structure unit 9 | | | | | | Viscosity of 6.5 percent by mass aqueous solution (mPa · s) |
|---|---|---|---|---|---|---|---|
| | $R_6$ | $R_7$ | a | $R_8$ | b | $R_9$ | |
| Example I-43 | H | NH | 1 | $C_3H_6$ | 1 | $CH_3$ | 2.3 |
| Example I-44 | $CH_3$ | NH | 1 | $C_3H_6$ | 1 | $CH_3$ | 2.4 |
| Example I-45 | H | NH | 1 | $C_3H_6$ | 1 | $CH_3$ | 2.0 |
| Example I-46 | H | NH | 1 | $C_3H_6$ | 1 | $CH_3$ | 2.5 |
| Example I-47 | H | NH | 1 | $C_3H_6$ | 1 | $CH_3$ | 2.8 |
| Example I-48 | H | NH | 1 | $C_3H_6$ | 1 | $CH_3$ | 2.2 |
| Example I-49 | H | NH | 1 | $C_3H_6$ | 1 | $CH_3$ | 2.5 |
| Example I-50 | H | NH | 1 | $C_3H_6$ | 1 | $CH_3$ | 2.1 |
| Example I-51 | H | NH | 1 | $C_3H_6$ | 1 | $CH_3$ | 2.6 |
| Example I-52 | H | NH | 1 | $C_3H_6$ | 1 | $CH_3$ | 3.2 |
| Example I-53 | H | NH | 1 | $C_3H_6$ | 1 | $CH_3$ | 2.0 |
| Example I-54 | H | NH | 1 | $C_3H_6$ | 1 | $CH_3$ | 1.8 |
| Example I-55 | H | NH | 1 | $C_3H_6$ | 1 | $CH_3$ | 2.1 |
| Example I-56 | H | — | 0 | — | 0 | $C_2H_5$ | 2.7 |
| Example I-57 | H | — | 0 | — | 0 | H | 2.8 |

TABLE 4-continued

| Example | | | | | | | |
|---|---|---|---|---|---|---|---|
| Example I-58 | H | — | 0 | — | 0 | $CH_3$ | 2.6 |
| Example I-59 | $CH_3$ | O | 1 | $C_2H_4$ | 1 | $C_2H_5$ | 2.5 |
| Example I-60 | $CH_3$ | O | 1 | $C_2H_4$ | 1 | $CH_3$ | 2.7 |
| Example I-61 | H | O | 1 | $C_3H_6$ | 1 | $CH_3$ | 2.8 |

Example I-62

Synthesis of Copolymer CP 5-1

1.07 g (8.2 mmol) of 2-hydroxyethyl metharylate (n=1) (manufactured by Tokyo Chemical Industry Co. Ltd.), 0.026 g (0.10 mmol) of about 80 percent aqueous solution of methacryloyl choline chloride, and 0.73 g (1.7 mmol) of the monomer M-1 synthesized in Example I-1 were dissolved in a liquid mixture of 7 mL of dimethylformamide and 3 mL of deionized water to prepare a monomer solution. The monomer solution was divided into two with a mass ratio of 1 to 9. Thereafter, the 10 percent of the monomer solution was heated to 75 degrees C. in an argon atmosphere. 0.08 g (0.50 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in one hour followed by stirring at 75 degrees C. for six hours. Thereafter, the reaction solution cooled down to room temperature was precipitated five times using a solution mixture of hexane and tetrahydrofuran to refine a copolymer. Thereafter, the refined copolymer was filtered followed by drying with a reduced pressure to obtain 1.67 g of a copolymer CP 5-1 (viscosity of 6.5 percent by mass aqueous solution: 2.6 mPa·s). The IR spectrum of the thus-obtained copolymer CP 5-1 was similar to that of the copolymer CP 4-1. Thereafter, the thus-obtained copolymer was dissolved in deionized water in such a manner that the concentration of the copolymer was 6.5 percent to obtain an aqueous solution of the copolymer CP 5-1.

Example I-63

Synthesis of Copolymer CP 6-1

Figure 7:
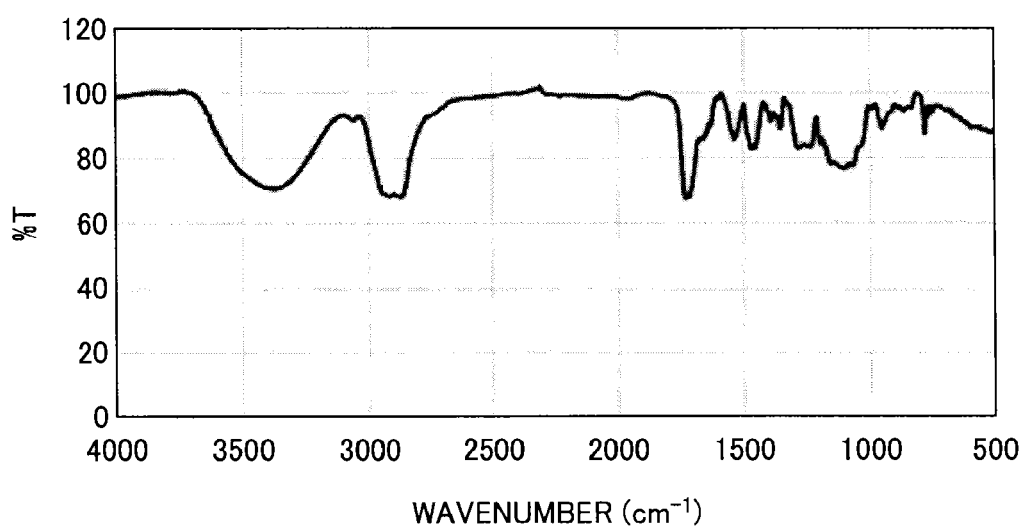
FIG. 7 is a graph illustrating IR spectrum of the copolymer CP 6-1 obtained in Example I-63 described later.

4.82 g (16.95 mmol) of polyethylenegylcol monomethacrylate (n: nearly equal to 4.5, manufactured by NOF CORPORATION), 0.29 g (3.39 mmol) of N-vinylacetamide (NVA, manufactured by Showa Denko K.K.), and 2.90 g (6.78 mmol) of the monomer M-1 synthesized in Example I-1 were dissolved in 40 mL of dried methylethyl ketone to prepare a monomer solution. The monomer solution was divided into two with a mass ratio of 1 to 9. Thereafter, the 10 percent of the monomer solution was heated to 75 degrees C. in an argon atmosphere. 0.223 g (1.36 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. Supernatant solution was discarded and the precipitated copolymer was obtained. The precipitated copolymer was dissolved in THF followed by evaporation and drying with a reduced pressure to obtain 8.00 g of a copolymer CP 6-1 (weight average molecular weight (Mw): 11,600, number average molecular weight (Mn): 5,800). FIG. 7 is a graph illustrating IR spectrum of the obtained Copolymer.

Thereafter, the thus-obtained copolymer was dissolved in deionized water in such a manner that the concentration of the copolymer was 6.5 percent to obtain an aqueous solution of the copolymer CP 6-1.

Examples I-64 to I-76

Synthesis of Copolymers CP 6-1' to CP 6-10

Copolymers CP 6-1' to CP 6-10 were obtained in the same manner as in Example I-63 except that polyethylenegylcol monomethacrylate (n: nearly equal to 4.5, manufactured by NOF CORPORATION), N-vinylacetamide (NVA), and the monomer M-1 synthesized in Example I-1 were changed to the combinations and ratios shown in Table 5 of polyethylene glycol monomethacrylate (n: nearly equal to 4.5) (manufactured by NOF CORPORATION), polyethylene glycol monoacrylate (n: nearly equal to 4.5) (manufactured by NOF CORPORATION), methoxypolyethyleneglycol methacrylate (n: nearly equal to 4) (manufactured by NOF CORPORATION), polyethyleneglycol monomethacrylate (n: nearly equal to 2) (manufactured by NOF CORPORATION), polyethyleneglycol monomethacrylate (n: nearly equal to 8) (manufactured by NOF CORPORATION), or 2-hydroxydiethyl methacrylate (n=1), one of the monomers M-1 to M-5 synthesized in Examples I-1 to I-4 and 1-12, and N-vinylacetamide (NVA, manufactured by Showa Denko K.K.) or N-vinylformamide (NVF, manufactured by TOKYO CHEMICAL INDUSTRY CO., LTD.). Thereafter, aqueous solutions of the copolymers CP 6-1' to CP 6-10 were prepared in the same manner as in Example I-63.

The weight average molecular weight (Mw) and the number average molecular weight (Mn) of thus-obtained copolymers are shown in Table 5.

The IR spectra of the thus-obtained copolymers CP 6-2, CP 6-3, CP 6-4, CP 6-5C, CP 6-5D, CP 6-6, CP 6-7, and CP 6-10 were similar to that of the copolymer CP 6-1.

TABLE 5

| | Copolymer | Structure unit 1 | Structure unit 2 | Structure unit 13 |
|---|---|---|---|---|
| Example I-63 | CP 6-1 | Polyethyleneglycol monomethacrylate | M-1 | NVA |

TABLE 5-continued

| | | | | |
|---|---|---|---|---|
| Example I-64 | CP 6-1' | Polyethyleneglycol monomethacrylate | M-1 | NVF |
| Example I-65 | CP 6-2 | Polyethyleneglycol monomethacrylate | M-2 | NVA |
| Example I-66 | CP 6-3 | Polyethyleneglycol monomethacrylate | M-3 | NVA |
| Example I-67 | CP 6-4 | Polyethyleneglycol monomethacrylate | M-4 | NVA |
| Example I-68 | CP 6-5A | Polyethyleneglycol monoacrylate | M-1 | NVA |
| Example I-69 | CP 6-5B | Methoxypoly-ethyleneglycol methacrylate | M-1 | NVA |
| Example I-70 | CP 6-5C | Polyethyleneglycol monomethacrylate | M-1 | NVA |
| Example I-71 | CP 6-5D | Polyethyleneglycol monomethacrylate | M-1 | NVA |
| Example I-72 | CP 6-6 | Polyethyleneglycol monomethacrylate | M-1 | NVA |
| Example I-73 | CP 6-7 | Polyethyleneglycol monomethacrylate | M-1 | NVA |
| Example I-74 | CP 6-8 | Polyethyleneglycol monomethacrylate | M-1 | NVA |
| Example I-75 | CP 6-9 | Polyethyleneglycol monomethacrylate | M-5 | NVA |
| Example I-76 | CP 6-10 | 2-hydroxyethyl methacrylate | M-1 | NVA |

| | Molar ratio | | |
|---|---|---|---|
| | Structure unit 1 | Structure unit 2 | Structure unit 13 |
| Example I-63 | 2.5 | 1.0 | 0.5 |
| Example I-64 | 2.5 | 1.0 | 0.5 |
| Example I-65 | 2.5 | 1.0 | 0.5 |
| Example I-66 | 2.5 | 1.0 | 0.5 |
| Example I-67 | 2.5 | 1.0 | 0.5 |
| Example I-68 | 2.5 | 1.0 | 0.5 |
| Example I-69 | 2.5 | 1.0 | 0.5 |
| Example I-70 | 2.5 | 1.0 | 0.5 |
| Example I-71 | 2.5 | 1.0 | 0.5 |
| Example I-72 | 1.0 | 1.0 | 0.2 |
| Example I-73 | 3.0 | 1.0 | 0.8 |
| Example I-74 | 3.5 | 1.0 | 1.0 |
| Example I-75 | 2.5 | 1.0 | 0.5 |
| Example I-76 | 2.5 | 1.0 | 0.5 |

| | Structure unit 1 | | | Structure unit 2 | | Structure unit 13 | | |
|---|---|---|---|---|---|---|---|---|
| | $R_1$ | $R_2$ | n | $R_3$ | L | $R_{14}$ | Mw | Mn |
| Example I-63 | $CH_3$ | H | 4.5 | $CH_3$ | $-(CH_2)_6-$ | $CH_3$ | 11,600 | 5,800 |
| Example I-64 | $CH_3$ | H | 4.5 | $CH_3$ | $-(CH_2)_6-$ | H | 10,900 | 4,900 |
| Example I-65 | $CH_3$ | H | 4.5 | $CH_3$ | $-(CH_2)_2-$ | $CH_3$ | 12,100 | 2,900 |
| Example I-66 | $CH_3$ | H | 4.5 | $CH_3$ | $-(CH_2)_{12}-$ | $CH_3$ | 12,500 | 5,100 |
| Example I-67 | $CH_3$ | H | 4.5 | $CH_3$ | $-(CH_2)_{16}-$ | $CH_3$ | 10,200 | 4,700 |
| Example I-68 | H | H | 4.5 | $CH_3$ | $-(CH_2)_6-$ | $CH_3$ | 12,100 | 5,900 |

TABLE 5-continued

| Example | | | | | | | | |
|---|---|---|---|---|---|---|---|---|
| Example I-69 | CH$_3$ | CH$_3$ | 4 | CH$_3$ | —(CH$_2$)$_6$— | CH$_3$ | 11,600 | 5,500 |
| Example I-70 | CH$_3$ | H | 2 | CH$_3$ | —(CH$_2$)$_6$— | CH$_3$ | 11,100 | 5,600 |
| Example I-71 | CH$_3$ | H | 8 | CH$_3$ | —(CH$_2$)$_6$— | CH$_3$ | 12,300 | 6,000 |
| Example I-72 | CH$_3$ | H | 4.5 | CH$_3$ | —(CH$_2$)$_6$— | CH$_3$ | 11,800 | 5,500 |
| Example I-73 | CH$_3$ | H | 4.5 | CH$_3$ | —(CH$_2$)$_6$— | CH$_3$ | 13,200 | 6,200 |
| Example I-74 | CH$_3$ | H | 4.5 | CH$_3$ | —(CH$_2$)$_6$— | CH$_3$ | 12,000 | 5,900 |
| Example I-75 | CH$_3$ | H | 4.5 | H | —(CH$_2$)$_6$— | CH$_3$ | 10,700 | 4,700 |
| Example I-76 | CH$_3$ | H | 1 | CH$_3$ | —(CH$_2$)$_6$— | CH$_3$ | 11,900 | 5,200 |

Example II-1 to II-16

Preparation of Aqueous Ink GJ 1-1 to GJ 1-13

Preparation of Pigment Dispersions PD 1-1 to PD 1-13

The aqueous solution of the copolymers CP 1-1 to CP 1-10 prepared in Examples I-1 to I-13, carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 6-1 followed by stirring for 12 hours.

The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 1-1 to PD 1-13. The values in Table 6-1 are represented in part. The pigment dispersions PD 1-1 to PD 1-8 and PD 1-12 to PD 1-13 had a pigment solid portion concentration of 16 percent and the pigment dispersions PD 1-9 to PD 1-11 had a pigment solid portion concentration of 20 percent.

Preparation of Ink

Pigment dispersions PD 1-1 to PD 1-13, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 7-1 followed by stirring for one hour and filtration by a membrane filter having an opening diameter of 1.2 micro meter to obtain aqueous inks GJ 1-1 to GJ 1-13 of the present disclosure. The values in Table 7-1 are represented in part.

Comparative Examples 1 to 4

Preparation of Comparative Aqueous Inks RGJ 1-1 to RGJ 1-4

6.36 g of a copolymer RCP 1-1 (weight average molecular weight (Mw): 7,500, number average molecular weight (Mn): 2,800) was obtained in the same manner as in Example I-1 except that the monomer M-1 was replaced with a monomer having a structure represented by the following Chemical structure 15. An aqueous solution of the copolymer RCP 1-1 was prepared in the same manner as in Example I-1.

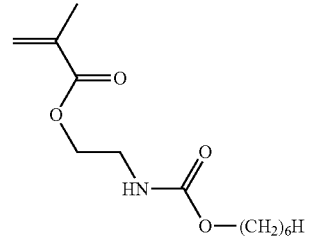

Chemical structure 15

Comparative pigment dispersions RPD 1-1 to RPD 1-4 were obtained by mixing the aqueous solution of the copolymer RCP 1-1, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water with a ratio shown in Table 6-1.

Thereafter, pigment dispersions PD 1-1 to PD 1-4, 1,3-butanediol, glycerin, 3-methoxy-N,N-diemthyl propionamide, fluorine-containing surfactant (ZONYL™ FS-300, solid portion: 40 percent by mass, manufactured by E. I. du Pont de Nemours and Company), and deionized water were mixed in the ratio shown in Table 7-1 followed by stirring for one hour and filtration by a membrane filter having an opening diameter of 1.2 micro meter to obtain comparative aqueous inks RGJ 1-1 to RGJ 1-4.

Comparative Example 5

Preparation of Comparative Aqueous Ink RGJ 1-5

Synthesis of Comparative Copolymer RCP 1-2

80 g of 2-phenoxyethyl methacrylate as monomer, 3.7 g of 3-mercapto-1-propanol as chain transfer agent, and 0.3 g of 2,2-azobis(2,4-dimethyl valero nitrile) as initiator were dissolved in 160 mL of tetrahydrofuran (THF) followed by heating to 65 degrees C. to conduct reaction in nitrogen atmosphere for seven hours. The thus-obtained solution was naturally cooled down and 80 mg of dibutyl tin (IV) dilaurate and a catalyst amount of hydroquinone were added thereto. 10.0 g of 2-methacryloyloxy ethylisocyanate was dripped to the resultant. The resultant was heated to 50 degrees C. to conduct reaction for 2.5 hours. Thereafter, the resultant was re-precipitated by a liquid mixture of water and methanol for refinement to obtain 71 g of macromonomer MM-1 (weight average molecular weight (Mw): 4,000, number average molecular weight (Mn): 1,900).

Thereafter, 20 g of methylethylketone was heated to 75 degrees C. in nitrogen atmosphere. A solution in which 1.16 g of dimethyl-2,2'-azobis isobutylate, 9 g of macromonomer MM-1 obtained as described above, 1.8 g of p-styrene sulfonic acid, and 49.2 g of methylmethacrylate were dissolved in 40 g of methylethylketone was dripped to the heated methylethylketone in three hours. After the dripping, the reaction was caused to continue another hour. Thereafter, a solution in which 0.6 g of methylethylketone was dissolved in 0.2 g of dimethyl-2,2'-azobis isobutylate was added followed by heating to 80 degrees C. and stirring for four hours while being heated. Furthermore, a solution in which 0.2 g of dimethyl-2,2'-azobis isobutylate was dissolved in 0.6 g of methylethylketone was added followed by stirring for six hours while being heated. Subsequent to being cooled down, the thus-obtained reaction solution was dripped to hexane to precipitate a graft polymer followed by filtration and drying to obtain comparative copolymer RCP 1-2. An aqueous solution of the copolymer RCP 1-2 was prepared in the same manner as in Example I-1.

Comparative Example RPD 1-5

Preparation of Comparative Aqueous Ink RGJ 1-5

Thereafter, a comparative pigment dispersion RPD 1-5 was obtained in the same manner as in Example II-1 except that the aqueous solution of the comparative copolymer RCP 1-2 was used instead of the aqueous solution of the copolymer CP 1-1 in the preparation of the pigment dispersion of Example II-1.

Thereafter, a comparative aqueous ink RGJ 1-5 was obtained in the same manner as in Example II-1 except that the comparative pigment dispersion element RPD 1-5 was used instead of the pigment dispersion element PD 1-1 in the manufacturing of the ink of Example II-1.

Comparative Example 6

Preparation of Comparative Aqueous Ink RQJ 1-6

A copolymer RCP 1-3 was obtained in the same manner as in Example I-1 except that the polyethyleneglycol monomethacrylate was replaced with poly(ethyleneglycol-.tetramethyleneglycol)-monomethacrylate represented by the following Chemical structure. An aqueous solution of the copolymer RCP 1-3 was prepared in the same manner as in Example I-1.

$$H_2C=C\begin{matrix}CH_3\\ \\C-O-[(C_2H_4O)_m-(C_4H_8O)_n]-H\\\|\\O\end{matrix}$$

m ≈ 10  n ≈ 5

Thereafter, a comparative pigment dispersion RPD 1-6 was obtained in the same manner as in Example II-1 except that the aqueous solution of the comparative copolymer RCP 1-3 was used instead of the aqueous solution of the copolymer CP 1-1 in the preparation of the pigment dispersion of Example II-1.

Thereafter, a comparative aqueous ink RGJ 1-6 was obtained in the same manner as in Example II-1 except that the comparative pigment dispersion element RPD 1-6 was used instead of the pigment dispersion element PD 1-1 in the manufacturing of the ink of Example II-1.

Characteristics of the pigment dispersion element and aqueous inks prepared in Examples II-1 to II-16 and Comparative Examples 1 to 6 were evaluated in the following manner.

The prepared pigment dispersions are shown in Table 6-1, the prepared aqueous inks are shown in Table 7-1, and the evaluation results are shown in Table 8-1

TABLE 6-1

| | Pigment dispersion | | | | | | | |
|---|---|---|---|---|---|---|---|---|
| | PD 1-1 | PD 1-2 | PD 1-3 | PD 1-4 | PD 1-5A | PD 1-5B | PD 1-5C | PD 1-5D |
| CP 1-1 10 percent by mass aqueous solution | 40.0 | | | | | | | |
| CP 1-2 10 percent by mass aqueous solution | | 40.0 | | | | | | |
| CP 1-3 10 percent by mass aqueous solution | | | 40.0 | | | | | |
| CP 1-4 10 percent by mass aqueous solution | | | | 40.0 | | | | |
| CP 1-5A 10 percent by mass aqueous solution | | | | | 40.0 | | | |
| CP 1-5B 10 percent by mass aqueous solution | | | | | | 40.0 | | |
| CP 1-5C 10 percent by mass aqueous solution | | | | | | | 40.0 | |
| CP 1-5D 10 percent by mass aqueous solution | | | | | | | | 40.0 |
| CP 1-6 10 percent by mass aqueous solution | | | | | | | | |
| CP 1-7 10 percent by mass aqueous solution | | | | | | | | |
| CP 1-8 10 percent by mass aqueous solution | | | | | | | | |
| CP 1-9 10 percent by mass aqueous solution | | | | | | | | |

TABLE 6-1-continued

| | | | | | | | | |
|---|---|---|---|---|---|---|---|---|
| CP 1-10 10 percent by mass aqueous solution | | | | | | | | |
| RCP 1-1 10 percent by mass aqueous solution | | | | | | | | |
| RCP 1-2 10 percent by mass aqueous solution | | | | | | | | |
| RCP 1-3 10 percent by mass aqueous solution | | | | | | | | |
| Carbon Black | 16.0 | 16.0 | 16.0 | 16.0 | 16.0 | 16.0 | 16.0 | 16.0 |
| Pigment Blue 15:3 | | | | | | | | |
| Pigment Red 122 | | | | | | | | |
| Pigment Yellow 74 | | | | | | | | |
| Deionized water | Rest | Rest | Rest | Rest | Rest | Rest | Rest | Rest |
| Total | 100.0 | 100.0 | 100.0 | 100.0 | 100.0 | 100.0 | 100.0 | 100.0 |

| | Pigment dispersion | | | | | | | |
|---|---|---|---|---|---|---|---|---|
| | PD 1-6 | PD 1-7 | PD 1-8 | PD 1-9 | PD 1-10 | PD 1-11 | PD 1-12 | PD 1-13 |
| CP 1-1 10 percent by mass aqueous solution | | | | 40.0 | 40.0 | 40.0 | | |
| CP 1-2 10 percent by mass aqueous solution | | | | | | | | |
| CP 1-3 10 percent by mass aqueous solution | | | | | | | | |
| CP 1-4 10 percent by mass aqueous solution | | | | | | | | |
| CP 1-5A 10 percent by mass aqueous solution | | | | | | | | |
| CP 1-5B 10 percent by mass aqueous solution | | | | | | | | |
| CP 1-5C 10 percent by mass aqueous solution | | | | | | | | |
| CP 1-5D 10 percent by mass aqueous solution | | | | | | | | |
| CP 1-6 10 percent by mass aqueous solution | 40.0 | | | | | | | |
| CP 1-7 10 percent by mass aqueous solution | | 40.0 | | | | | | |
| CP 1-8 10 percent by mass aqueous solution | | | 40.0 | | | | | |
| CP 1-9 10 percent by mass aqueous solution | | | | | | | 40.0 | |

TABLE 6-1-continued

| | | | | | | | | |
|---|---|---|---|---|---|---|---|---|
| CP 1-10 10 percent by mass aqueous solution | | | | | | | | 40.0 |
| RCP 1-1 10 percent by mass aqueous solution | | | | | | | | |
| RCP 1-2 10 percent by mass aqueous solution | | | | | | | | |
| RCP 1-3 10 percent by mass aqueous solution | | | | | | | | |
| Carbon Black | 16.0 | 16.0 | 16.0 | | | | 16.0 | 16.0 |
| Pigment Blue 15:3 | | | | 20.0 | | | | |
| Pigment Red 122 | | | | | 20.0 | | | |
| Pigment Yellow 74 | | | | | | 20.0 | | |
| Deionized water | Rest | Rest | Rest | Rest | Rest | Rest | Rest | Rest |
| Total | 100.0 | 100.0 | 100.0 | 100.0 | 100.0 | 100.0 | 100.0 | 100.0 |

| | Pigment dispersion | | | | | |
|---|---|---|---|---|---|---|
| | RPD 1-1 | RPD 1-2 | RPD 1-3 | RPD 1-4 | RPD 1-5 | RPD 1-6 |
| CP 1-1 10 percent by mass aqueous solution | | | | | | |
| CP 1-2 10 percent by mass aqueous solution | | | | | | |
| CP 1-3 10 percent by mass aqueous solution | | | | | | |
| CP 1-4 10 percent by mass aqueous solution | | | | | | |
| CP 1-5A 10 percent by mass aqueous solution | | | | | | |
| CP 1-5B 10 percent by mass aqueous solution | | | | | | |
| CP 1-5C 10 percent by mass aqueous solution | | | | | | |
| CP 1-5D 10 percent by mass aqueous solution | | | | | | |
| CP 1-6 10 percent by mass aqueous solution | | | | | | |
| CP 1-7 10 percent by mass aqueous solution | | | | | | |
| CP 1-8 10 percent by mass aqueous solution | | | | | | |
| CP 1-9 10 percent by mass aqueous solution | | | | | | |

TABLE 6-1-continued

| | | | | | | |
|---|---|---|---|---|---|---|
| CP 1-10 10 percent by mass aqueous solution | | | | | | |
| RCP 1-1 10 percent by mass aqueous solution | 40.0 | 40.0 | 40.0 | 40.0 | | |
| RCP 1-2 10 percent by mass aqueous solution | | | | | 40.0 | |
| RCP 1-3 10 percent by mass aqueous solution | | | | | | 40.0 |
| Carbon Black | 16.0 | | | | 16.0 | 16.0 |
| Pigment Blue 15:3 | | 20.0 | | | | |
| Pigment Red 122 | | | 20.0 | | | |
| Pigment Yellow 74 | | | | 20.0 | | |
| Deionized water | Rest | Rest | Rest | Rest | Rest | Rest |
| Total | 100.0 | 100.0 | 100.0 | 100.0 | 100.0 | 100.0 |

TABLE 7-1

| | | | Example | | | | | | | |
|---|---|---|---|---|---|---|---|---|---|---|
| | Material name | Resin | II-1 GJ 1-1 | II-2 GJ 1-2 | II-3 GJ 1-3 | II-4 GJ 1-4 | II-5 GJ 1-5A | II-6 GJ 1-5B | II-7 GJ 1-5C | II-8 GJ 1-5D |
| Pigment dispersion | PD 1-1 | CP 1-1 | 45.0 | | | | | | | |
| | PD 1-2 | CP 1-2 | | 45.0 | | | | | | |
| | PD 1-3 | CP 1-3 | | | 45.0 | | | | | |
| | PD 1-4 | CP 1-4 | | | | 45.0 | | | | |
| | PD 1-5A | CP 1-5A | | | | | 45.0 | | | |
| | PD 1-5B | CP 1-5B | | | | | | 45.0 | | |
| | PD 1-5C | CP 1-5C | | | | | | | 45.0 | |
| | PD 1-5D | CP 1-5D | | | | | | | | 45.0 |
| | PD 1-6 | CP 1-6 | | | | | | | | |
| | PD 1-7 | CP 1-7 | | | | | | | | |
| | PD 1-8 | CP 1-8 | | | | | | | | |
| | PD 1-9 | CP 1-1 | | | | | | | | |
| | PD 1-10 | CP 1-1 | | | | | | | | |
| | PD 1-11 | CP 1-1 | | | | | | | | |
| | PD 1-12 | CP 1-9 | | | | | | | | |
| | PD 1-13 | CP 1-10 | | | | | | | | |
| | RPD 1-1 | RCP 1-1 | | | | | | | | |
| | RPD 1-2 | RCP 1-1 | | | | | | | | |
| | RPD 1-3 | RCP 1-1 | | | | | | | | |
| | RPD 1-4 | RCP 1-1 | | | | | | | | |
| | RPD 1-5 | RCP 1-2 | | | | | | | | |
| | RPD 1-6 | RCP 1-3 | | | | | | | | |
| Water soluble organic solvent | 1,3-butanediol | | 10.0 | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 | 10.0 |
| | 3-methoxy-N,N-dimethyl propaneamide | | 10.0 | 10.0 | 10.0 | 10.0 | 10.0 | 10.0 | 10.0 | 10.0 |

TABLE 7-1-continued

| | Material name | Resin | | | | | | | | |
|---|---|---|---|---|---|---|---|---|---|---|
| Surfactant | Zonyl™ FS-300 | | 1.0 | 1.0 | 1.0 | 1.0 | 1.0 | 1.0 | 1.0 | 1.0 |
| Solvent | Deionized water | | Rest | Rest | Rest | Rest | Rest | Rest | Rest | Rest |
| | Total | | 100.0 | 100.0 | 100.0 | 100.0 | 100.0 | 100.0 | 100.0 | 100.0 |

| | | | Example | | | | | | | |
|---|---|---|---|---|---|---|---|---|---|---|
| | Material name | Resin | II-9 GJ 1-6 | II-10 GJ 1-7 | II-11 GJ 1-8 | II-12 GJ 1-9 | II-13 GJ 1-10 | II-14 GJ 1-11 | II-15 GJ 1-12 | II-16 GJ 1-13 |
| Pigment dispersion | PD 1-1 | CP 1-1 | | | | | | | | |
| | PD 1-2 | CP 1-2 | | | | | | | | |
| | PD 1-3 | CP 1-3 | | | | | | | | |
| | PD 1-4 | CP 1-4 | | | | | | | | |
| | PD 1-5A | CP 1-5A | | | | | | | | |
| | PD 1-5B | CP 1-5B | | | | | | | | |
| | PD 1-5C | CP 1-5C | | | | | | | | |
| | PD 1-5D | CP 1-5D | | | | | | | | |
| | PD 1-6 | CP 1-6 | 45.0 | | | | | | | |
| | PD 1-7 | CP 1-7 | | 45.0 | | | | | | |
| | PD 1-8 | CP 1-8 | | | 45.0 | | | | | |
| | PD 1-9 | CP 1-1 | | | | 30.0 | | | | |
| | PD 1-10 | CP 1-1 | | | | | 30.0 | | | |
| | PD 1-11 | CP 1-1 | | | | | | 30.0 | | |
| | PD 1-12 | CP 1-9 | | | | | | | 45.0 | |
| | PD 1-13 | CP 1-10 | | | | | | | | 45.0 |
| | RPD 1-1 | RCP 1-1 | | | | | | | | |
| | RPD 1-2 | RCP 1-1 | | | | | | | | |
| | RPD 1-3 | RCP 1-1 | | | | | | | | |
| | RPD 1-4 | RCP 1-1 | | | | | | | | |
| | RPD 1-5 | RCP 1-2 | | | | | | | | |
| | RPD 1-6 | RCP 1-3 | | | | | | | | |
| Water soluble organic solvent | 1,3-butanediol | | 10.0 | 10.0 | 10.0 | 15.0 | 10.0 | 10.0 | 10.0 | 10.0 |
| | Glycerin | | 10.0 | 10.0 | 10.0 | 10.0 | 10.0 | 10.0 | 10.0 | 10.0 |
| | 3-methoxy-N,N-dimethylpropaneamide | | 10.0 | 10.0 | 10.0 | 20.0 | 10.0 | 10.0 | 10.0 | 10.0 |
| Surfactant | Zonyl™ FS-300 | | 1.0 | 1.0 | 1.0 | 1.0 | 1.0 | 1.0 | 1.0 | 1.0 |
| Solvent | Deionized water | | Rest | Rest | Rest | Rest | Rest | Rest | Rest | Rest |
| | Total | | 100.0 | 100.0 | 100.0 | 100.0 | 100.0 | 100.0 | 100.0 | 100.0 |

| | | | Comparative Example | | | | | |
|---|---|---|---|---|---|---|---|---|
| | Material name | Resin | 1 RGJ 1-1 | 2 RGJ 1-2 | 3 RGJ 1-3 | 4 RGJ 1-4 | 5 RGJ 1-5 | 6 RGJ 1-6 |
| Pigment dispersion | PD 1-1 | CP 1-1 | | | | | | |
| | PD 1-2 | CP 1-2 | | | | | | |

TABLE 7-1-continued

|  |  |  |  |  |  |  |  |  |
|---|---|---|---|---|---|---|---|---|
| PD 1-3 | CP 1-3 |  |  |  |  |  |  |
| PD 1-4 | CP 1-4 |  |  |  |  |  |  |
| PD 1-5A | CP 1-5A |  |  |  |  |  |  |
| PD 1-5B | CP 1-5B |  |  |  |  |  |  |
| PD 1-5C | CP 1-5C |  |  |  |  |  |  |
| PD 1-5D | CP 1-5D |  |  |  |  |  |  |
| PD 1-6 | CP 1-6 |  |  |  |  |  |  |
| PD 1-7 | CP 1-7 |  |  |  |  |  |  |
| PD 1-8 | CP 1-8 |  |  |  |  |  |  |
| PD 1-9 | CP 1-1 |  |  |  |  |  |  |
| PD 1-10 | CP 1-1 |  |  |  |  |  |  |
| PD 1-11 | CP 1-1 |  |  |  |  |  |  |
| PD 1-12 | CP 1-9 |  |  |  |  |  |  |
| PD 1-13 | CP 1-10 |  |  |  |  |  |  |
| RPD 1-1 | RCP 1-1 | 45.0 |  |  |  |  |  |
| RPD 1-2 | RCP 1-1 |  | 30.0 |  |  |  |  |
| RPD 1-3 | RCP 1-1 |  |  | 30.0 |  |  |  |
| RPD 1-4 | RCP 1-1 |  |  |  | 30.0 |  |  |
| RPD 1-5 | RCP 1-2 |  |  |  |  | 45.0 |  |
| RPD 1-6 | RCP 1-3 |  |  |  |  |  | 45.0 |
| Water soluble organic solvent | 1,3-butanediol | 10.0 | 15.0 | 10.0 | 10.0 | 10.0 | 10.0 |
|  | Glycerin | 10.0 | 10.0 | 10.0 | 10.0 | 10.0 | 10.0 |
|  | 3-methoxy-N,N-dimethyl propaneamide | 10.0 | 20.0 | 10.0 | 10.0 | 10.0 | 10.0 |
| Surfactant | Zonyl™ FS-300 | 1.0 | 1.0 | 1.0 | 1.0 | 1.0 | 1.0 |
| Solvent | Deionized water | Rest | Rest | Rest | Rest | Rest | Rest |
|  | Total | 100.0 | 100.0 | 100.0 | 100.0 | 100.0 | 100.0 |

Storage Stability of Pigment Dispersion

A glass container was filled with each pigment dispersion and stored at 70 degrees C. for two weeks. The change rate of the viscosity after storage to the viscosity before storage was obtained from the following relation and evaluated according to the following criteria.

Change rate of viscosity (%)=(Viscosity of pigment dispersion after storage−Viscosity of pigment dispersion before storage)/(Viscosity of pigment dispersion before storage)×100  Equation 1

The viscosity was measured by a viscometer (RE80L, manufactured by TOKI SANGYO CO., LTD.) to measure the viscosity of the ink at 25 degrees C. at 50 rotations.

Evaluation Criteria

AA: Change rate of viscosity within −3 percent to +3%

A: Change rate of viscosity within the range of from −5 percent to less than −3 percent and from more than 3 percent to 5 percent B: Change rate of viscosity within the range of from −8% to less than −5% and more than 5% to 8%

C: Change rate of viscosity within −10% to less than −8% and greater than 8% to 10%.

D: Change rate of viscosity within the range of from less than −10% to −30% and more than 10% to 30%

E: Change rate of viscosity less than 30% or greater than 30% (gelated to the degree that evaluation was not possible)

Storage Stability of Ink

An ink cartridge was filled with each ink and stored at 70 degrees C. for one week. The fluctuation rate of the viscosity after the storage to the viscosity before the storage was obtained from the following relation and evaluated according to the following criteria.

Change rate of viscosity (%)=(Viscosity of ink after storage−Viscosity of ink before storage)/(Viscosity of ink before storage)×100  Equation 2

The viscosity was measured by a viscometer (RE80L, manufactured by TOKI SANGYO CO., LTD.) to measure the viscosity of the ink at 25 degrees C. at 50 rotations.

Evaluation Criteria

AA: Change rate of viscosity within −3 percent to +3%

A: Change rate of viscosity within the range of from −5 percent to less than −3 percent and from more than 3 percent to 5 percent B: Change rate of viscosity within the range of from −8% to less than −5% and more than 5% to 8%

C: Change rate of viscosity within −10% to less than −8% and greater than 8% to 10%.

D: Change rate of viscosity within the range of from less than −10% to −30% and more than 10% to 30%

E: Change rate of viscosity less than 30% or greater than 30% (gelated to the degree that evaluation was not possible)

Image Density

An inkjet printer (IPSiO GX5000) was filled with each ink at 23 degrees C. and 50 percent RH. A chart including general symbols of 64 point JIS X 0208 (1997), 2223 made by Microsoft Word 2000 (manufactured by Microsoft Corporation) was printed on plain paper 1 (Xerox 4200, manufactured by Xerox Corporation) and paper 2 (My Paper, manufactured by Ricoh Company Ltd.) The symbol portion on image surface was measured by X-Rite 938 (manufactured by X-Rite Inc.) and evaluated according to the following criteria.

The print mode used was: A modified mode in which "Plain Paper—Standard Fast" was modified to "No Color Calibration" from the user setting for plain paper by the driver installed onto the printer.

Incidentally, the symbols of JIS X 0208 (1997), 2223 had squares for the exterior and the inside thereof was entirely painted with ink.

Evaluation Criteria

AA: 1.27 or higher
A: 1.25 to less than 1.27
B: 1.20 to less than 1.25
C: 1.10 to less than 1.20
D: Less than 1.10
E. pigment was gelated and not dispersed in ink, impossible to print symbols.

TABLE 8-1

| Ink name | Pigment dispersion | Evaluations | | | |
|---|---|---|---|---|---|
| | | Pigment dispersion Storage property | Ink Storage property | Image density Plain paper 1 | Image density Plain paper 2 |
| Example II-1 | GJ 1-1 | PD 1-1 | A | A | A | A |
| Example II-2 | GJ 1-2 | PD 1-2 | A | B | A | A |
| Example II-3 | GJ 1-3 | PD 1-3 | B | A | A | A |
| Example II-4 | GJ 1-4 | PD 1-4 | B | B | A | A |
| Example II-5 | GJ 1-5A | PD 1-5A | A | A | A | A |
| Example II-6 | GJ 1-5B | PD 1-5B | A | A | B | B |
| Example II-7 | GJ 1-5C | PD 1-5C | B | A | A | A |
| Example II-8 | GJ 1-5D | PD 1-5D | B | A | A | A |
| Example II-9 | GJ 1-6 | PD 1-6 | A | A | A | B |
| Example II-10 | GJ 1-7 | PD 1-7 | A | B | A | A |
| Example II-11 | GJ 1-8 | PD 1-8 | B | B | B | A |
| Example II-12 | GJ 1-9 | PD 1-9 | A | A | A | A |
| Example II-13 | GJ 1-10 | PD 1-10 | A | A | A | A |
| Example II-14 | GJ 1-11 | PD 1-11 | A | A | A | A |
| Example II-15 | GJ 1-12 | PD 1-12 | A | B | A | A |
| Example II-16 | GJ 1-13 | PD 1-13 | B | B | A | A |
| Comparative Example 1 | RGJ 1-1 | RPD 1-1 | D | D | C | C |
| Comparative Example 2 | RGJ 1-2 | RPD 1-2 | D | D | C | C |
| Comparative Example 3 | RGJ 1-3 | RPD 1-3 | E | E | E | E |
| Comparative Example 4 | RGJ 1-4 | RPD 1-4 | E | E | E | E |
| Comparative Example 5 | RGJ 1-5 | RPD 1-5 | C | E | C | C |
| Comparative Example 6 | RGJ 1-6 | RPD 1-6 | E | E | C | C |

As seen in the evaluations, the pigment dispersions prepared by using the copolymers having the structure unit represented by the Chemical formula 1 illustrated above and the structure unit represented by the Chemical formula 2 illustrated above of Examples II-1 to II-16 had excellent storage stability in comparison with the pigment dispersion prepared by using the copolymers having no structure unit represented by the Chemical formula 2 or Comparative Examples 1 to 5. This is inferred to be the result of improved adsorption property to the pigment due to the π-π interaction between the naphtyl group in the structure unit represented by the Chemical formula 2 of the copolymer and the pigment. In addition, the pigment dispersant of Comparative Example 6 prepared by using the copolymer having no structure unit represented by the Chemical formula 1 was not well dispersed in water because the hydrophilicity of tetramethylene glycol chain in the structure unit used instead of the structure unit represented by Chemical formula 1 was low.

As seen in the evaluations, the inks manufactured by using the dispersion containing the copolymers of the present disclosure of Examples II-1 to II-16 had high levels of storage stability and were excellent with regard to image density in comparison with the inks manufactured by using the dispersions containing the copolymers of Comparative Examples 1 to 6, which were different from those of the present disclosure.

Example II'-1 to II'-12

Preparation of Aqueous Ink GJ 1'-1 to GJ 1'-12

Preparation of Pigment Dispersions PD-1 to PD 1'-12

The aqueous solution of the copolymers CP 1'-1 to CP 1'-9 prepared in Examples I'-1 to I'-9, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 6-2 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 1'-1 to PD 1'-12. The values in Table 6-2 are represented in part. The pigment dispersions PD 1'-1 to PD 1'-6 and PD 1'-10 to PD 1'-12 had a pigment solid portion concentration of 16 percent and the pigment dispersions PD 1'-7 to PD 1'-9 had a pigment solid portion concentration of 20 percent.

Preparation of Ink

Pigment dispersions PD 1'-1 to PD 1'-12, 3-ethyl-3-hydroxydimethyloxetan, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 7-2 followed by stirring for one hour and filtration by a membrane filter having an opening diameter of 1.2 micro meter to obtain aqueous inks GJ 1'-1 to GJ 1'-12 of the present disclosure. The values in Table 7-2 are represented in part.

Characteristics of the pigment dispersion and aqueous inks prepared in Examples II'-1 to II'-12 were evaluated in the same manner as Example II-1.

The prepared pigment dispersions are shown in Table 6-2, the prepared aqueous inks are shown in Table 7-2, and the evaluation results are shown in Table 8-2.

TABLE 6-2

| | Pigment dispersion | | | | | |
|---|---|---|---|---|---|---|
| | PD 1'-1 | PD 1'-2 | PD 1'-3 | PD 1'-4 | PD 1'-5 | PD 1'-6 |
| CP 1'-1 10 percent by mass aqueous solution | 40.0 | | | | | |
| CP '-2 10 percent by mass aqueous solution | | 40.0 | | | | |
| CP 1'-3 10 percent by mass aqueous solution | | | 40.0 | | | |
| CP 1'-4 10 percent by mass aqueous solution | | | | 40.0 | | |
| CP 1'-5 10 percent by mass aqueous solution | | | | | 40.0 | |
| CP 1'-6 10 percent by mass aqueous solution | | | | | | 40.0 |
| CP 1'-7 10 percent by mass aqueous solution | | | | | | |
| CP 1'-8 10 percent by mass aqueous solution | | | | | | |
| CP 1'-9 10 percent by mass aqueous solution | | | | | | |
| Carbon Black | 16.0 | 16.0 | 16.0 | 16.0 | 16.0 | 16.0 |
| Pigment Blue 15:3 | | | | | | |
| Pigment Red 122 | | | | | | |
| Pigment Yellow 74 | | | | | | |
| Deionized water | Rest | Rest | Rest | Rest | Rest | Rest |
| Total | 100.0 | 100.0 | 100.0 | 100.0 | 100.0 | 100.0 |

| | Pigment dispersion | | | | | |
|---|---|---|---|---|---|---|
| | PD 1'-7 | PD 1'-8 | PD 1'-9 | PD 1'-10 | PD 1'-11 | PD 1'-12 |
| CP 1'-1 10 percent by mass aqueous solution | | | | | | |
| CP 1'-2 10 percent by mass aqueous solution | | | | | | |
| CP 1'-3 10 percent by mass aqueous solution | | | | | | |
| CP 1'-4 10 percent by mass aqueous solution | | | | | | |
| CP 1'-5 10 percent by mass aqueous solution | | | | | | |
| CP 1'-6 10 percent by mass aqueous solution | 40.0 | 40.0 | 40.0 | | | |
| CP 1'-7 10 percent by mass aqueous solution | | | | 40.0 | | |
| CP 1'-8 10 percent by mass aqueous solution | | | | | 40.0 | |
| CP 1'-9 10 percent by mass aqueous solution | | | | | | 40.0 |
| Carbon Black | | | | 16.0 | 16.0 | 16.0 |
| Pigment Blue 15:3 | 20.0 | | | | | |
| Pigment Red 122 | | 20.0 | | | | |
| Pigment Yellow 74 | | | 20.0 | | | |
| Deionized water | Rest | Rest | Rest | Rest | Rest | Rest |
| Total | 100.0 | 100.0 | 100.0 | 100.0 | 100.0 | 100.0 |

TABLE 7-2

| | | | Example | | | | | |
|---|---|---|---|---|---|---|---|---|
| | | | II'-1 | II'-2 | II'-3 | II'-4 | II'-5 | II'-6 |
| Material name | | Resin | GJ 1'-1 | GJ 1'-2 | GJ 1'-3 | GJ 1'-4 | GJ 1'-5 | GJ 1'-6 |
| Pigment dispersion | PD 1'-1 | CP 1'-1 | 45.0 | | | | | |
| | PD 1'-2 | CP 1'-2 | | 45.0 | | | | |
| | PD 1'-3 | CP 1'-3 | | | 45.0 | | | |
| | PD 1'-4 | CP 1'-4 | | | | 45.0 | | |
| | PD 1'-5 | CP 1'-5 | | | | | 45.0 | |
| | PD 1'-6 | CP 1'-6 | | | | | | 45.0 |
| | PD 1'-7 | CP 1'-6 | | | | | | |

TABLE 7-2-continued

| Material name | Resin | | | | | | |
|---|---|---|---|---|---|---|---|
| Pigment dispersion | PD 1'-8 CP 1'-6 | | | | | | |
| | PD 1'-9 CP 1'-6 | | | | | | |
| | PD 1'-10 CP 1'-7 | | | | | | |
| | PD 1'-11 CP 1'-8 | | | | | | |
| | PD 1'-12 CP 1'-9 | | | | | | |
| Water soluble organic solvent | 3-ethyl-3-hydroxymethyl oxetane methanol | 15.0 | 15.0 | 15.0 | 15.0 | 15.0 | 15.0 |
| | 3-methoxy-N,N-dimethyl propionamide | 15.0 | 15.0 | 15.0 | 15.0 | 15.0 | 15.0 |
| Surfactant | Zonyl™ FS-300 | 1.0 | 1.0 | 1.0 | 1.0 | 1.0 | 1.0 |
| Solvent | Deionized water | Rest | Rest | Rest | Rest | Rest | Rest |
| | Total | 100.0 | 100.0 | 100.0 | 100.0 | 100.0 | 100.0 |

| | | Example | | | | | |
|---|---|---|---|---|---|---|---|
| Material name | Resin | II'-7 GJ 1'-7 | II'-8 GJ 1'-8 | II'-9 GJ 1'-9 | II'-10 GJ 1'-10 | II'-11 GJ 1'-11 | II'-12 GJ 1'-12 |
| Pigment dispersion | PD 1'-1 CP 1'-1 | | | | | | |
| | PD 1'-2 CP 1'-2 | | | | | | |
| | PD 1'-3 CP 1'-3 | | | | | | |
| | PD 1'-4 CP 1'-4 | | | | | | |
| | PD 1'-5 CP 1'-5 | | | | | | |
| | PD 1'-6 CP 1'-6 | | | | | | |
| | PD 1'-7 CP 1'-6 | 30.0 | | | | | |
| | PD 1'-8 CP 1'-6 | | 30.0 | | | | |
| | PD 1'-9 CP 1'-6 | | | 30.0 | | | |
| | PD 1'-10 CP 1'-7 | | | | 45.0 | | |
| | PD 1'-11 CP 1'-8 | | | | | 45.0 | |
| | PD 1'-12 CP 1'-9 | | | | | | 45.0 |
| Water soluble organic solvent | 3-ethyl-3-hydroxymethyl oxetane methanol | 15.0 | 15.0 | 15.0 | 15.0 | 15.0 | 15.0 |
| | 3-methoxy-N,N-dimethyl propionamide | 15.0 | 15.0 | 15.0 | 15.0 | 15.0 | 15.0 |
| Surfactant | Zonyl™ FS-300 | 1.0 | 1.0 | 1.0 | 1.0 | 1.0 | 1.0 |
| Solvent | Deionized water | Rest | Rest | Rest | Rest | Rest | Rest |
| | Total | 100.0 | 100.0 | 100.0 | 100.0 | 100.0 | 100.0 |

TABLE 8-2

| | | Evaluations | | | |
|---|---|---|---|---|---|
| Ink name | Pigment dispersion | Pigment dispersion Storage property | Ink Storage property | Image Density Plain paper 1 | Image Density Plain paper 2 |
| Example II'-1 | GJ 1'-1 | PD 1'-1 | C | C | A | B |
| Example II'-2 | GJ 1'-2 | PD 1'-2 | B | C | A | A |
| Example II'-3 | GJ 1'-3 | PD 1'-3 | A | C | A | A |
| Example II'-4 | GJ 1'-4 | PD 1'-4 | AA | C | B | A |
| Example II'-5 | GJ 1'-5 | PD 1'-5 | AA | B | A | A |
| Example II'-6 | GJ 1'-6 | PD 1'-6 | AA | A | A | B |
| Example II'-7 | GJ 1'-7 | PD 1'-7 | AA | A | B | A |
| Example II'-8 | GJ 1'-8 | PD 1'-8 | AA | A | A | A |
| Example II'-9 | GJ 1'-9 | PD 1'-9 | AA | A | A | B |
| Example II'-10 | GJ 1'-10 | PD 1'-10 | A | A | B | A |
| Example II'-11 | GJ 1'-11 | PD 1'-11 | B | A | A | A |
| Example II'-12 | GJ 1'-12 | PD 1'-12 | A | A | B | A |

As seen in the evaluations, the pigment dispersions prepared by using the copolymers having the structure unit represented by the Chemical formula 1 illustrated above and the structure unit represented by the Chemical formula 2 illustrated above of the present disclosure of Examples II'-1 to II'-12 have better storage stability as the ethylene glycol chain in the structure unit represented by the Chemical formula 1 illustrated above becomes longer. This is because the steric mutual interaction in water increases as the hydrophilic ethylene glycol chain becomes longer. In addition, the ink stability is improved by increasing the composition ratio of the structure unit represented by the Chemical formula 2 in the copolymer.

Example II-17 to II-34

Preparation of Aqueous Ink GJ 2-1 to GJ 2-13

Preparation of Pigment Dispersions PD 2-1 to PD 2-13

The aqueous solution of the copolymers CP 2-1 to CP 2-10 prepared in Examples I-14 to I-28, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 9 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 2-1 to PD 2-13. The values in Table 9 are represented in part. The pigment dispersions PD 2-1 to PD 2-8 and PD 2-12 to PD 2-13 had a pigment solid portion concentration of 16 percent and the pigment dispersions PD 2-9 to PD 2-11 had a pigment solid portion concentration of 20 percent.

Preparation of Ink

Pigment dispersions PD 2-1 to PD 2-13, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 10 followed by stirring for one hour and filtration by a membrane filter having an opening diameter of 1.2 micro meter to obtain aqueous inks GJ 2-1 to GJ 2-13 of the present disclosure. The values in Table 10 are represented in part.

Comparative Examples 7 to 10

Preparation of Comparative Aqueous Inks RGJ 2-1 to RGJ 2-4

6.36 g of a copolymer RCP 2-1 (weight average molecular weight (Mw): 7,500, number average molecular weight (Mn): 2,800) was obtained in the same manner as in Example I-14 except that the monomer M-1 was replaced with a monomer having a structure represented by the following Chemical structure 15. An aqueous solution of the copolymer RCP 2-1 was prepared in the same manner as in Example I-14.

Chemical structure 15

(structure: methacrylate ester with −O−CH₂CH₂−NH−C(=O)−(CH₂)₆H)

Comparative pigment dispersions RPD 2-1 to RPD 2-4 were obtained by mixing the aqueous solution of the copolymer RCP 2-1, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water with a ratio shown in Table 9.

Thereafter, pigment dispersions PD-110 to PD 2-4, 1,3-butanediol, glycerin, 3-methoxy-N,N-diemthyl propionamide, fluorine-containing surfactant (ZONYL™ FS-300, solid portion: 40 percent by mass, manufactured by E.I. du Pont de Nemours and Company), and deionized water were mixed the ratio shown in Table 10 followed by stirring for one hour and filtration by a membrane filter having, an opening diameter of 1,2 micro meter to obtain comparative aqueous inks RGJ 2-1 to RGJ 2-4.

Comparative Example II

Preparation of Comparative Aqueous Ink RGJ 2-5

A copolymer RCP 2-2 was obtained in the same manner as in Example I-14 except that the polytheleneglycol monomethacrylate was replaced with poly(ethyleneglycol-.tetramethyleneglycol)-monomethacrylate represented by the following Chemical structure. An aqueous solution of the copolymer RCP 2-2 was prepared in the same manner as in Example I-14, (structure: $H_2C=C(CH_3)-C(=O)-O-[(C_2H_4O)_m-(C_4H_8O)_n]-H$)

m ≈ 10  n ≈ 5

Thereafter, a comparative pigment dispersion RPD 2-5 was obtained in the same manner as in Example II-17 except that the aqueous solution of the comparative copolymer RCP 2-2 was used instead of the aqueous solution of the copolymer CP 2-1 in the preparation of the pigment dispersion at Example II-17

Thereafter, a comparative aqueous ink RGJ 2-5 was obtained in the same manner as in Example II-17 except that the comparative pigment dispersion element RPD 2-5 was used instead of the pigment dispersion element PD 2-1 in the manufacturing of the ink of Example II-17.

Characteristics of the pigment dispersion and aqueous inks prepared in Examples II-17 to II-34 and Comparative Examples 7 to 11 were evaluated in the same manner as Example II-1.

The prepared pigment dispersions are shown in Table 9, the prepared aqueous inks are shown in Table 10, and the evaluation results are shown in Table 11.

TABLE 9

| | Pigment dispersion | | | | | | | |
|---|---|---|---|---|---|---|---|---|
| | PD 2-1 | PD 2-1' | PD 2-1" | PD 2-2 | PD 2-3 | PD 2-4 | PD 2-5A | PD 2-5B |
| CP 2-1 10 percent by mass aqueous solution | 40.0 | | | | | | | |
| CP 2-1' 10 percent by mass aqueous solution | | 40.0 | | | | | | |
| CP 2-1" 10 percent by mass aqueous solution | | | 40.0 | | | | | |
| CP 2-2 10 percent by mass aqueous solution | | | | 40.0 | | | | |
| CP 2-3 10 percent by mass aqueous solution | | | | | 40.0 | | | |
| CP 2-4 10 percent by mass aqueous solution | | | | | | 40.0 | | |
| CP 2-5A 10 percent by mass aqueous solution | | | | | | | 40.0 | |
| CP 2-5B 10 percent by mass aqueous solution | | | | | | | | 40.0 |
| CP 2-5C 10 percent by mass aqueous solution | | | | | | | | |
| CP 2-5D 10 percent by mass aqueous solution | | | | | | | | |
| CP 2-6 10 percent by mass aqueous solution | | | | | | | | |
| CP 2-7 10 percent by mass aqueous solution | | | | | | | | |

TABLE 9-continued

|  | | | | | | | | |
|---|---|---|---|---|---|---|---|---|
| CP 2-8 10 percent by mass aqueous solution | | | | | | | | |
| CP 2-9 10 percent by mass aqueous solution | | | | | | | | |
| CP 2-10 10 percent by mass aqueous solution | | | | | | | | |
| RCP 2-1 10 percent by mass aqueous solution | | | | | | | | |
| RCP 2-2 10 percent by mass aqueous solution | | | | | | | | |
| Carbon Black | 16.0 | 16.0 | 16.0 | 16.0 | 16.0 | 16.0 | 16.0 | 16.0 |
| Pigment Blue 15:3 | | | | | | | | |
| Pigment Red 122 | | | | | | | | |
| Pigment Yellow 74 | | | | | | | | |
| Deionized water | Rest | Rest | Rest | Rest | Rest | Rest | Rest | Rest |
| Total | 100.0 | 100.0 | 100.0 | 100.0 | 100.0 | 100.0 | 100.0 | 100.0 |

Pigment dispersion

|  | PD 2-5C | PD 2-5D | PD 2-6 | PD 2-7 | PD 2-8 | PD 2-9 | PD 2-10 | PD 2-11 |
|---|---|---|---|---|---|---|---|---|
| CP 2-1 10 percent by mass aqueous solution | | | | | | 40.0 | 40.0 | 40.0 |
| CP 2-1' 10 percent by mass aqueous solution | | | | | | | | |
| CP 2-1'' 10 percent by mass aqueous solution | | | | | | | | |
| CP 2-2 10 percent by mass aqueous solution | | | | | | | | |
| CP 2-3 10 percent by mass aqueous solution | | | | | | | | |
| CP 2-4 10 percent by mass aqueous solution | | | | | | | | |
| CP 2-5A 10 percent by mass aqueous solution | | | | | | | | |
| CP 2-5B 10 percent by mass aqueous solution | | | | | | | | |
| CP 2-5C 10 percent by mass aqueous solution | 40.0 | | | | | | | |
| CP 2-5D 10 percent by mass aqueous solution | | 40.0 | | | | | | |
| CP 2-6 10 percent by mass aqueous solution | | | 40.0 | | | | | |
| CP 2-7 10 percent by mass aqueous solution | | | | 40.0 | | | | |
| CP 2-8 10 percent by mass aqueous solution | | | | | 40.0 | | | |
| CP 2-9 10 percent by mass aqueous solution | | | | | | | | |
| CP 2-10 10 percent by mass aqueous solution | | | | | | | | |
| RCP 2-1 10 percent by mass aqueous solution | | | | | | | | |
| RCP 2-2 10 percent by mass aqueous solution | | | | | | | | |
| Carbon Black | 16.0 | 16.0 | 16.0 | 16.0 | 16.0 | | | |
| Pigment Blue 15:3 | | | | | | 20.0 | | |
| Pigment Red 122 | | | | | | | 20.0 | |
| Pigment Yellow 74 | | | | | | | | 20.0 |
| Deionized water | Rest | Rest | Rest | Rest | Rest | Rest | Rest | Rest |
| Total | 100.0 | 100.0 | 100.0 | 100.0 | 100.0 | 100.0 | 100.0 | 100.0 |

Pigment dispersion

|  | PD 2-12 | PD 2-13 | RPD 2-1 | RPD 2-2 | RPD 2-3 | RPD 2-4 | RPD 2-5 |
|---|---|---|---|---|---|---|---|
| CP 2-1 10 percent by mass aqueous solution | | | | | | | |
| CP 2-1' 10 percent by mass aqueous solution | | | | | | | |
| CP 2-1'' 10 percent by mass aqueous solution | | | | | | | |
| CP 2-2 10 percent by mass aqueous solution | | | | | | | |
| CP 2-3 10 percent by mass aqueous solution | | | | | | | |
| CP 2-4 10 percent by mass aqueous solution | | | | | | | |
| CP 2-5A 10 percent by mass aqueous solution | | | | | | | |
| CP 2-5B 10 percent by mass aqueous solution | | | | | | | |

TABLE 9-continued

| | | | | | | | |
|---|---|---|---|---|---|---|---|
| CP 2-5C 10 percent by mass aqueous solution | | | | | | | |
| CP 2-5D 10 percent by mass aqueous solution | | | | | | | |
| CP 2-6 10 percent by mass aqueous solution | | | | | | | |
| CP 2-7 10 percent by mass aqueous solution | | | | | | | |
| CP 2-8 10 percent by mass aqueous solution | | | | | | | |
| CP 2-9 10 percent by mass aqueous solution | 40.0 | | | | | | |
| CP 2-10 10 percent by mass aqueous solution | | 40.0 | | | | | |
| RCP 2-1 10 percent by mass aqueous solution | | | 40.0 | 40.0 | 40.0 | 40.0 | |
| RCP 2-2 10 percent by mass aqueous solution | | | | | | | 40.0 |
| Carbon Black | 16.0 | 16.0 | 16.0 | | | | 16.0 |
| Pigment Blue 15:3 | | | | 20.0 | | | |
| Pigment Red 122 | | | | | 20.0 | | |
| Pigment Yellow 74 | | | | | | 20.0 | |
| Deionized water | Rest | Rest | Rest | Rest | Rest | Rest | Rest |
| Total | 100.0 | 100.0 | 100.0 | 100.0 | 100.0 | 100.0 | 100.0 |

TABLE 10

| | | | Example | | | | | | |
|---|---|---|---|---|---|---|---|---|---|
| | | | II-17 GJ 2-1 | II-18 GJ 2-1' | II-19 GJ 2-1" | II-20 GJ 2-2 | II-21 GJ 2-3 | II-22 GJ 2-4 | II-23 GJ 2-5A |
| | Material name | Resin | | | | | | | |
| Pigment dispersion | PD 2-1 | CP 2-1 | 45.0 | | | | | | |
| | PD 2-1' | CP 2-1' | | 45.0 | | | | | |
| | PD 2-1" | CP 2-1" | | | 45.0 | | | | |
| | PD 2-2 | CP 2-2 | | | | 45.0 | | | |
| | PD 2-3 | CP 2-3 | | | | | 45.0 | | |
| | PD 2-4 | CP 2-4 | | | | | | 45.0 | |
| | PD 2-5A | CP 2-5A | | | | | | | 45.0 |
| | PD 2-5B | CP 2-5B | | | | | | | |
| | PD 2-5C | CP 2-5C | | | | | | | |
| | PD 2-5D | CP 2-5D | | | | | | | |
| | PD 2-6 | CP 2-6 | | | | | | | |
| | PD 2-7 | CP 2-7 | | | | | | | |
| | PD 2-8 | CP 2-8 | | | | | | | |
| | PD 2-9 | CP 2-1 | | | | | | | |
| | PD 2-10 | CP 2-1 | | | | | | | |
| | PD 2-11 | CP 2-1 | | | | | | | |
| | PD 2-12 | CP 2-9 | | | | | | | |
| | PD 2-13 | CP 2-10 | | | | | | | |
| | RPD 2-1 | RCP 2-1 | | | | | | | |
| | RPD 2-2 | RCP 2-1 | | | | | | | |
| | RPD 2-3 | RCP 2-1 | | | | | | | |
| | RPD 2-4 | RCP 2-1 | | | | | | | |
| | RPD 2-5 | RCP 2-2 | | | | | | | |
| Water soluble organic solvent | 1,3-butane diol | | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 |
| | 3-methoxy-N,N-dimethyl propionamide | | 10.0 | 10.0 | 10.0 | 10.0 | 10.0 | 10.0 | 10.0 |
| Surfactant | Zonyl™ FS-300 | | 1.0 | 1.0 | 1.0 | 1.0 | 1.0 | 1.0 | 1.0 |
| Solvent | Deionized water | | Rest | Rest | Rest | Rest | Rest | Rest | Rest |
| | Total | | 100.0 | 100.0 | 100.0 | 100.0 | 100.0 | 100.0 | 100.0 |

| | | | Example | | | | | |
|---|---|---|---|---|---|---|---|---|
| | | | II-24 GJ 2-5B | II-25 GJ 2-5C | II-26 GJ 2-5D | II-27 GJ 2-6 | II-28 GJ 2-7 | II-29 GJ 2-8 |
| | Material name | Resin | | | | | | |
| Pigment dispersion | PD 2-1 | CP 2-1 | | | | | | |
| | PD 2-1' | CP 2-1' | | | | | | |
| | PD 2-1" | CP 2-1" | | | | | | |
| | PD 2-2 | CP 2-2 | | | | | | |
| | PD 2-3 | CP 2-3 | | | | | | |
| | PD 2-4 | CP 2-4 | | | | | | |
| | PD 2-5A | CP 2-5A | | | | | | |

TABLE 10-continued

|  |  |  |  |  |  |  |  |  |
|---|---|---|---|---|---|---|---|---|
|  | PD 2-5B | CP 2-5B | 45.0 |  |  |  |  |  |
|  | PD 2-5C | CP 2-5C |  | 45.0 |  |  |  |  |
|  | PD 2-5D | CP 2-5D |  |  | 45.0 |  |  |  |
|  | PD 2-6 | CP 2-6 |  |  |  | 45.0 |  |  |
|  | PD 2-7 | CP 2-7 |  |  |  |  | 45.0 |  |
|  | PD 2-8 | CP 2-8 |  |  |  |  |  | 45.0 |
|  | PD 2-9 | CP 2-1 |  |  |  |  |  |  |
|  | PD 2-10 | CP 2-1 |  |  |  |  |  |  |
|  | PD 2-11 | CP 2-1 |  |  |  |  |  |  |
|  | PD 2-12 | CP 2-9 |  |  |  |  |  |  |
|  | PD 2-13 | CP 2-10 |  |  |  |  |  |  |
|  | RPD 2-1 | RCP 2-1 |  |  |  |  |  |  |
|  | RPD 2-2 | RCP 2-1 |  |  |  |  |  |  |
|  | RPD 2-3 | RCP 2-1 |  |  |  |  |  |  |
|  | RPD 2-4 | RCP 2-1 |  |  |  |  |  |  |
|  | RPD 2-5 | RCP 2-2 |  |  |  |  |  |  |
| Water soluble organic solvent | 1,3-butane diol | | 10.0 | 10.0 | 10.0 | 10.0 | 10.0 | 10.0 |
|  | Glycerin | | 10.0 | 10.0 | 10.0 | 10.0 | 10.0 | 10.0 |
|  | 3-methoxy-N,N-dimethyl propionamide | | 10.0 | 10.0 | 10.0 | 10.0 | 10.0 | 10.0 |
| Surfactant | Zonyl™ FS-300 | | 1.0 | 1.0 | 1.0 | 1.0 | 1.0 | 1.0 |
| Solvent | Deionized water | | Rest | Rest | Rest | Rest | Rest | Rest |
|  | Total | | 100.0 | 100.0 | 100.0 | 100.0 | 100.0 | 100.0 |

|  |  |  | Comparative Example | | | | |
|---|---|---|---|---|---|---|---|
|  |  |  | 7 | 8 | 9 | 10 | 11 |
|  | Material name | Resin | RGJ 2-1 | RGJ 2-2 | RGJ 2-3 | RGJ 2-4 | RGJ 2-5 |
| Pigment dispersion | PD 2-1 | CP 2-1 |  |  |  |  |  |
|  | PD 2-1' | CP 2-1' |  |  |  |  |  |
|  | PD 2-1" | CP 2-1" |  |  |  |  |  |
|  | PD 2-2 | CP 2-2 |  |  |  |  |  |
|  | PD 2-3 | CP 2-3 |  |  |  |  |  |
|  | PD 2-4 | CP 2-4 |  |  |  |  |  |
|  | PD 2-5A | CP 2-5A |  |  |  |  |  |
|  | PD 2-5B | CP 2-5B |  |  |  |  |  |
|  | PD 2-5C | CP 2-5C |  |  |  |  |  |
|  | PD 2-5D | CP 2-5D |  |  |  |  |  |
|  | PD 2-6 | CP 2-6 |  |  |  |  |  |
|  | PD 2-7 | CP 2-7 |  |  |  |  |  |
|  | PD 2-8 | CP 2-8 |  |  |  |  |  |
|  | PD 2-9 | CP 2-1 |  |  |  |  |  |
|  | PD 2-10 | CP 2-1 |  |  |  |  |  |
|  | PD 2-11 | CP 2-1 |  |  |  |  |  |
|  | PD 2-12 | CP 2-9 |  |  |  |  |  |
|  | PD 2-13 | CP 2-10 |  |  |  |  |  |
|  | RPD 2-1 | RCP 2-1 | 45.0 |  |  |  |  |
|  | RPD 2-2 | RCP 2-1 |  | 30.0 |  |  |  |
|  | RPD 2-3 | RCP 2-1 |  |  | 30.0 |  |  |
|  | RPD 2-4 | RCP 2-1 |  |  |  | 30.0 |  |
|  | RPD 2-5 | RCP 2-2 |  |  |  |  | 45.0 |
| Water soluble organic solvent | 1,3-butane diol | | 10.0 | 15.0 | 10.0 | 10.0 | 10.0 |
|  | Glycerin | | 10.0 | 10.0 | 10.0 | 10.0 | 10.0 |
|  | 3-methoxy-N,N-dimethyl propionamide | | 10.0 | 20.0 | 10.0 | 10.0 | 10.0 |
| Surfactant | Zonyl™ FS-300 | | 1.0 | 1.0 | 1.0 | 1.0 | 1.0 |
| Solvent | Deionized water | | Rest | Rest | Rest | Rest | Rest |
|  | Total | | 100.0 | 100.0 | 100.0 | 100.0 | 100.0 |

TABLE 11

|  | Ink name | Pigment dispersion | Evaluations | | | |
|---|---|---|---|---|---|---|
|  |  |  | Pigment dispersion Storage property | Ink Storage property | Image Density Plain paper 1 | Image Density Plain paper 2 |
| Example II-17 | GJ 2-1 | PD 2-1 | A | A | AA | AA |
| Example II-18 | GJ 2-1' | PD 2-1' | A | B | AA | A |
| Example II-19 | GJ 2-1" | PD 2-1" | B | A | AA | AA |
| Example II-20 | GJ 2-2 | PD 2-2 | A | B | AA | AA |

TABLE 11-continued

| Ink | Pigment dispersion | Pigment dispersion Storage property | Ink Storage property | Image Density Plain paper 1 | Image Density Plain paper 2 |
|---|---|---|---|---|---|
| Example II-21 | GJ 2-3 | PD 2-3 B | A | AA | AA |
| Example II-22 | GJ 2-4 | PD 2-4 B | B | AA | AA |
| Example II-23 | GJ 2-5A | PD 2-5A A | A | AA | AA |
| Example II-24 | GJ 2-5B | PD 2-5B A | A | B | B |
| Example II-25 | GJ 2-5C | PD 2-5C B | A | AA | AA |
| Example II-26 | GJ 2-5D | PD 2-5D B | A | AA | AA |
| Example II-27 | GJ 2-6 | PD 2-6 A | A | A | B |
| Example II-28 | GJ 2-7 | PD 2-7 A | B | A | A |
| Example II-29 | GJ 2-8 | PD 2-8 B | B | B | A |
| Example II-30 | GJ 2-9 | PD 2-9 A | A | AA | AA |
| Example II-31 | GJ 2-10 | PD 2-10 A | A | AA | AA |
| Example II-32 | GJ 2-11 | PD 2-11 A | A | AA | AA |
| Example II-33 | GJ 2-12 | PD 2-12 A | B | AA | A |
| Example II-34 | GJ 2-13 | PD 2-13 B | B | AA | AA |
| Comparative Example 7 | RG J2-1 | RPD 2-1 D | D | C | C |
| Comparative Example 8 | RG J2-2 | RPD 2-2 D | D | C | C |
| Comparative Example 9 | RG J2-3 | RPD 2-3 E | E | E | E |
| Comparative Example 10 | RG J2-4 | RPD 2-4 E | E | E | E |
| Comparative Example 11 | RG J2-5 | RPD 2-5 E | E | C | C |

As seen in the evaluations, the pigment dispersions prepared by using the copolymers having the structure unit represented by the Chemical formula 1 illustrated above, the structure unit represented by the Chemical formula 2, and the structure unit represented by the Chemical formula 3 illustrated above of Examples II-17 to II-34 had excellent storage stability in comparison with the pigment dispersion prepared by using the copolymers having no structure unit represented by the Chemical formula 2 of Comparative Examples 7 to 10. This is inferred to be the result of improved adsorption property to the pigment due to the π-π interaction between the naphtyl group in the structure unit represented by the Chemical formula 2 of the copolymer and the pigment. In addition, the pigment dispersant of Comparative Example 11 prepared by using the copolymer having no structure unit represented by the Chemical formula 1 was not well dispersed in water because the hydrophilicity of tetramethylene glycol chain in the structure unit used instead of the structure unit represented by Chemical formula 1 was low.

As seen in the evaluations, the inks manufactured by using the dispersion containing the copolymers of the present disclosure of Examples II-17 to II-34 had high levels of storage stability and were excellent with regard to image density in comparison with the inks manufactured by using the dispersions containing the copolymers of Comparative Examples 7 to 11, which were different from those of the present disclosure.

Examples II-35 to II-51

Preparation of Aqueous Inks GJ 3-1 to GJ 3-13

Preparation of Pigment Dispersions PD 3-1 to PD 3-13

The aqueous solution of the copolymers CP 3-1 to CP 3-10 prepared in Examples I-29 to I-42, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 12 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 3-1 to PD 3-13. The values in Table 12 are represented in part. The pigment dispersions PD 3-1 to PD 3-10 had a pigment solid portion concentration of 16 percent and the pigment dispersions PD 3-11 to PD 3-13 had a pigment solid portion concentration of 20 percent.

Preparation of Ink

Pigment dispersions PD 3-1 to PD 3-13, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 13 followed by stirring for one hour and filtration by a membrane filter having an opening diameter of 1.2 micro meter to obtain aqueous inks GJ 3-1 to GJ 3-13 of the present disclosure. The values in Table 13 are represented in part.

Comparative Examples 12 to 15

Preparation of Comparative Aqueous Ink RGJ 3-1 to RGJ 3-4

6.36 g of a copolymer RCP 3-1 (weight average molecular weight (Mw): 7,500, number average molecular weight (Mn): 2,800) was obtained in the same manner as in Example I-29 except that the monomer M-1 was replaced with a monomer having a structure represented by the following Chemical structure 15. An aqueous solution of the copolymer RCP 3-1 was prepared in the same manner as in Example I-29.

Chemical structure 15

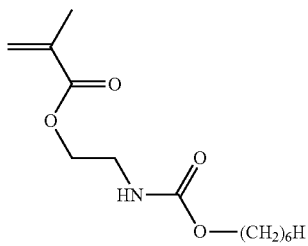

Comparative pigment dispersions RPD 3-1 to RPD 3-4 were obtained by mixing the aqueous solution of the copolymer RCP 3-1, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water with a ratio shown in Table 12.

Thereafter, pigment dispersions PD 3-1 to PD 3-4, 1,3-butanediol, glycerin, 3-methoxy-N,N-diemthyl propionamide, fluorine-containing surfactant (ZONYL™ FS-300, solid portion: 40 percent by mass, manufactured by E. I. du Pont de Nemours and Company), and deionized water were mixed in the ratio shown in Table 13 followed by stirring for one hour and filtration by a membrane filter having an opening diameter of 1.2 micro meter to obtain comparative aqueous inks RGJ 3-1 to RGJ 3-4.

Comparative Example 16

Preparation of Comparative Aqueous Ink RGJ 3-5

A copolymer RCP 3-2 was obtained in the same manner as in Example I-29 except that the polyethyleneglycol monomethacrylate was replaced with poly(ethyleneglycol-tetramethyleneglycol)-monomethacrylate represented by the following Chemical structure. An aqueous solution of the copolymer RCP 3-2 was prepared in the same manner as in Example I-29.

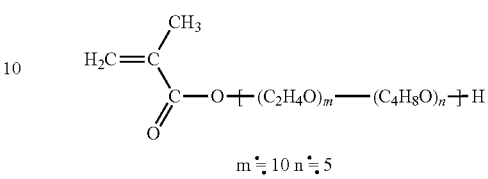

$m \fallingdotseq 10 \; n \fallingdotseq 5$

Thereafter, a comparative pigment dispersion RPD 3-5 was obtained in the same manner as in Example II-35 except that the aqueous solution of the comparative copolymer RCP 3-2 was used instead of the aqueous solution of the copolymer CP 3-1 in the preparation of the pigment dispersion of Example II-35.

Thereafter, a comparative aqueous, ink RGJ 3-5 was obtained in the same manner as in Example II-35 except that the comparative pigment dispersion element RPD 3-5 was used instead of the pigment dispersion element PD 3-1 in the manufacturing of the ink of Example II-35.

Characteristics of the pigment dispersion and aqueous inks prepared in Examples II-35 to II-51 and Comparative Examples 12 to 16 were evaluated in the same manner a Example II-1.

The prepared pigment dispersions are shown in Table 12, the prepared aqueous inks are shown in Table 13, and the evaluation results are shown in Table 14.

TABLE 12

| | Pigment dispersion | | | | | | | | | | |
|---|---|---|---|---|---|---|---|---|---|---|---|
| | PD 3-1 | PD 3-1' | PD 3-2 | PD 3-3 | PD 3-4 | PD 3-5A | PD 3-5B | PD 3-5C | PD 3-5D | PD 3-6 | PD 3-7 |
| CP 3-1 10 percent by mass aqueous solution | 40.0 | | | | | | | | | | |
| CP 3-1' 10 percent by mass aqueous solution | | 40.0 | | | | | | | | | |
| CP 3-2 10 percent by mass aqueous solution | | | 40.0 | | | | | | | | |
| CP 3-3 10 percent by mass aqueous solution | | | | 40.0 | | | | | | | |
| CP 3-4 10 percent by mass aqueous solution | | | | | 40.0 | | | | | | |
| CP 3-5A 10 percent by mass aqueous solution | | | | | | 40.0 | | | | | |
| CP 3-5B 10 percent by mass aqueous solution | | | | | | | 40.0 | | | | |

TABLE 12-continued

| | PD 3-8 | PD 3-9 | PD 3-10 | PD 3-11 | PD 3-12 | PD 3-13 | RPD 3-1 | RPD 3-2 | RPD 3-3 | RPD 3-4 | RPD 3-5 |
|---|---|---|---|---|---|---|---|---|---|---|---|
| CP 3-5C 10 percent by mass aqueous solution | | | | | | | 40.0 | | | | |
| CP 3-5D 10 percent by mass aqueous solution | | | | | | | | 40.0 | | | |
| CP 3-6 10 percent by mass aqueous solution | | | | | | | | | 40.0 | | |
| CP 3-7 10 percent by mass aqueous solution | | | | | | | | | | 40.0 | |
| CP 3-8 10 percent by mass aqueous solution | | | | | | | | | | | |
| CP 3-9 10 percent by mass aqueous solution | | | | | | | | | | | |
| CP 3-10 10 percent by mass aqueous solution | | | | | | | | | | | |
| RCP 3-1 10 percent by mass aqueous solution | | | | | | | | | | | |
| RCP 3-2 10 percent by mass aqueous solution | | | | | | | | | | | |
| Carbon Black | 16.0 | 16.0 | 16.0 | 16.0 | 16.0 | 16.0 | 16.0 | 16.0 | 16.0 | 16.0 | 16.0 |
| Pigment Blue 15:3 | | | | | | | | | | | |
| Pigment Red 122 | | | | | | | | | | | |
| Pigment Yellow 74 | | | | | | | | | | | |
| Deionized water | Rest | Rest | Rest | Rest | Rest | Rest | Rest | Rest | Rest | Rest | Rest |
| Total | 100.0 | 100.0 | 100.0 | 100.0 | 100.0 | 100.0 | 100.0 | 100.0 | 100.0 | 100.0 | 100.0 |

| | Pigment dispersion | | | | | | | | | | |
|---|---|---|---|---|---|---|---|---|---|---|---|
| | PD 3-8 | PD 3-9 | PD 3-10 | PD 3-11 | PD 3-12 | PD 3-13 | RPD 3-1 | RPD 3-2 | RPD 3-3 | RPD 3-4 | RPD 3-5 |
| CP 3-1 10 percent by mass aqueous solution | | | | 40.0 | 40.0 | 40.0 | | | | | |
| CP 3-1' 10 percent by mass aqueous solution | | | | | | | | | | | |
| CP 3-2 10 percent by mass aqueous solution | | | | | | | | | | | |
| CP 3-3 10 percent by mass aqueous solution | | | | | | | | | | | |
| CP 3-4 10 percent by mass aqueous solution | | | | | | | | | | | |
| CP 3-5A 10 percent by mass aqueous solution | | | | | | | | | | | |

TABLE 12-continued

| | | | | | | | | | | | |
|---|---|---|---|---|---|---|---|---|---|---|---|
| CP 3-5B 10 percent by mass aqueous solution | | | | | | | | | | | |
| CP 3-5C 10 percent by mass aqueous solution | | | | | | | | | | | |
| CP 3-5D 10 percent by mass aqueous solution | | | | | | | | | | | |
| CP 3-6 10 percent by mass aqueous solution | | | | | | | | | | | |
| CP 3-7 10 percent by mass aqueous solution | | | | | | | | | | | |
| CP 3-8 10 percent by mass aqueous solution | 40.0 | | | | | | | | | | |
| CP 3-9 10 percent by mass aqueous solution | | 40.0 | | | | | | | | | |
| CP 3-10 10 percent by mass aqueous solution | | | 40.0 | | | | | | | | |
| RCP 3-1 10 percent by mass aqueous solution | | | | 40.0 | 40.0 | 40.0 | 40.0 | | | | |
| RCP 3-2 10 percent by mass aqueous solution | | | | | | | | 40.0 | | | |
| Carbon Black | 16.0 | 16.0 | 16.0 | | | 16.0 | | | 16.0 | | |
| Pigment Blue 15:3 | | | | 20.0 | | | 20.0 | | | | |
| Pigment Red 122 | | | | | 20.0 | | | 20.0 | | | |
| Pigment Yellow 74 | | | | | | 20.0 | | | 20.0 | | |
| Deionized water | Rest | Rest | Rest | Rest | Rest | Rest | Rest | Rest | Rest | Rest | Rest |
| Total | 100.0 | 100.0 | 100.0 | 100.0 | 100.0 | 100.0 | 100.0 | 100.0 | 100.0 | 100.0 | 100.0 |

TABLE 13

| | | | Example | | | | | | | | | |
|---|---|---|---|---|---|---|---|---|---|---|---|---|
| | Material name | Resin | II-35 GJ 3-1 | II-36 GJ 3-1' | II-37 GJ 3-2 | II-38 GJ 3-3 | II-39 GJ 3-4 | II-40 GJ 3-5A | II-41 GJ 3-5B | II-42 GJ 3-5C | II-43 GJ 3-5D |
| Pigment dispersion | PD 3-1 | CP 3-1 | 45.0 | | | | | | | | |
| | PD 3-1' | CP 3-1' | | 45.0 | | | | | | | |
| | PD 3-2 | CP 3-2 | | | 45.0 | | | | | | |
| | PD 3-3 | CP 3-3 | | | | 45.0 | | | | | |
| | PD 3-4 | CP 3-4 | | | | | 45.0 | | | | |
| | PD 3-5A | CP 3-5A | | | | | | 45.0 | | | |
| | PD 3-5B | CP 3-5B | | | | | | | 45.0 | | |
| | PD 3-5C | CP 3-5C | | | | | | | | 45.0 | |

TABLE 13-continued

|  | Material name | Resin |  |
|---|---|---|---|
| | PD 3-5D | CP 3-5D | 45.0 |
| | PD 3-6 | CP 3-6 | |
| | PD 3-7 | CP 3-7 | |
| | PD 3-8 | CP 3-8 | |
| | PD 3-9 | CP 3-9 | |
| | PD 3-10 | CP 3-10 | |
| | PD 3-11 | CP 3-1 | |
| | PD 3-12 | CP 3-1 | |
| | PD 3-13 | CP 3-1 | |
| | RPD 3-1 | RCP 3-1 | |
| | RPD 3-2 | RCP 3-1 | |
| | RPD 3-3 | RCP 3-1 | |
| | RPD 3-4 | RCP 3-1 | |
| | RPD 3-5 | RCP 3-2 | |

|  | Material name | Resin | | | | | | | | |
|---|---|---|---|---|---|---|---|---|---|---|
| Water soluble organic solvent | 1,3-butane diol | | 10.0 | 10.0 | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 | 10.0 | 10.0 |
| | 3-methoxy-N,N-dimethyl propion-amide | | 10.0 | 10.0 | 10.0 | 10.0 | 10.0 | 10.0 | 10.0 | 10.0 | 10.0 |
| Surfactant | Zonyl™ FS-300 | | 1.0 | 1.0 | 1.0 | 1.0 | 1.0 | 1.0 | 1.0 | 1.0 | 1.0 |
| Solvent | Deionized water | | Rest | Rest | Rest | Rest | Rest | Rest | Rest | Rest | Rest |
| | Total | | 100.0 | 100.0 | 100.0 | 100.0 | 100.0 | 100.0 | 100.0 | 100.0 | 100.0 |

|  |  |  | Example | | | | | | | |
|---|---|---|---|---|---|---|---|---|---|---|
|  | Material name | Resin | II-44 GJ 3-6 | II-45 GJ 3-7 | II-46 GJ 3-8 | II-47 GJ 3-9 | II-48 GJ 3-10 | II-49 GJ 3-11 | II-50 GJ 3-12 | II-51 GJ 3-13 |
| Pigment dispersion | PD 3-1 | CP 3-1 | | | | | | | | |
| | PD 3-1' | CP 3-1' | | | | | | | | |
| | PD 3-2 | CP 3-2 | | | | | | | | |
| | PD 3-3 | CP 3-3 | | | | | | | | |
| | PD 3-4 | CP 3-4 | | | | | | | | |
| | PD 3-5A | CP 3-5A | | | | | | | | |
| | PD 3-5B | CP 3-5B | | | | | | | | |
| | PD 3-5C | CP 3-5C | | | | | | | | |
| | PD 3-5D | CP 3-5D | | | | | | | | |
| | PD 3-6 | CP 3-6 | 45.0 | | | | | | | |
| | PD 3-7 | CP 3-7 | | 45.0 | | | | | | |
| | PD 3-8 | CP 3-8 | | | 45.0 | | | | | |
| | PD 3-9 | CP 3-9 | | | | 45.0 | | | | |
| | PD 3-10 | CP 3-10 | | | | | 45.0 | | | |

TABLE 13-continued

|  | Material name | Resin |  |  |  |  |  |  |  |  |
|---|---|---|---|---|---|---|---|---|---|---|---|
|  | PD 3-11 | CP 3-1 |  |  |  |  |  | 30.0 |  |  |
|  | PD 3-12 | CP 3-1 |  |  |  |  |  |  | 30.0 |  |
|  | PD 3-13 | CP 3-1 |  |  |  |  |  |  |  | 30.0 |
|  | RPD 3-1 | RCP 3-1 |  |  |  |  |  |  |  |  |
|  | RPD 3-2 | RCP 3-1 |  |  |  |  |  |  |  |  |
|  | RPD 3-3 | RCP 3-1 |  |  |  |  |  |  |  |  |
|  | RPD 3-4 | RCP 3-1 |  |  |  |  |  |  |  |  |
|  | RPD 3-5 | RCP 3-2 |  |  |  |  |  |  |  |  |
| Water soluble organic solvent | 1,3-butane diol |  | 10.0 | 10.0 | 10.0 | 10.0 | 10.0 | 15.0 | 10.0 | 10.0 |
|  | Glycerin |  | 10.0 | 10.0 | 10.0 | 10.0 | 10.0 | 10.0 | 10.0 | 10.0 |
|  | 3-methoxy-N,N-dimethyl propionamide |  | 10.0 | 10.0 | 10.0 | 10.0 | 10.0 | 20.0 | 10.0 | 10.0 |
| Surfactant | Zonyl™ FS-300 |  | 1.0 | 1.0 | 1.0 | 1.0 | 1.0 | 1.0 | 1.0 | 1.0 |
| Solvent | Deionized water |  | Rest | Rest | Rest | Rest | Rest | Rest | Rest | Rest |
|  | Total |  | 100.0 | 100.0 | 100.0 | 100.0 | 100.0 | 100.0 | 100.0 | 100.0 |

|  |  |  | Comparative Example | | | | |
|---|---|---|---|---|---|---|---|
|  |  |  |  | 13 | 14 | 15 | 16 |
|  | Material name | Resin | RGJ 3-1 | RGJ 3-2 | RGJ 3-3 | RGJ 3-4 | RGJ 3-5 |
| Pigment dispersion | PD 3-1 | CP 3-1 |  |  |  |  |  |
|  | PD 3-1' | CP 3-1' |  |  |  |  |  |
|  | PD 3-2 | CP 3-2 |  |  |  |  |  |
|  | PD 3-3 | CP 3-3 |  |  |  |  |  |
|  | PD 3-4 | CP 3-4 |  |  |  |  |  |
|  | PD 3-5A | CP 3-5A |  |  |  |  |  |
|  | PD 3-5B | CP 3-5B |  |  |  |  |  |
|  | PD 3-5C | CP 3-5C |  |  |  |  |  |
|  | PD 3-5D | CP 3-5D |  |  |  |  |  |
|  | PD 3-6 | CP 3-6 |  |  |  |  |  |
|  | PD 3-7 | CP 3-7 |  |  |  |  |  |
|  | PD 3-8 | CP 3-8 |  |  |  |  |  |
|  | PD 3-9 | CP 3-9 |  |  |  |  |  |
|  | PD 3-10 | CP 3-10 |  |  |  |  |  |
|  | PD 3-11 | CP 3-1 |  |  |  |  |  |
|  | PD 3-12 | CP 3-1 |  |  |  |  |  |
|  | PD 3-13 | CP 3-1 |  |  |  |  |  |
|  | RPD 3-1 | RCP 3-1 | 45.0 |  |  |  |  |
|  | RPD 3-2 | RCP 3-1 |  | 30.0 |  |  |  |
|  | RPD 3-3 | RCP 3-1 |  |  | 30.0 |  |  |
|  | RPD 3-4 | RCP 3-1 |  |  |  | 30.0 |  |
|  | RPD 3-5 | RCP 3-2 |  |  |  |  | 45.0 |

TABLE 13-continued

| | | | | | | |
|---|---|---|---|---|---|---|
| Water soluble organic solvent | 1,3-butane diol | 10.0 | 15.0 | 10.0 | 10.0 | 10.0 |
| | Glycerin | 10.0 | 10.0 | 10.0 | 10.0 | 10.0 |
| | 3-methoxy-N,N-dimethyl propionamide | 10.0 | 20.0 | 10.0 | 10.0 | 10.0 |
| Surfactant | Zonyl™ FS-300 | 1.0 | 1.0 | 1.0 | 1.0 | 1.0 |
| Solvent | Deionized water | Rest | Rest | Rest | Rest | Rest |
| | Total | 100.0 | 100.0 | 100.0 | 100.0 | 100.0 |

TABLE 14

| | | | | Evaluations | | |
|---|---|---|---|---|---|---|
| | Ink name | Pigment dispersion | Pigment dispersion Storage property | Ink Storage property | Image density Plain paper 1 | Image density Plain paper 2 |
| Example II-35 | GJ 3-1 | PD 3-1 | A | AA | A | A |
| Example II-36 | GJ 3-1' | PD 3-1' | A | A | A | A |
| Example II-37 | GJ 3-2 | PD 3-2 | A | A | A | A |
| Example II-38 | GJ 3-3 | PD 3-3 | B | AA | A | A |
| Example II-39 | GJ 3-4 | PD 3-4 | B | A | A | A |
| Example II-40 | GJ 3-5A | PD 3-5A | A | AA | A | A |
| Example II-41 | GJ 3-5B | PD 3-5B | A | AA | B | B |
| Example II-42 | GJ 3-5C | PD 3-5C | B | AA | A | A |
| Example II-43 | GJ 3-5D | PD 3-5D | B | AA | A | A |
| Example II-44 | GJ 3-6 | PD 3-6 | A | AA | A | B |
| Example II-45 | GJ 3-7 | PD 3-7 | A | A | A | A |
| Example II-46 | GJ 3-8 | PD 3-8 | B | A | B | B |
| Example II-47 | GJ 3-9 | PD 3-9 | A | A | A | A |
| Example II-48 | GJ 3-10 | PD 3-10 | B | A | A | A |
| Example II-49 | GJ 3-11 | PD 3-11 | A | AA | A | A |
| Example II-50 | GJ 3-12 | PD 3-12 | A | AA | A | A |
| Example II-51 | GJ 3-13 | PD 3-13 | A | A | A | A |
| Comparative Example 12 | RGJ 3-1 | RPD 3-1 | D | D | C | D |
| Comparative Example 13 | RGJ 3-2 | RPD 3-2 | D | D | C | D |
| Comparative Example 14 | RGJ 3-3 | RPD 3-3 | E | E | E | E |
| Comparative Example 15 | RGJ 3-4 | RPD 3-4 | E | E | E | E |
| Comparative Example 16 | RGJ 3-5 | RPD 3-5 | E | E | D | D |

As seen in the evaluations, the pigment dispersions prepared by using the copolymers having the structure unit represented by the Chemical formula 1 illustrated above, the structure unit represented by the Chemical formula 2 illustrated above, and the structure unit represented by the Chemical formula 7 illustrated above of the present disclosure of Examples II-35 to II-51 had excellent storage stability in comparison with the pigment dispersion prepared by using the copolymers having no structure unit represented by the Chemical formula 2 of Comparative Examples 12 to 15. This is inferred to be the result of improved adsorption property to the pigment due to the π-π interaction between the naphtyl group in the structure unit represented by the Chemical formula 2 of the copolymer and the pigment. In addition, the pigment dispersant of Comparative Example 16 prepared by using the copolymer having no structure unit represented by the Chemical formula 1 was not well dispersed in water because the hydrophilicity of tetramethylene glycol chain in the structure unit used instead of the structure unit represented by Chemical formula 1 was low.

As seen in the evaluations, the inks manufactured by using the dispersion containing the copolymers of the present disclosure of Examples II-35 to II-51 had high levels of storage stability and were excellent with regard to image density in comparison with the inks manufactured by using the dispersions containing the copolymers of Comparative Examples 12 to 16, which were different from those of the present disclosure.

Example II-52 to II-73

Preparation of Aqueous Ink GJ 4-1 to GJ 4-18

Preparation of Pigment Dispersions PD 4-1 to PD 4-18

The aqueous solution of the copolymers CP 4-1 to CP 4-15 prepared in Examples I-43 to I-61, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 15 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 4-1 to PD 4-18. The values in Table 15 are represented in part. The pigment dispersions PD 4-1 to PD 4-9 and PD 4-13 to PD 4-18 had a pigment solid portion concentration of 16 percent and the pigment dispersions PD 4-10 to PD 4-12 had a pigment solid portion concentration of 20 percent.

Preparation of Ink

Pigment dispersions PD 4-1 to PD 4-18, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 16 followed by stirring for one hour and filtration by a membrane filter having an opening diameter of 1.2 micro meter to obtain aqueous inks GJ 4-1 to GJ 4-18 of the present disclosure. The values in Table 16 are represented in part.

Comparative Examples 17 to 20

Preparation of Comparative Aqueous Ink RGJ 4-1 to RGJ 4-4

6.36 g of a copolymer RCP 4-1 (viscosity of 6.5 percent by mass aqueous solution: 1.9 mPa·s) was obtained in the same manner as in Example I-43 except that the monomer M-1 was replaced with a monomer having a structure represented by the following Chemical structure 15. An aqueous solution of the copolymer RCP 4-1 was prepared in the same manner as in Example I-43.

Chemical structure 15

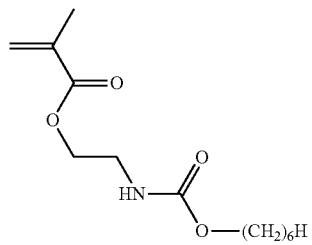

Comparative pigment dispersions RPD 4-1 to RPD 4-4 were obtained by mixing the aqueous solution of the copolymer RCP 4-1, and carbon black (NIPEX 150, manufactured by Degussa AG), Pigment Blue 15:4 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water with a ratio shown in Table 15.

Thereafter, the comparative pigment dispersions RPD 4-1 to RPD 4-4, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 16 followed by stirring for one hour and filtration by a membrane filter having an opening diameter of 1.2 micro meter to obtain comparative aqueous inks RGJ 4-1 to RGJ 4-4.

Comparative Example 21

Preparation of Comparative Aqueous Ink RGJ 4-5

A copolymer RCP 4-2 was obtained in the same manner as in Example I-43 except that the polyethyleneglycol monomethacrylate was replaced with poly(ethyleneglycol-.tetramethyleneglycol)-monomethacrylate represented by the following Chemical structure. An aqueous solution of the copolymer RCP 4-2 was prepared in the same manner as in Example I-43.

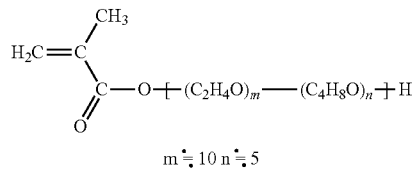

$m \fallingdotseq 10 \, n \fallingdotseq 5$

Thereafter, a comparative pigment dispersion RPD 4-5 was obtained in the same manner as in Example II-52 except that the aqueous solution of the comparative copolymer RCP 4-2 was used instead of the aqueous solution of the copolymer CP 4-1 in the preparation of the pigment dispersion of Example II-52.

Thereafter, a comparative aqueous ink RGJ 1-5 was obtained in the same manner as in Example II-52 except that the comparative pigment dispersion element RPD 4-5 was used instead of the pigment dispersion element PD 4-1 in the manufacturing of the ink of Example II-52.

Characteristics of the pigment dispersion and aqueous Inks prepared in Examples II-52 to 73 and Comparative Examples 17 to 21 were evaluated in the same manner as Example II-1.

The prepared pigment dispersions are shown in Table 15, the e prepared aqueous inks are shown in Table 16, and the evaluation results are shown in Table 17.

Example II-74

Preparation of Ink GJ 5-1

Preparation of Pigment Dispersion Element PD 5-1

22.5 g of deionized water was added to 16.0 g of carbon black (NIPEX150, manufactured by Degussa AG) and 61.5 g of the aqueous solution of the copolymer CP 5-1 prepared in Example I-62 followed by stirring for 12 hours. The obtained mixture was subject to circulation dispersion at a peripheral speed of 10 m/s for one hour using is disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain a pigment dispersion PD 5-1 (pigment solid portion concentration: 16 percent by mass).

Preparation of Ink 45.0 g of the pigment dispersion PD 5-1, 10.0 g of 1,3-butanediol, 10.0 g of glycerin, 10.0 g of 3-methoxy-N,N-diemthyl propionamide, 1.0 g of a fluorine-containing surfactant (ZONYL™ FS-300, solid portion: 40 percent by mass, manufactured by E. I. du Pont de Nemours and Company), and 24.0 g of deionized water were mixed followed by stirring for one hour and filtration by a membrane filter having an opening diameter of 1.2 micro meter to obtain an aqueous ink GJ 5-1 of the present disclosure.

Characteristics of the pigment dispersion PD 5-1 and the aqueous ink GJ 5-1 were evaluated in the same manner as Example II-1. The results are shown in Table 17.

TABLE 15

| | Pigment dispersion | | | | | | | | |
|---|---|---|---|---|---|---|---|---|---|
| | PD 4-1 | PD 4-1' | PD 4-2 | PD 4-3 | PD 4-4 | PD 4-5A | PD 4-5B | PD 4-5C | PD 4-5D |
| CP 4-1 6.5 percent by mass aqueous solution | 61.5 | | | | | | | | |
| CP 4-1' 6.5 percent by mass aqueous solution | | 61.5 | | | | | | | |
| CP 4-2 6.5 percent by mass aqueous solution | | | 61.5 | | | | | | |
| CP 4-3 6.5 percent by mass aqueous solution | | | | 61.5 | | | | | |
| CP 4-4 6.5 percent by mass aqueous solution | | | | | 61.5 | | | | |
| CP 4-5A 6.5 percent by mass aqueous solution | | | | | | 61.5 | | | |
| CP 4-5B 6.5 percent by mass aqueous solution | | | | | | | 61.5 | | |
| CP 4-5C 6.5 percent by mass aqueous solution | | | | | | | | 61.5 | |
| CP 4-5D 6.5 percent by mass aqueous solution | | | | | | | | | 61.5 |
| CP 4-6 6.5 percent by mass aqueous solution | | | | | | | | | |
| CP 4-7 6.5 percent by mass aqueous solution | | | | | | | | | |
| CP 4-8 6.5 percent by mass aqueous solution | | | | | | | | | |
| CP 4-9 6.5 percent by mass aqueous solution | | | | | | | | | |
| CP 4-10 6.5 percent by mass aqueous solution | | | | | | | | | |
| CP 4-11 6.5 percent by mass aqueous solution | | | | | | | | | |
| CP 4-12 6.5 percent by mass aqueous solution | | | | | | | | | |
| CP 4-13 6.5 percent by mass aqueous solution | | | | | | | | | |
| CP 4-14 6.5 percent by mass aqueous solution | | | | | | | | | |
| CP 4-15 6.5 percent by mass aqueous solution | | | | | | | | | |
| RCP 4-1 6.5 percent by mass aqueous solution | | | | | | | | | |
| RCP 4-2 6.5 percent by mass aqueous solution | | | | | | | | | |

TABLE 15-continued

| | PD 4-15 | PD 4-16 | PD 4-17 | PD 4-18 | RPD 4-1 | RPD 4-2 | RPD 4-3 | RPD 4-4 | RPD 4-5 |
|---|---|---|---|---|---|---|---|---|---|
| Carbon Black | 16.0 | 16.0 | 16.0 | 16.0 | 16.0 | 16.0 | 16.0 | 16.0 | 16.0 |
| Pigment Blue 15:3 | | | | | | | | | |
| Pigment Red 122 | | | | | | | | | |
| Pigment Yellow 74 | | | | | | | | | |
| Deionized water | Rest | Rest | Rest | Rest | Rest | Rest | Rest | Rest | Rest |
| Total | 100.0 | 100.0 | 100.0 | 100.0 | 100.0 | 100.0 | 100.0 | 100.0 | 100.0 |

| | Pigment dispersion | | | | | | | | |
|---|---|---|---|---|---|---|---|---|---|
| | PD 4-15 | PD 4-16 | PD 4-17 | PD 4-18 | RPD 4-1 | RPD 4-2 | RPD 4-3 | RPD 4-4 | RPD 4-5 |
| CP 4-1 6.5 percent by mass aqueous solution | | | | | | | | | |
| CP 4-1' 6.5 percent by mass aqueous solution | | | | | | | | | |
| CP 4-2 6.5 percent by mass aqueous solution | | | | | | | | | |
| CP 4-3 6.5 percent by mass aqueous solution | | | | | | | | | |
| CP 4-4 6.5 percent by mass aqueous solution | | | | | | | | | |
| CP 4-5A 6.5 percent by mass aqueous solution | | | | | | | | | |
| CP 4-5B 6.5 percent by mass aqueous solution | | | | | | | | | |
| CP 4-5C 6.5 percent by mass aqueous solution | | | | | | | | | |
| CP 4-5D 6.5 percent by mass aqueous solution | | | | | | | | | |
| CP 4-6 6.5 percent by mass aqueous solution | | | | | | | | | |
| CP 4-7 6.5 percent by mass aqueous solution | | | | | | | | | |
| CP 4-8 6.5 percent by mass aqueous solution | | | | | | | | | |
| CP 4-9 6.5 percent by mass aqueous solution | | | | | | | | | |
| CP 4-10 6.5 percent by mass aqueous solution | | | | | | | | | |
| CP 4-11 6.5 percent by mass aqueous solution | | | | | | | | | |
| CP 4-12 6.5 percent by mass aqueous solution | 61.5 | | | | | | | | |
| CP 4-13 6.5 percent by mass aqueous solution | | 61.5 | | | | | | | |
| CP 4-14 6.5 percent by mass aqueous solution | | | 61.5 | | | | | | |
| CP 4-15 6.5 percent by mass aqueous solution | | | | 61.5 | | | | | |
| RCP 4-1 6.5 percent by mass aqueous solution | | | | | 61.5 | 61.5 | 61.5 | 61.5 | |
| RCP 4-2 6.5 percent by mass aqueous solution | | | | | | | | | 61.5 |
| Carbon Black | 16.0 | 16.0 | 16.0 | 16.0 | 16.0 | | | | 16.0 |
| Pigment Blue 15:3 | | | | | | 20.0 | | | |
| Pigment Red 122 | | | | | | | 20.0 | | |
| Pigment Yellow 74 | | | | | | | | 20.0 | |

TABLE 15-continued

| | | | | | | | | | |
|---|---|---|---|---|---|---|---|---|---|
| Deionized water | Rest | Rest | Rest | Rest | Rest | Rest | Rest | Rest | Rest |
| Total | 100.0 | 100.0 | 100.0 | 100.0 | 100.0 | 100.0 | 100.0 | 100.0 | 100.0 |

| | Pigment dispersion | | | | | | | | |
|---|---|---|---|---|---|---|---|---|---|
| | PD 4-15 | PD 4-16 | PD 4-17 | PD 4-18 | RPD 4-1 | RPD 4-2 | RPD 4-3 | RPD 4-4 | RPD 4-5 |
| CP 4-1 6.5 percent by mass aqueous solution | | | | | | | | | |
| CP 4-1' 6.5 percent by mass aqueous solution | | | | | | | | | |
| CP 4-2 6.5 percent by mass aqueous solution | | | | | | | | | |
| CP 4-3 6.5 percent by mass aqueous solution | | | | | | | | | |
| CP 4-4 6.5 percent by mass aqueous solution | | | | | | | | | |
| CP 4-5A 6.5 percent by mass aqueous solution | | | | | | | | | |
| CP 4-5B 6.5 percent by mass aqueous solution | | | | | | | | | |
| CP 4-5C 6.5 percent by mass aqueous solution | | | | | | | | | |
| CP 4-5D 6.5 percent by mass aqueous solution | | | | | | | | | |
| CP 4-6 6.5 percent by mass aqueous solution | | | | | | | | | |
| CP 4-7 6.5 percent by mass aqueous solution | | | | | | | | | |
| CP 4-8 6.5 percent by mass aqueous solution | | | | | | | | | |
| CP 4-9 6.5 percent by mass aqueous solution | | | | | | | | | |
| CP 4-10 6.5 percent by mass aqueous solution | | | | | | | | | |
| CP 4-11 6.5 percent by mass aqueous solution | | | | | | | | | |
| CP 4-12 6.5 percent by mass aqueous solution | 61.5 | | | | | | | | |
| CP 4-13 6.5 percent by mass aqueous solution | | 61.5 | | | | | | | |
| CP 4-14 6.5 percent by mass aqueous solution | | | 61.5 | | | | | | |
| CP 4-15 6.5 percent by mass aqueous solution | | | | 61.5 | | | | | |
| RCP 4-1 6.5 percent by mass aqueous solution | | | | | 61.5 | 61.5 | 61.5 | 61.5 | |
| RCP 4-2 6.5 percent by mass aqueous solution | | | | | | | | | 61.5 |

TABLE 15-continued

| | | | | | | | | | |
|---|---|---|---|---|---|---|---|---|---|
| Carbon Black | 16.0 | 16.0 | 16.0 | 16.0 | 16.0 | | | | 16.0 |
| Pigment Blue 15:3 | | | | | | 20.0 | | | |
| Pigment Red 122 | | | | | | | 20.0 | | |
| Pigment Yellow 74 | | | | | | | | 20.0 | |
| Deionized water | Rest | Rest | Rest | Rest | Rest | Rest | Rest | Rest | Rest |
| Total | 100.0 | 100.0 | 100.0 | 100.0 | 100.0 | 100.0 | 100.0 | 100.0 | 100.0 |

TABLE 16

| | | | Example | | | | | | | |
|---|---|---|---|---|---|---|---|---|---|---|
| | | | II-52 GJ 4-1 | II-53 GJ 4-1' | II-54 GJ 4-2 | II-55 GJ 4-3 | II-56 GJ 4-4 | II-57 GJ 4-5A | II-58 GJ 4-5B | II-59 GJ 4-5C |
| | Material name | Resin | | | | | | | | |
| Pigment dispersion | PD 4-1 | CP 4-1 | 45.0 | | | | | | | |
| | PD 4-1' | CP 4-1' | | 45.0 | | | | | | |
| | PD 4-2 | CP 4-2 | | | 45.0 | | | | | |
| | PD 4-3 | CP 4-3 | | | | 45.0 | | | | |
| | PD 4-4 | CP 4-4 | | | | | 45.0 | | | |
| | PD 4-5A | CP 4-5A | | | | | | 45.0 | | |
| | PD 4-5B | CP 4-5B | | | | | | | 45.0 | |
| | PD 4-5C | CP 4-5C | | | | | | | | 45.0 |
| | PD 4-5D | CP 4-5D | | | | | | | | |
| | PD 4-6 | CP 4-6 | | | | | | | | |
| | PD 4-7 | CP 4-7 | | | | | | | | |
| | PD 4-8 | CP 4-8 | | | | | | | | |
| | PD 4-9 | CP 4-9 | | | | | | | | |
| | PD 4-10 | CP 4-1 | | | | | | | | |
| | PD 4-11 | CP 4-1 | | | | | | | | |
| | PD 4-12 | CP 4-1 | | | | | | | | |
| | PD 4-13 | CP 4-10 | | | | | | | | |
| | PD 4-14 | CP 4-11 | | | | | | | | |
| | PD 4-15 | CP 4-12 | | | | | | | | |
| | PD 4-16 | CP 4-13 | | | | | | | | |
| | PD 4-17 | CP 4-14 | | | | | | | | |
| | PD 4-18 | CP 4-15 | | | | | | | | |
| | RPD 4-1 | RCP 4-1 | | | | | | | | |
| | RPD 4-2 | RCP 4-1 | | | | | | | | |
| | RPD 4-3 | RCP 4-1 | | | | | | | | |
| | RPD 4-4 | RCP 4-1 | | | | | | | | |
| | RPD 4-5 | RCP 4-2 | | | | | | | | |
| Water soluble organic solvent | 1,3-butane diol | | 10.0 | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 | 10.0 |
| | 3-methoxy-N,N-dimethyl propionamide | | 10.0 | 10.0 | 10.0 | 10.0 | 10.0 | 10.0 | 10.0 | 10.0 |
| Surfactant | Zonyl™ FS-300 | | 1.0 | 1.0 | 1.0 | 1.0 | 1.0 | 1.0 | 1.0 | 1.0 |
| Solvent | Deionized water | | Rest | Rest | Rest | Rest | Rest | Rest | Rest | Rest |
| | Total | | 100.0 | 100.0 | 100.0 | 100.0 | 100.0 | 100.0 | 100.0 | 100.0 |

| | | | Example | | | | | | |
|---|---|---|---|---|---|---|---|---|---|
| | | | II-60 GJ 4-5D | II-61 GJ 4-6 | II-62 GJ 4-7 | II-63 GJ 4-8 | II-64 GJ 4-9 | II-65 GJ 4-10 | II-66 GJ 4-11 |
| | Material name | Resin | | | | | | | |
| Pigment dispersion | PD 4-1 | CP 4-1 | | | | | | | |
| | PD 4-1' | CP 4-1' | | | | | | | |
| | PD 4-2 | CP 4-2 | | | | | | | |
| | PD 4-3 | CP 4-3 | | | | | | | |
| | PD 4-4 | CP 4-4 | | | | | | | |
| | PD 4-5A | CP 4-5A | | | | | | | |
| | PD 4-5B | CP 4-5B | | | | | | | |
| | PD 4-5C | CP 4-5C | | | | | | | |
| | PD 4-5D | CP 4-5D | 45.0 | | | | | | |
| | PD 4-6 | CP 4-6 | | 45.0 | | | | | |
| | PD 4-7 | CP 4-7 | | | 45.0 | | | | |
| | PD 4-8 | CP 4-8 | | | | 45.0 | | | |
| | PD 4-9 | CP 4-9 | | | | | 45.0 | | |
| | PD 4-10 | CP 4-1 | | | | | | 30.0 | |
| | PD 4-11 | CP 4-1 | | | | | | | 30.0 |
| | PD 4-12 | CP 4-1 | | | | | | | |
| | PD 4-13 | CP 4-10 | | | | | | | |
| | PD 4-14 | CP 4-11 | | | | | | | |

TABLE 16-continued

|  |  |  |  |  |  |  |  |  |  |
|---|---|---|---|---|---|---|---|---|---|
|  | PD 4-15 | CP 4-12 |  |  |  |  |  |  |  |
|  | PD 4-16 | CP 4-13 |  |  |  |  |  |  |  |
|  | PD 4-17 | CP 4-14 |  |  |  |  |  |  |  |
|  | PD 4-18 | CP 4-15 |  |  |  |  |  |  |  |
|  | RPD 4-1 | RCP 4-1 |  |  |  |  |  |  |  |
|  | RPD 4-2 | RCP 4-1 |  |  |  |  |  |  |  |
|  | RPD 4-3 | RCP 4-1 |  |  |  |  |  |  |  |
|  | RPD 4-4 | RCP 4-1 |  |  |  |  |  |  |  |
|  | RPD 4-5 | RCP 4-2 |  |  |  |  |  |  |  |
| Water soluble organic solvent | 1,3-butane diol |  | 10.0 | 10.0 | 10.0 | 10.0 | 10.0 | 15.0 | 10.0 |
|  | Glycerin |  | 10.0 | 10.0 | 10.0 | 10.0 | 10.0 | 10.0 | 10.0 |
|  | 3-methoxy-N,N-dimethyl propionamide |  | 10.0 | 10.0 | 10.0 | 10.0 | 10.0 | 20.0 | 10.0 |
| Surfactant | Zonyl™ FS-300 |  | 1.0 | 1.0 | 1.0 | 1.0 | 1.0 | 1.0 | 1.0 |
| Solvent | Deionized water |  | Rest | Rest | Rest | Rest | Rest | Rest | Rest |
|  | Total |  | 100.0 | 100.0 | 100.0 | 100.0 | 100.0 | 100.0 | 100.0 |

|  |  |  | Example |  |  |  |  |  |  |
|---|---|---|---|---|---|---|---|---|---|
|  |  |  | II-67 GJ 4-12 | II-68 GJ 4-13 | II-69 GJ 4-14 | II-70 GJ 4-15 | II-71 GJ 4-16 | II-72 GJ 4-17 | II-73 GJ 4-18 |
|  | Material name | Resin |  |  |  |  |  |  |  |
| Pigment dispersion | PD 4-1 | CP 4-1 |  |  |  |  |  |  |  |
|  | PD 4-1' | CP 4-1' |  |  |  |  |  |  |  |
|  | PD 4-2 | CP 4-2 |  |  |  |  |  |  |  |
|  | PD 4-3 | CP 4-3 |  |  |  |  |  |  |  |
|  | PD 4-4 | CP 4-4 |  |  |  |  |  |  |  |
|  | PD 4-5A | CP 4-5A |  |  |  |  |  |  |  |
|  | PD 4-5B | CP 4-5B |  |  |  |  |  |  |  |
|  | PD 4-5C | CP 4-5C |  |  |  |  |  |  |  |
|  | PD 4-5D | CP 4-5D |  |  |  |  |  |  |  |
|  | PD 4-6 | CP 4-6 |  |  |  |  |  |  |  |
|  | PD 4-7 | CP 4-7 |  |  |  |  |  |  |  |
|  | PD 4-8 | CP 4-8 |  |  |  |  |  |  |  |
|  | PD 4-9 | CP 4-9 |  |  |  |  |  |  |  |
|  | PD 4-10 | CP 4-1 |  |  |  |  |  |  |  |
|  | PD 4-11 | CP 4-1 |  |  |  |  |  |  |  |
|  | PD 4-12 | CP 4-1 | 30.0 |  |  |  |  |  |  |
|  | PD 4-13 | CP 4-10 |  | 45.0 |  |  |  |  |  |
|  | PD 4-14 | CP 4-11 |  |  | 45.0 |  |  |  |  |
|  | PD 4-15 | CP 4-12 |  |  |  | 45.0 |  |  |  |
|  | PD 4-16 | CP 4-13 |  |  |  |  | 45.0 |  |  |
|  | PD 4-17 | CP 4-14 |  |  |  |  |  | 45.0 |  |
|  | PD 4-18 | CP 4-15 |  |  |  |  |  |  | 45.0 |
|  | RPD 4-1 | RCP 4-1 |  |  |  |  |  |  |  |
|  | RPD 4-2 | RCP 4-1 |  |  |  |  |  |  |  |
|  | RPD 4-3 | RCP 4-1 |  |  |  |  |  |  |  |
|  | RPD 4-4 | RCP 4-1 |  |  |  |  |  |  |  |
|  | RPD 4-5 | RCP 4-2 |  |  |  |  |  |  |  |
| Water soluble organic solvent | 1,3-butane diol |  | 10.0 | 10.0 | 10.0 | 10.0 | 10.0 | 10.0 | 10.0 |
|  | Glycerin |  | 10.0 | 10.0 | 10.0 | 10.0 | 10.0 | 10.0 | 10.0 |
|  | 3-methoxy-N,N-dimethyl propionamide |  | 10.0 | 10.0 | 10.0 | 10.0 | 10.0 | 10.0 | 10.0 |
| Surfactant | Zonyl™ FS-300 |  | 1.0 | 1.0 | 1.0 | 1.0 | 1.0 | 1.0 | 1.0 |
| Solvent | Deionized water |  | Rest | Rest | Rest | Rest | Rest | Rest | Rest |
|  | Total |  | 100.0 | 100.0 | 100.0 | 100.0 | 100.0 | 100.0 | 100.0 |

|  |  |  | Comparative Example |  |  |  |  |
|---|---|---|---|---|---|---|---|
|  |  |  | 17 RGJ 4-1 | 18 RGJ 4-2 | 19 RGJ 4-3 | 20 RGJ 4-4 | 21 RGJ 4-5 |
|  | Material name | Resin |  |  |  |  |  |
| Pigment dispersion | PD 4-1 | CP 4-1 |  |  |  |  |  |
|  | PD 4-1' | CP 4-1' |  |  |  |  |  |
|  | PD 4-2 | CP 4-2 |  |  |  |  |  |
|  | PD 4-3 | CP 4-3 |  |  |  |  |  |
|  | PD 4-4 | CP 4-4 |  |  |  |  |  |
|  | PD 4-5A | CP 4-5A |  |  |  |  |  |
|  | PD 4-5B | CP 4-5B |  |  |  |  |  |
|  | PD 4-5C | CP 4-5C |  |  |  |  |  |
|  | PD 4-5D | CP 4-5D |  |  |  |  |  |
|  | PD 4-6 | CP 4-6 |  |  |  |  |  |
|  | PD 4-7 | CP 4-7 |  |  |  |  |  |
|  | PD 4-8 | CP 4-8 |  |  |  |  |  |

TABLE 16-continued

|  |  |  |  |  |  |  |  |
|---|---|---|---|---|---|---|---|
|  | PD 4-9 | CP 4-9 |  |  |  |  |  |
|  | PD 4-10 | CP 4-1 |  |  |  |  |  |
|  | PD 4-11 | CP 4-1 |  |  |  |  |  |
|  | PD 4-12 | CP 4-1 |  |  |  |  |  |
|  | PD 4-13 | CP 4-10 |  |  |  |  |  |
|  | PD 4-14 | CP 4-11 |  |  |  |  |  |
|  | PD 4-15 | CP 4-12 |  |  |  |  |  |
|  | PD 4-16 | CP 4-13 |  |  |  |  |  |
|  | PD 4-17 | CP 4-14 |  |  |  |  |  |
|  | PD 4-18 | CP 4-15 |  |  |  |  |  |
|  | RPD 4-1 | RCP 4-1 | 45.0 |  |  |  |  |
|  | RPD 4-2 | RCP 4-1 |  | 30.0 |  |  |  |
|  | RPD 4-3 | RCP 4-1 |  |  | 30.0 |  |  |
|  | RPD 4-4 | RCP 4-1 |  |  |  | 30.0 |  |
|  | RPD 4-5 | RCP 4-2 |  |  |  |  | 45.0 |
| Water soluble organic solvent | 1,3-butane diol | | 10.0 | 15.0 | 10.0 | 10.0 | 10.0 |
| | Glycerin | | 10.0 | 10.0 | 10.0 | 10.0 | 10.0 |
| | 3-methoxy-N,N-dimethyl propionamide | | 10.0 | 20.0 | 10.0 | 10.0 | 10.0 |
| Surfactant | Zonyl ™ FS-300 | | 1.0 | 1.0 | 1.0 | 1.0 | 1.0 |
| Solvent | Deionized water | | Rest | Rest | Rest | Rest | Rest |
|  | Total |  | 100.0 | 100.0 | 100.0 | 100.0 | 100.0 |

TABLE 17

|  |  |  | Evaluation | | | |
|---|---|---|---|---|---|---|
|  | Ink name | Pigment dispersion | Pigment dispersion Storage property | Ink Storage property | Image density Plain paper 1 | Image density Plain paper 2 |
| Example II-52 | GJ 4-1 | PD 4-1 | AA | AA | A | A |
| Example II-53 | GJ 4-1' | PD 4-1' | A | AA | A | A |
| Example II-54 | GJ 4-2 | PD 4-2 | A | A | A | A |
| Example II-55 | GJ 4-3 | PD 4-3 | A | A | A | A |
| Example II-56 | GJ 4-4 | PD 4-4 | A | B | A | A |
| Example II-57 | GJ 4-5A | PD 4-5A | A | A | A | A |
| Example II-58 | GJ 4-5B | PD 4-5B | A | A | B | B |
| Example II-59 | GJ 4-5C | PD 4-5C | A | A | A | A |
| Example II-60 | GJ 4-5D | PD 4-5D | A | A | A | A |
| Example II-61 | GJ 4-6 | PD 4-6 | A | AA | A | B |
| Example II-62 | GJ 4-7 | PD 4-7 | AA | A | A | A |
| Example II-63 | GJ 4-8 | PD 4-8 | A | B | B | A |
| Example II-64 | GJ 4-9 | PD 4-9 | A | B | A | A |
| Example II-65 | GJ 4-10 | PD 4-10 | AA | A | A | A |
| Example II-66 | GJ 4-11 | PD 4-11 | AA | A | A | A |
| Example II-67 | GJ 4-12 | PD 4-12 | AA | A | A | A |
| Example II-68 | GJ 4-13 | PD 4-13 | AA | AA | A | A |
| Example II-69 | GJ 4-14 | PD 4-14 | AA | AA | A | A |
| Example II-70 | GJ 4-15 | PD 4-15 | AA | AA | A | A |
| Example II-71 | GJ 4-16 | PD 4-16 | AA | AA | A | A |
| Example II-72 | GJ 4-17 | PD 4-17 | AA | AA | A | A |

TABLE 17-continued

| | Ink name | Pigment dispersion | Evaluation | | | |
|---|---|---|---|---|---|---|
| | | | Pigment dispersion Storage property | Ink Storage property | Image density Plain paper 1 | Image density Plain paper 2 |
| Example II-73 | GJ 4-18 | PD 4-18 | AA | AA | A | A |
| Example II-74 | GJ 5-1 | PD 5-1 | AA | AA | A | A |
| Comparative Example 17 | RGJ 4-1 | RPD 4-1 | D | D | C | C |
| Comparative Example 18 | RGJ 4-2 | RPD 4-2 | D | D | C | C |
| Comparative Example 19 | RGJ 4-3 | RPD 4-3 | E | E | E | E |
| Comparative Example 20 | RGJ 4-4 | RPD 4-4 | E | E | E | E |
| Comparative Example 21 | RGJ 4-5 | RPD 4-5 | E | E | D | D |

As seen in the evaluations, the pigment dispersions prepared by using the copolymers having the structure unit represented by the Chemical formula 1 illustrated above, the structure unit represented by the Chemical formula 2, and the structure unit represented by the Chemical formula 9 illustrated above of the present disclosure of Examples II-52 to II-73 have excellent storage stability in comparison with the pigment dispersion prepared by using the copolymers having no structure unit represented by the Chemical formula 2 of Comparative Examples 17 to 20. This is inferred to be the result of improved adsorption property to the pigment due to the π-π interaction between the naphtyl group in the structure unit represented by the Chemical formula 2 of the copolymer and the pigment. In addition, the pigment dispersant of Comparative Example 21 prepared by using the copolymer having no structure unit represented by the Chemical formula 1 was not well dispersed in water because the hydrophilicity of tetramethylene glycol chain in the structure unit used instead of the structure unit represented by Chemical formula 1 was low.

As seen in the evaluations, the pigment dispersion prepared by using the copolymer having the structure unit represented by the Chemical formula 1 illustrated above, the structure unit represented by the Chemical formula 2 illustrated above, and the structure unit represented by the Chemical formula 11 illustrated above of the present disclosure of Examples II-74 had excellent storage stability.

As seen in the evaluations, the inks manufactured by using the dispersion containing the copolymers of the present disclosure of Examples II-52 to II-74 had high levels of storage stability and were excellent with regard to image density in comparison with the inks manufactured by using the dispersions containing the copolymers of Comparative Examples 17 to 21, which were different from those of the present disclosure.

Example II-75 to II-91

Preparation of Aqueous Ink GJ 6-1 to GJ 6-13

Preparation of Pigment Dispersions PD 6-1 to PD 6-13

The aqueous solution of the copolymers CP 6-1 to CP 6-10 prepared in Examples I-63 to I-76, and carbon black (NIPEX 150, manufactured by Degussa AG), Pigment Blue 15:3 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water were mixed with a ratio shown in Table 18 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain pigment dispersions PD 6-1 to PD 6-13. The values in Table 18 are represented in part. The pigment dispersions PD 6-1 to PD 6-8 and PD 6-12 to PD 6-13 had a pigment solid portion concentration of 16 percent and the pigment dispersions PD 6-9 to PD 6-11 had a pigment solid portion concentration of 20 percent.

Preparation of Ink

Pigment dispersions PD 6-1 to PD 6-13, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 19 followed by stirring for one hour and filtration by a membrane filter having an opening diameter of 1.2 micro meter to obtain aqueous inks GJ 6-1 to GJ 6-13 of the present disclosure. The values in Table 19 are represented in part.

Comparative Examples 22 to 25

Preparation of Comparative Aqueous Inks RGJ 6-1 to RGJ 6-4

6.36 g of a copolymer RCP 6-1 (weight average molecular weight (Mw): 11,900, number average molecular weight (Mn): 6,600) was obtained in the same manner as in Example I-63 except that the monomer M-1 was replaced with a monomer having a structure represented by the following Chemical structure 15. An aqueous solution of the copolymer RCP 6-1 was prepared in the same manner as in Example I-63.

Chemical structure 15

$$\begin{array}{c}\text{CH}_2=\text{C}(\text{CH}_3)-\text{C}(=\text{O})-\text{O}-\text{CH}_2\text{CH}_2-\text{NH}-\text{C}(=\text{O})-\text{O}-(\text{CH}_2)_6\text{H}\end{array}$$

Comparative pigment dispersions RPD 6-1 to RPD 6-4 were obtained by mixing the aqueous solution of the copolymer RCP 6-1, and carbon black (NIPEX 150, manufactured by Degussa AG), Pigment Blue 15:6 (chromofine blue, manufactured by Dainichiseika Color & Chemicals Mfg. Co., Ltd.), Pigment Red 122 (Toner magenta E002, magenta pigment, manufactured by Clariant Japan K.K.), or Pigment Yellow 74 (Fast Yellow 531, yellow pigment, manufactured by Dainichiseika Color & Chemicals Mfg. Co., Ltd.), and deionized water with a ratio shown in Table 18.

Thereafter, the comparative pigment dispersions RPD 6-1 to RPD 6-4, 1,3-butanediol, glycerin, 3-methoxy-N,N-diemthyl propionamide, a fluorine-containing surfactant (ZONYL™ FS-300, solid portion: 40 percent by mass, manufactured by E. I. du Pont de Nemours and Company), and deionized water were mixed in the ratio shown in Table 19 followed by stirring for one hour and filtration by a membrane filter having an opening diameter of 1.2 micro meter to obtain comparative aqueous inks RGJ 6-1 to RGJ 6-4.

Comparative Example 26

Preparation of Comparative Aqueous Ink RGJ 6-5

A copolymer RCP 6-2 was obtained in the same manner as in Example I-63 except that the polyethyleneglycol monomethacrylate was replaced with poly(ethyleneglycol-tetramethyleneglycol)-monomethacrylate represented by the following Chemical structure. An aqueous solution of the copolymer RCP 6-2 was prepared in the same manner as in Example I-63.

$$\text{H}_2\text{C}=\text{C}(\text{CH}_3)-\text{C}(=\text{O})-\text{O}-[(\text{C}_2\text{H}_4\text{O})_m-(\text{C}_4\text{H}_8\text{O})_n]-\text{H}$$

$m \fallingdotseq 10 \; n \fallingdotseq 5$

Thereafter, a comparative pigment dispersion RPD 6-5 was obtained in the same manner as in Example II-75 except that the aqueous solution of the comparative copolymer RCP 6-2 was used instead of the aqueous solution of the copolymer CP 6-1 in the preparation of the pigment dispersion of Example II-75.

Thereafter, a comparative aqueous ink RGJ 6-5 was obtained in the same manner as in Example II-75 except that the comparative pigment dispersion element RPD 6-5 was used instead of the pigment dispersion element PD 6-1 in the manufacturing of the ink of Example II-75.

Characteristics of the pigment dispersion and aqueous inks prepared in Examples II-75 to II-91 and Comparative Examples 22 to 26 were evaluated in the same manner as Example II-1.

The prepared pigment dispersions are shown in Table 18, the prepared aqueous inks are shown in Table 19, and the evaluation results are shown in Table 20.

TABLE 18

|  | Pigment dispersion | | | | | | | |
| --- | --- | --- | --- | --- | --- | --- | --- | --- |
|  | PD 6-1 | PD 6-1' | PD 6-2 | PD 6-3 | PD 6-4 | PD 6-5A | PD 6-5B | PD 6-5C |
| CP 6-1 10 percent by mass aqueous solution | 40.0 | | | | | | | |
| CP 6-1' 10 percent by mass aqueous solution | | 40.0 | | | | | | |
| CP 6-2 10 percent by mass aqueous solution | | | 40.0 | | | | | |
| CP 6-3 10 percent by mass aqueous solution | | | | 40.0 | | | | |
| CP 6-4 10 percent by mass aqueous solution | | | | | 40.0 | | | |
| CP 6-5A 10 percent by mass aqueous solution | | | | | | 40.0 | | |
| CP 6-5B 10 percent by mass aqueous solution | | | | | | | 40.0 | |

TABLE 18-continued

|  | | | | | | | | |
|---|---|---|---|---|---|---|---|---|
| CP 6-5C 10 percent by mass aqueous solution | | | | | | 40.0 | | |
| CP 6-5D 10 percent by mass aqueous solution | | | | | | | | |
| CP 6-6 10 percent by mass aqueous solution | | | | | | | | |
| CP 6-7 10 percent by mass aqueous solution | | | | | | | | |
| CP 6-8 10 percent by mass aqueous solution | | | | | | | | |
| CP 6-9 10 percent by mass aqueous solution | | | | | | | | |
| CP 6-10 10 percent by mass aqueous solution | | | | | | | | |
| RCP 6-1 10 percent by mass aqueous solution | | | | | | | | |
| RCP 6-2 10 percent by mass aqueous solution | | | | | | | | |
| Carbon Black | 16.0 | 16.0 | 16.0 | 16.0 | 16.0 | 16.0 | 16.0 | 16.0 |
| Pigment Blue 15:3 | | | | | | | | |
| Pigment Red 122 | | | | | | | | |
| Pigment Yellow 74 | | | | | | | | |
| Deionized water | Rest | Rest | Rest | Rest | Rest | Rest | Rest | Rest |
| Total | 100.0 | 100.0 | 100.0 | 100.0 | 100.0 | 100.0 | 100.0 | 100.0 |

|  | Pigment dispersion | | | | | | |
|---|---|---|---|---|---|---|---|
|  | PD 6-5D | PD 6-6 | PD 6-7 | PD 6-8 | PD 6-9 | PD 6-10 | PD 6-11 |
| CP 6-1 10 percent by mass aqueous solution | | | | | 40.0 | 40.0 | 40.0 |
| CP 6-1' 10 percent by mass aqueous solution | | | | | | | |
| CP 6-2 10 percent by mass aqueous solution | | | | | | | |
| CP 6-3 10 percent by mass aqueous solution | | | | | | | |
| CP 6-4 10 percent by mass aqueous solution | | | | | | | |
| CP 6-5A 10 percent by mass aqueous solution | | | | | | | |
| CP 6-5B 10 percent by mass aqueous solution | | | | | | | |

TABLE 18-continued

| | | | | | | | |
|---|---|---|---|---|---|---|---|
| CP 6-5C 10 percent by mass aqueous solution | | | | | | | |
| CP 6-5D 10 percent by mass aqueous solution | 40.0 | | | | | | |
| CP 6-6 10 percent by mass aqueous solution | | 40.0 | | | | | |
| CP 6-7 10 percent by mass aqueous solution | | | 40.0 | | | | |
| CP 6-8 10 percent by mass aqueous solution | | | | 40.0 | | | |
| CP 6-9 10 percent by mass aqueous solution | | | | | | | |
| CP 6-10 10 percent by mass aqueous solution | | | | | | | |
| RCP 6-1 10 percent by mass aqueous solution | | | | | | | |
| RCP 6-2 10 percent by mass aqueous solution | | | | | | | |
| Carbon Black | 16.0 | 16.0 | 16.0 | 16.0 | | | |
| Pigment Blue 15:3 | | | | | 20.0 | | |
| Pigment Red 122 | | | | | | 20.0 | |
| Pigment Yellow 74 | | | | | | | 20.0 |
| Deionized water | Rest | Rest | Rest | Rest | Rest | Rest | Rest |
| Total | 100.0 | 100.0 | 100.0 | 100.0 | 100.0 | 100.0 | 100.0 |

| | Pigment dispersion | | | | | | |
|---|---|---|---|---|---|---|---|
| | PD 6-12 | PD 6-13 | RPD 6-1 | RPD 6-2 | RPD 6-3 | RPD 6-4 | RPD 6-5 |
| CP 6-1 10 percent by mass aqueous solution | | | | | | | |
| CP 6-1' 10 percent by mass aqueous solution | | | | | | | |
| CP 6-2 10 percent by mass aqueous solution | | | | | | | |
| CP 6-3 10 percent by mass aqueous solution | | | | | | | |
| CP 6-4 10 percent by mass aqueous solution | | | | | | | |
| CP 6-5A 10 percent by mass aqueous solution | | | | | | | |
| CP 6-5B 10 percent by mass aqueous solution | | | | | | | |

TABLE 18-continued

| | | | | | | | |
|---|---|---|---|---|---|---|---|
| CP 6-5C 10 percent by mass aqueous solution | | | | | | | |
| CP 6-5D 10 percent by mass aqueous solution | | | | | | | |
| CP 6-6 10 percent by mass aqueous solution | | | | | | | |
| CP 6-7 10 percent by mass aqueous solution | | | | | | | |
| CP 6-8 10 percent by mass aqueous solution | | | | | | | |
| CP 6-9 10 percent by mass aqueous solution | 40.0 | | | | | | |
| CP 6-10 10 percent by mass aqueous solution | | 40.0 | | | | | |
| RCP 6-1 10 percent by mass aqueous solution | | | 40.0 | 40.0 | 40.0 | 40.0 | |
| RCP 6-2 10 percent by mass aqueous solution | | | | | | | 40.0 |
| Carbon Black | 16.0 | 16.0 | 16.0 | | | | 16.0 |
| Pigment Blue 15:3 | | | | 20.0 | | | |
| Pigment Red 122 | | | | | 20.0 | | |
| Pigment Yellow 74 | | | | | | 20.0 | |
| Deionized water | Rest | Rest | Rest | Rest | Rest | Rest | |
| Total | 100.0 | 100.0 | 100.0 | 100.0 | 100.0 | 100.0 | 100.0 |

TABLE 19

| | | | Example | | | | | | | | |
|---|---|---|---|---|---|---|---|---|---|---|---|
| | | | II-75 GJ 6-1 | II-76 GJ 6-1' | II-77 GJ 6-2 | II-78 GJ 6-3 | II-79 GJ 6-4 | II-80 GJ 6-5A | II-81 GJ 6-5B | II-82 GJ 6-5C | II-83 GJ 6-5D |
| | Material name | Resin | | | | | | | | | |
| Pigment dispersion | PD 6-1 | CP 6-1 | 45.0 | | | | | | | | |
| | PD 6-1' | CP 6-1' | | 45.0 | | | | | | | |
| | PD 6-2 | CP 6-2 | | | 45.0 | | | | | | |
| | PD 6-3 | CP 6-3 | | | | 45.0 | | | | | |
| | PD 6-4 | CP 6-4 | | | | | 45.0 | | | | |
| | PD 6-5A | CP 6-5A | | | | | | 45.0 | | | |
| | PD 6-5B | CP 6-5B | | | | | | | 45.0 | | |
| | PD 6-5C | CP 6-5C | | | | | | | | 45.0 | |
| | PD 6-5D | CP 6-5D | | | | | | | | | 45.0 |
| | PD 6-6 | CP 6-6 | | | | | | | | | |
| | PD 6-7 | CP 6-7 | | | | | | | | | |
| | PD 6-8 | CP 6-8 | | | | | | | | | |
| | PD 6-9 | CP 6-1 | | | | | | | | | |
| | PD 6-10 | CP 6-1 | | | | | | | | | |
| | PD 6-11 | CP 6-1 | | | | | | | | | |
| | PD 6-12 | CP 6-9 | | | | | | | | | |
| | PD 6-13 | CP 6-10 | | | | | | | | | |
| | RPD 6-1 | RCP 6-1 | | | | | | | | | |
| | RPD 6-2 | RCP 6-1 | | | | | | | | | |
| | RPD 6-3 | RCP 6-1 | | | | | | | | | |
| | RPD 6-4 | RCP 6-1 | | | | | | | | | |
| | RPD 6-5 | RCP 6-2 | | | | | | | | | |

TABLE 19-continued

| | | | | | | | | | | | |
|---|---|---|---|---|---|---|---|---|---|---|---|
| Water soluble organic solvent | 1,3-butane diol | | 10.0 | 10.0 | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 | 10.0 | 10.0 |
| | 3-methoxy-N,N-dimethyl propionamide | | 10.0 | 10.0 | 10.0 | 10.0 | 10.0 | 10.0 | 10.0 | 10.0 | 10.0 |
| Surfactant | Zonyl™ FS-300 | | 1.0 | 1.0 | 1.0 | 1.0 | 1.0 | 1.0 | 1.0 | 1.0 | 1.0 |
| Solvent | Deionized water | | Rest | Rest | Rest | Rest | Rest | Rest | Rest | Rest | Rest |
| | Total | | 100.0 | 100.0 | 100.0 | 100.0 | 100.0 | 100.0 | 100.0 | 100.0 | 100.0 |

| | | | Example | | | | | | | | |
|---|---|---|---|---|---|---|---|---|---|---|---|
| | | | II-84 GJ 6-6 | II-85 GJ 6-7 | II-86 GJ 6-8 | II-87 GJ 6-9 | II-88 GJ 6-10 | II-89 GJ 6-11 | II-90 GJ 6-12 | II-91 GJ 6-13 | |
| | Material name | Resin | | | | | | | | | |
| Pigment dispersion | PD 6-1 | CP 6-1 | | | | | | | | | |
| | PD 6-1' | CP 6-1' | | | | | | | | | |
| | PD 6-2 | CP 6-2 | | | | | | | | | |
| | PD 6-3 | CP 6-3 | | | | | | | | | |
| | PD 6-4 | CP 6-4 | | | | | | | | | |
| | PD 6-5A | CP 6-5A | | | | | | | | | |
| | PD 6-5B | CP 6-5B | | | | | | | | | |
| | PD 6-5C | CP 6-5C | | | | | | | | | |
| | PD 6-5D | CP 6-5D | | | | | | | | | |
| | PD 6-6 | CP 6-6 | 45.0 | | | | | | | | |
| | PD 6-7 | CP 6-7 | | 45.0 | | | | | | | |
| | PD 6-8 | CP 6-8 | | | 45.0 | | | | | | |
| | PD 6-9 | CP 6-1 | | | | 30.0 | | | | | |
| | PD 6-10 | CP 6-1 | | | | | 30.0 | | | | |
| | PD 6-11 | CP 6-1 | | | | | | 30.0 | | | |
| | PD 6-12 | CP 6-9 | | | | | | | 45.0 | | |
| | PD 6-13 | CP 6-10 | | | | | | | | 45.0 | |
| | RPD 6-1 | RCP 6-1 | | | | | | | | | |
| | RPD 6-2 | RCP 6-1 | | | | | | | | | |
| | RPD 6-3 | RCP 6-1 | | | | | | | | | |
| | RPD 6-4 | RCP 6-1 | | | | | | | | | |
| | RPD 6-5 | RCP 6-2 | | | | | | | | | |
| Water soluble organic solvent | 1,3-butane diol | | 10.0 | 10.0 | 10.0 | 10.0 | 10.0 | 10.0 | 10.0 | 10.0 | |
| | Glycerin | | 10.0 | 10.0 | 10.0 | 10.0 | 10.0 | 10.0 | 10.0 | 10.0 | |
| | 3-methoxy-N,N-dimethyl propionamide | | 10.0 | 10.0 | 10.0 | 10.0 | 10.0 | 10.0 | 10.0 | 10.0 | |
| Surfactant | Zonyl™ FS-300 | | 1.0 | 1.0 | 1.0 | 1.0 | 1.0 | 1.0 | 1.0 | 1.0 | |
| Solvent | Deionized water | | Rest | Rest | Rest | Rest | Rest | Rest | Rest | Rest | |
| | Total | | 100.0 | 100.0 | 100.0 | 100.0 | 100.0 | 100.0 | 100.0 | 100.0 | |

| | | | Comparative Example | | | | |
|---|---|---|---|---|---|---|---|
| | | | 22 RGJ 6-1 | 23 RGJ 6-2 | 24 RGJ 6-3 | 25 RGJ 6-4 | 26 RGJ 6-5 |
| | Material name | Resin | | | | | |
| Pigment dispersion | PD 6-1 | CP 6-1 | | | | | |
| | PD 6-1' | CP 6-1' | | | | | |
| | PD 6-2 | CP 6-2 | | | | | |
| | PD 6-3 | CP 6-3 | | | | | |
| | PD 6-4 | CP 6-4 | | | | | |
| | PD 6-5A | CP 6-5A | | | | | |
| | PD 6-5B | CP 6-5B | | | | | |
| | PD 6-5C | CP 6-5C | | | | | |
| | PD 6-5D | CP 6-5D | | | | | |
| | PD 6-6 | CP 6-6 | | | | | |
| | PD 6-7 | CP 6-7 | | | | | |
| | PD 6-8 | CP 6-8 | | | | | |
| | PD 6-9 | CP 6-1 | | | | | |
| | PD 6-10 | CP 6-1 | | | | | |
| | PD 6-11 | CP 6-1 | | | | | |
| | PD 6-12 | CP 6-9 | | | | | |
| | PD 6-13 | CP 6-10 | | | | | |
| | RPD 6-1 | RCP 6-1 | 45.0 | | | | |

TABLE 19-continued

|  |  |  |  |  |  |
|---|---|---|---|---|---|
|  | RPD 6-2 | RCP 6-1 | 30.0 |  |  |  |
|  | RPD 6-3 | RCP 6-1 |  | 30.0 |  |  |
|  | RPD 6-4 | RCP 6-1 |  |  | 30.0 |  |
|  | RPD 6-5 | RCP 6-2 |  |  |  | 45.0 |
| Water soluble organic solvent | 1,3-butane diol | 10.0 | 10.0 | 10.0 | 10.0 | 10.0 |
|  | Glycerin | 10.0 | 10.0 | 10.0 | 10.0 | 10.0 |
|  | 3-methoxy-N,N-dimethyl propionamide | 10.0 | 10.0 | 10.0 | 10.0 | 10.0 |
| Surfactant | Zonyl™ FS-300 | 1.0 | 1.0 | 1.0 | 1.0 | 1.0 |
| Solvent | Deionized water | Rest | Rest | Rest | Rest | Rest |
|  | Total | 100.0 | 100.0 | 100.0 | 100.0 | 100.0 |

TABLE 20

|  | Ink name | Pigment dispersion | Pigment dispersion Storage property | Ink Storage property | Image Density Plain paper 1 | Image Density Plain paper 2 |
|---|---|---|---|---|---|---|
| Example II-75 | GJ 6-1 | PD 6-1 | AA | AA | A | A |
| Example II-76 | GJ 6-1' | PD 6-1' | A | A | A | B |
| Example II-77 | GJ 6-2 | PD 6-2 | B | A | A | A |
| Example II-78 | GJ 6-3 | PD 6-3 | AA | AA | A | A |
| Example II-79 | GJ 6-4 | PD 6-4 | AA | AA | A | A |
| Example II-80 | GJ 6-5 A | PD 6-5 A | AA | AA | A | A |
| Example II-81 | GJ 6-5B | PD 6-5B | AA | AA | B | B |
| Example II-82 | GJ 6-5C | PD 6-5C | A | AA | A | A |
| Example II-83 | GJ 6-5D | PD 6-5D | A | AA | B | A |
| Example II-84 | GJ 6-6 | PD 6-6 | AA | AA | A | A |
| Example II-85 | GJ 6-7 | PD 6-7 | A | A | A | A |
| Example II-86 | GJ 6-8 | PD 6-8 | A | B | A | A |
| Example II-87 | GJ 6-9 | PD 6-9 | AA | A | A | A |
| Example II-88 | GJ 6-10 | PD 6-10 | AA | A | A | A |
| Example II-89 | GJ 6-11 | PD 6-11 | AA | AA | A | A |
| Example II-90 | GJ 6-12 | PD 6-12 | AA | AA | A | A |
| Example II-91 | GJ 6-13 | PD 6-13 | A | A | A | A |
| Comparative Example 22 | RGJ 6-1 | RPD 6-1 | D | D | C | C |
| Comparative Example 23 | RGJ 6-2 | RPD 6-2 | D | D | C | C |
| Comparative Example 24 | RGJ 6-3 | RPD 6-3 | E | E | E | E |
| Comparative Example 25 | RGJ 6-4 | RPD 6-4 | E | E | E | E |
| Comparative Example 26 | RGJ 6-5 | RPD 6-5 | E | E | C | C |

As seen in the evaluations, the pigment dispersions prepared by using the copolymers having the structure unit represented by the Chemical formula 1 illustrated above, the structure unit represented by the Chemical formula 2 illustrated above, and the structure unit represented by the Chemical formula 13 illustrated above of the present disclosure of Examples II-75 to II-91 had excellent storage stability in comparison with the pigment dispersion prepared by using the copolymers having no structure unit represented by the Chemical formula 2 of Comparative Examples 22 to 25. This is inferred to be the result of improved adsorption property to the pigment due to the π-π interaction between the naphtyl group in the structure unit represented by the Chemical formula 2 of the copolymer and the pigment. In addition, the pigment dispersant of Comparative Example 26 prepared by using the copolymer having no structure unit represented by the Chemical formula 1 was not well dispersed in water because the hydrophilicity of tetramethylene glycol chain in the structure unit used instead of the structure unit represented by Chemical formula 1 was low.

As seen in the evaluations, the inks manufactured by using the dispersion containing the copolymers of the present disclosure of Examples II-75 to II-91 had high levels of storage stability and were excellent with regard to image density in comparison with the inks manufactured by using the dispersions containing the copolymers of Comparative Examples 22 to 26, which were different from those of the present disclosure.

Having now fully described embodiments of the present invention, it will be apparent to one of ordinary skill in the art that many changes and modifications can be made thereto without departing from the spirit and scope of embodiments of the invention as set forth herein.

What is claimed is:

1. A copolymer comprising,
a structure unit represented by the following Chemical formula 1; and
a structure unit represented by the following Chemical formula 2,

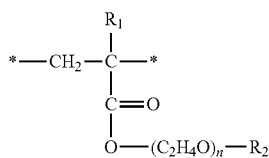

Chemical formula 1 where $R_1$ and $R_2$ each, independently represent hydrogen atoms or methyl groups, and n represents a value in the range of from 1 to 90,

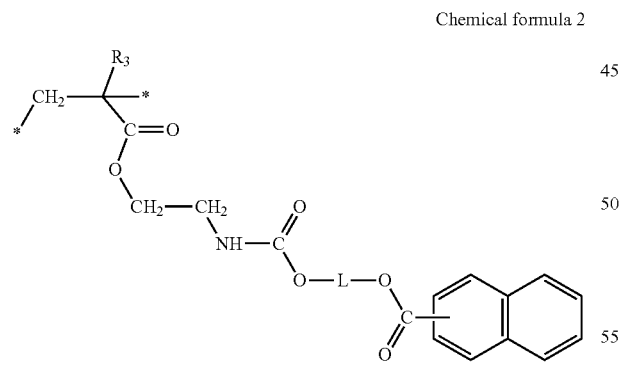

Chemical formula 2 where $R_3$ represents a hydrogen atom or a methyl group and L represents an alkylene group having 2 to 18 carbon atoms.

2. The copolymer according to claim 1, wherein a molar ratio of the structure unit represented by Chemical formula 1 to the structure unit represented by Chemical formula 2 is from 0.5:1.0 to 5.0:1.0.

3. The copolymer according to claim 1, further comprising a structure unit represented by the following Chemical formula 3,

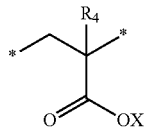

Chemical formula 3 where $R_4$ represents a hydrogen atom or a methyl group and X represents a hydrogen atom or a cation.

4. The copolymer according to claim 3, wherein a molar ratio of the structure unit represented by Chemical formula 1 to the structure unit represented by Chemical formula 2 to the structure unit represented by Chemical formula 3 is from 0.8:1.0:1.5 to 1.5:1.0:2.4.

5. The copolymer according to claim 1, further comprising a structure unit represented by the following Chemical formula 7,

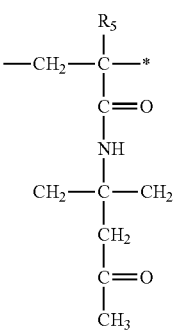

Chemical formula 7 where $R_5$ represents a hydrogen atom or a methyl group.

6. The copolymer according to claim 5, wherein a molar ratio of the structure unit represented by Chemical formula 1 to the structure unit represented by Chemical formula 2 to the structure unit represented by Chemical formula 7 is from 1.0:1.0:0.3 to 3.0:1.0:0.8.

7. The copolymer according to claim 1, further comprising a structure unit represented by the following Chemical formula 9,

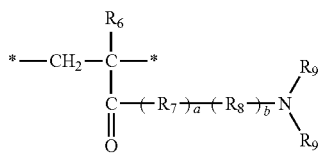

Chemical formula 9 where $R_6$ represents a hydrogen atom or a methyl group, $R_7$ represents —O— or —NH—, $R_8$ represents a substituted or non-substituted alkylene group having 1 to 5 carbon atoms, $R_9$ represents a hydrogen atom or an alkyl group having 1 to 5 carbon atoms, and a and b each, independently represent 0 or 1.

8. The copolymer according to claim 7, wherein a molar ratio of the structure unit represented by Chemical formula 1 to the structure unit represented by Chemical formula 2 to the structure unit represented by Chemical formula 9 is from 1.0:1.0:0.2 to 6.0:1.0:0.5.

9. The copolymer according to claim 1, further comprising a structure unit represented by the following Chemical formula 11, Chemical formula 11

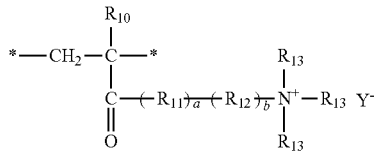

where $R_{10}$ represents a hydrogen atom or a methyl group, $R_{11}$ represents —O— or —NH—, $R_{12}$ represents a substituted or non-substituted alkylene group having 1 to 5 carbon atoms, $R_{13}$ represents an alkyl group having 1 to 5 carbon atoms, $Y^-$ represents an anionic species, and a and b each, independently represent 0 or 1.

10. The copolymer according to claim 9, wherein a molar ratio of the structure unit represented by Chemical formula 1 to the structure unit represented by Chemical formula 2 to the structure unit represented by Chemical formula 11 is from 1.0:1.0:0.05 to 6.0:1.0:0.5.

11. The copolymer according to claim 1, further comprising a structure unit represented by the following Chemical formula 13, Chemical formula 13

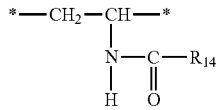

where $R_{14}$ represents a hydrogen atom or a methyl group.

12. The copolymer according to claim 11, wherein a molar ratio of the structure unit represented by Chemical formula 1 to the structure unit represented by Chemical formula 2 to the structure unit represented by Chemical formula 13 is from 1.0:1.0:0.05 to 5.0:1.0:1.0.

13. The copolymer according to claim 1, wherein $R_2$ in the structure unit represented by Chemical formula 1 represents a hydrogen atom.

14. The copolymer according to claim 1, wherein L in the structure unit represented by Chemical formula 2 represents an alkylene group having 2 to 12 carbon atoms.

15. An ink comprising:
water;
a colorant; and
the copolymer of claim 1.

16. The ink according to claim 15, wherein the colorant is a pigment.

17. The ink according to claim 15, further comprising at least one of a water soluble organic solvent or a surfactant.

18. An ink container comprising:
an ink containing unit; and
an ink contained in the ink containing unit, the ink including water, a colorant, and a copolymer including a structure unit represented by the following Chemical formula 1 and a structure unit represented by the following Chemical formula 2, Chemical formula 1

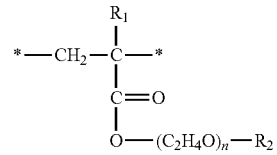

where $R_1$ and $R_2$ each, independently represent hydrogen atoms or methyl groups, and n represents a value in the range of from 1 to 90, Chemical formula 2

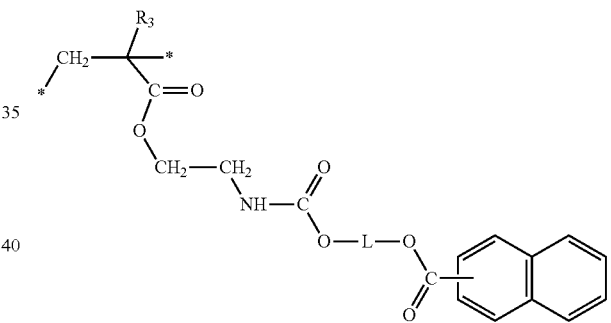

where $R_3$ represents a hydrogen atom or a methyl group and L represents an alkylene group having 2 to 18 carbon atoms.

* * * * *